United States Patent [19]
Lark et al.

[11] Patent Number: 4,943,932
[45] Date of Patent: Jul. 24, 1990

[54] ARCHITECTURE FOR COMPOSING COMPUTATIONAL MODULES UNIFORMLY ACROSS DIVERSE DEVELOPMENTAL FRAMEWORKS

[75] Inventors: Jay S. Lark, Mountain View; Lee D. Erman, Palo Alto; Michael Fehling, Mountain View; Frederick Hayes-Roth, Atherton, all of Calif.

[73] Assignee: Cimflex Teknowledge Corporation, Palo Alto, Calif.

[21] Appl. No.: 38,872

[22] Filed: Apr. 15, 1987

Related U.S. Application Data

[63] Continuation-in-part of Ser. No. 934,649, Nov. 25, 1986, abandoned.

[51] Int. Cl.$^5$ .................. G06F 15/20; G06F 15/18
[52] U.S. Cl. ........................... 364/513; 364/274.3; 364/200; 364/900; 364/972.2
[58] Field of Search ......... 364/513, 300, 200 MS File, 364/900 MS File; 382/14, 15

[56] References Cited

U.S. PATENT DOCUMENTS

| | | | |
|---|---|---|---|
| 4,591,983 | 5/1986 | Bennett et al. | 364/403 |
| 4,599,693 | 7/1986 | Denenberg | 364/513 |
| 4,620,286 | 10/1986 | Smith et al. | 364/513 |
| 4,648,044 | 3/1987 | Hardy et al. | 364/513 |
| 4,658,370 | 4/1987 | Erman et al. | 364/513 |
| 4,670,848 | 6/1987 | Schramm | 364/513 |
| 4,698,766 | 10/1987 | Entwistle et al. | 364/513 |

OTHER PUBLICATIONS

M. Callero, D. Waterman, J. Kipps, "TATR: A Prototype Expert System for Tactical Air Targeting", RAND R-3096-ARPA, Aug. 1984.
D. Bobrow, M. Stefik, "The LOOPS Manual", PARC TR KB-VLSI-81-31, 1981.
ABE: Architectural Overview, Lark et al., 26 Pages, Background Documentation for Workshop of Distributed Artificial Intelligence, Dec. 3-6, 1985, Sea Ranch, Calif.

(List continued on next page.)

Primary Examiner—Joseph Ruggiero
Attorney, Agent, or Firm—Arnold, White & Durkee

[57] ABSTRACT

A Multi-Level Architecture for developing intelligent computer systems composes computational modules uniformly across diverse developmental framework. The modules interact via message passing and are assembled to form application-specific systems. A first level of the Multi-Level Architecture includes a cooperative operating system which provides support for message passing and resource allocation and is preferably based on a module-oriented programming (MOP) model. The first level, for example, defines a virtual machine which is mapped onto an underlying hardware and operating system environment. A second level of the Multi-Level Architecture supports a plurality of application-independent problem-solving frameworks (PSF's) or programming environments for building modules and combining modules of different frameworks into complex systems. A third level of Multi-Level Architecture includes a plurality of knowledge processing modules ranging from specialized modules to skeletal systems which provide nearly complete solutions to application problems. For building an application-specific system, domain-specific knowledge is added on top of the third level and typically a selected skeletal system is customized. Extension or refinement of the application-specific system is accomplished by replacing existing modules with more complex modules or by using additional modules. The Multi-Level Architecture is particularly useful for building a plan monitoring and replanning system which monitors whether an initially valid design remains valid prior to its implementation, incrementally modifies the design to insure validity despite changing conditions, applies control knowledge to control sequencing among the monitoring and replanning functions, and also applies knowledge to explain the nature of design failures.

84 Claims, 21 Drawing Sheets

OTHER PUBLICATIONS

Earl D. Sacerdoti, "A Structure for Plans and Behavior," Technical Note 109, SRI International, (Aug. 1975).

Richard E. Fikes, "Monitored Execution of Robot Plans Produced by STRIPS," Stanford Research Institute Project 8973, Technical Note 55, Menlo Park, Calif. 94025, (Apr. 1971).

Philip J. Hayes, "A Representation for Robot Plans," Advance Papers of the Fourth International Joint Conference on Artificial Intelligence, Tbilisi, Georgia, USSR, (Sep. 3-8, 1975).

Nils J. Nilsson, "Some Examples of AI Mechanisms for Goal Seeking, Planning and Reasoning," Stanford Research Institute Technical Note 130, (May, 1976).

Robert B. Wesson, "Planning in the World of the Air Traffic Controller," Proceedings of the 5th International Joint Conference on Artificial Intelligence—1977, vol. 1, Massachusetts Institute of Technology, Cambridge, Mass., (Aug. 22-25, 1977).

C. Engleman et al., "KNOBS: An Experimental Knowledge Based Tactical Air Mission Planning System and A Rule Based Aircraft Identification Simulation Facility", Proceedings of the 6th International Joint Conference on Artificial Intelligence, Tokyo, pp. 247-249, (1979).

L. Erman et al., "The Hearsay-II Speech Understanding System: Integrating Knowledge to Resolve Uncertainty," *Computing Surveys*, 12(2), pp. 213-253, (Jun. 1980).

A. Barr et al., *The Handbook of Artificial Intelligence*, HeurisTech Press, Stanford, Calif., vol. II, pp. 3-68, 79-86, 150-154, vol. III, pp. 515-530, 541-556; (1982).

A. Davis et al., "Data Flow Program Graphs," *IEEE Computer*, 15(2), pp. 26-41, (Feb. 1982).

*Encyclopedia of Computer Science and Engineering*, (A. Ralston, Ed.), Van Nostraud Reinhold Company, N.Y., pp. 1-2, (1983).

B. Chandrasekaran, "Towards a Taxonomy of Problem Solving Types," *AI Magazine*, 4(1), pp. 9-17, (Winter/Spring 1983).

A. Sloman et al., "POPLOG: A Multilanguage Program Development Environment," *Information Technology: Research and Development*, 2, pp. 109-122, (1983).

William J. Clancey, "The Advantages of Abstract Control Knowledge in Expert System Design", Proceedings of the National Conference on Artificial Intelligence, Washington, D.C., pp. 74-78, (Aug. 1983).

*Symbolics Manual Version 6.1*, vol. 2, pp. 415-469, (Mar. 1985).

L. Erman et al., "Separating and Integrating Control in a Rule-Based Tool," Proceedings of the IEEE Workshops on Principles of Knowledge-Based Systems, Denver, Colo., pp. 37-43, (Dec. 1984).

Stuart Russell, "The Compleat Guide to MRS," Technical Report KSL-85-12, Stanford Knowledge Systems Laboratory, Computer Science Department, Stanford Univerity, (1985).

Geoffrey A. Pascoe, "Elements of Object-Oriented Programming," *Byte*, pp. 139-144, (Aug. 1986).

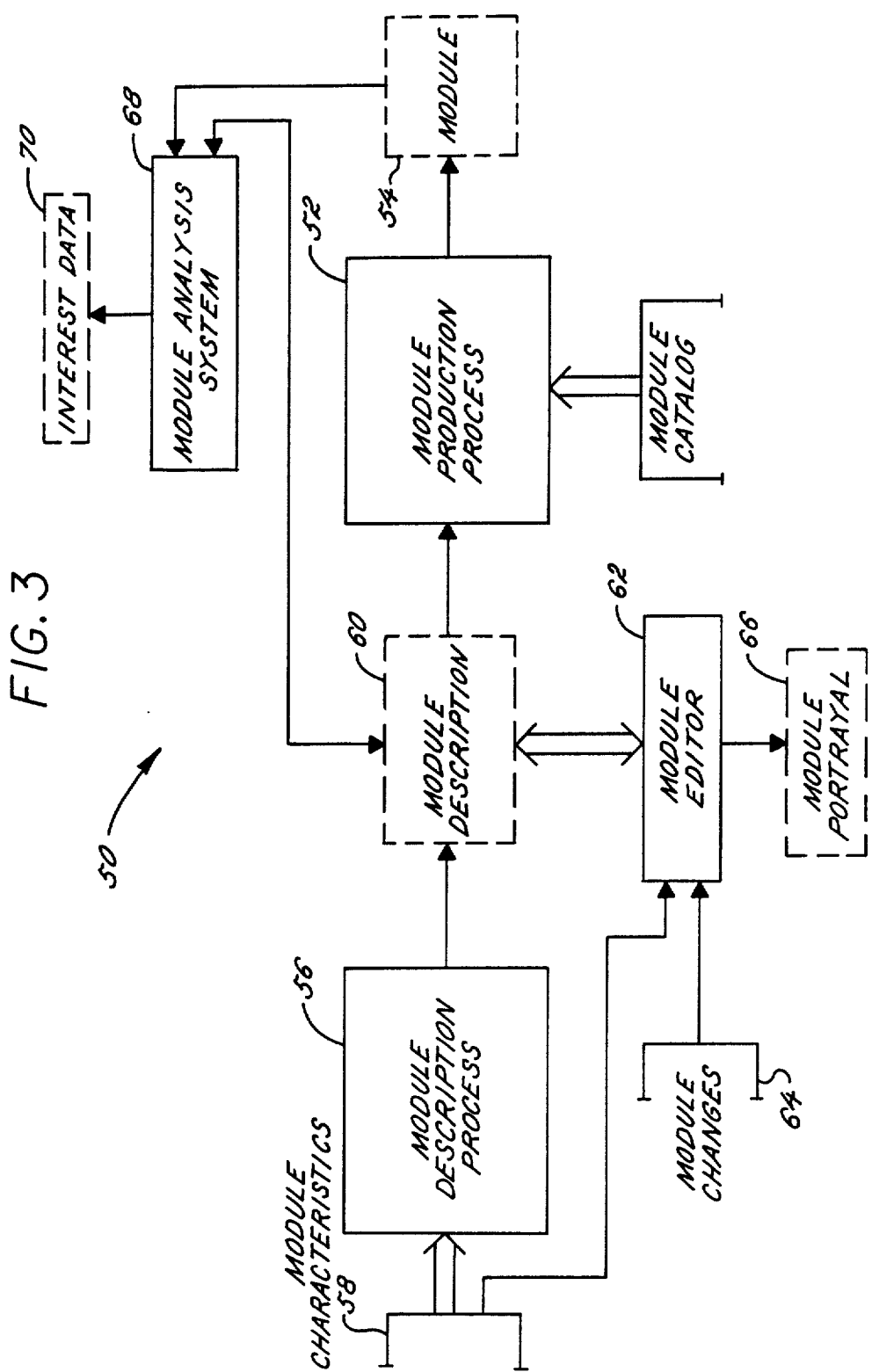

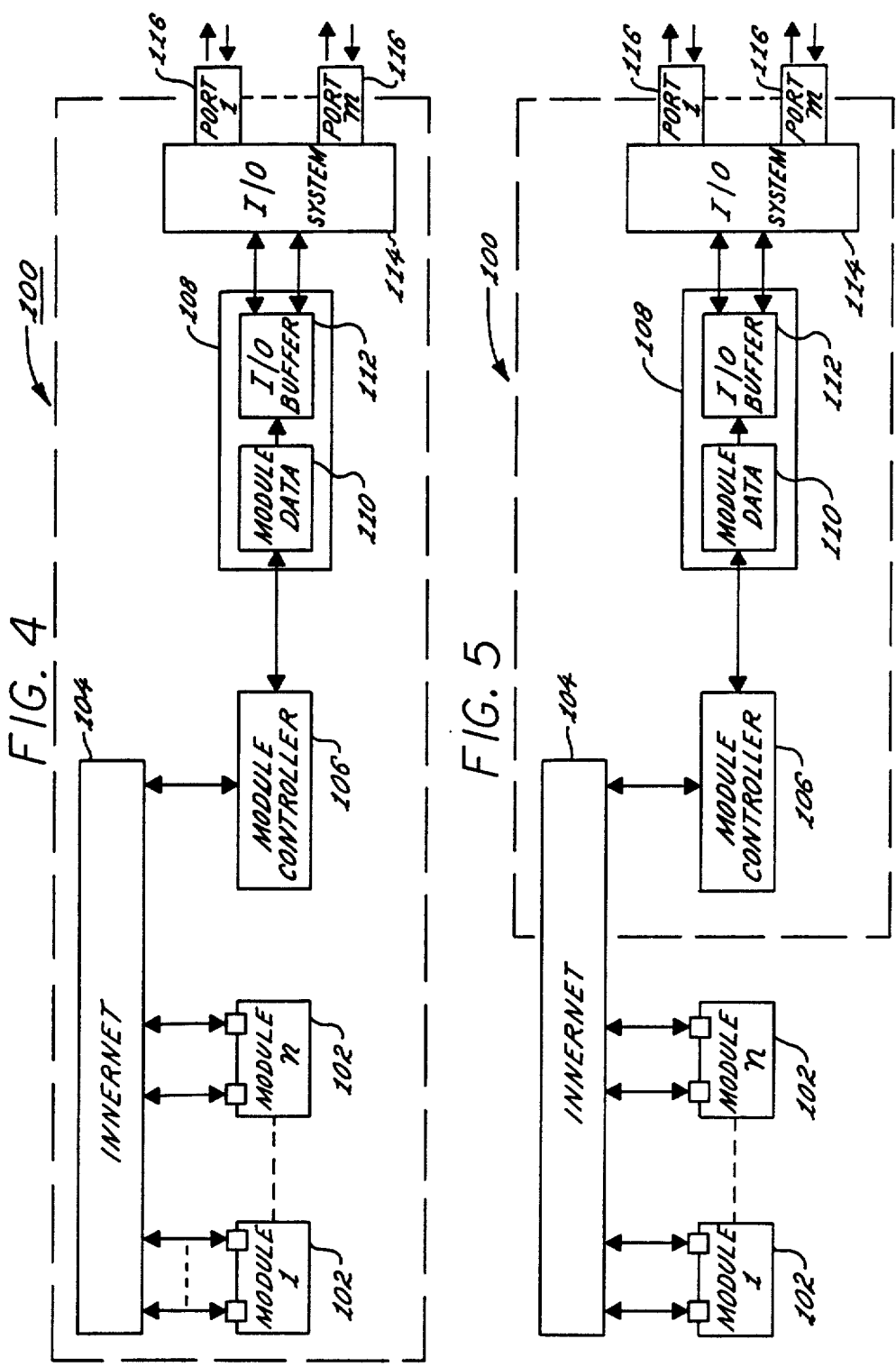

ARCHITECTURE FOR COMPOSING COMPUTATIONAL MODULES UNIFORMLY ACROSS DIVERSE DEVELOPMENTAL FRAMEWORKS

STATEMENT AS TO GOVERNMENT RIGHTS

This invention was made with Government support under contract number F30602-85-C-0135 awarded by USAF AFSC Rome Air Development Center. The Government has certain rights in this invention.

RELATED APPLICATIONS

The present application is a continuation-in-part of Ser. No. 934,649 filed Nov. 25, 1986 abandoned.

FIELD OF THE INVENTION

The present invention generally relates to artificial intelligence and knowledge engineering. More particularly, this invention relates to programming environments or frameworks which provide support for construction of computer systems and which provide general purpose techniques for building system modules and assembling modules into composite modules or systems.

BACKGROUND OF THE INVENTION

Computer systems are collections of computer program parts, called modules, that employ physical and computational resources to convert inputs into desired outputs. Current technology provides several levels of support for system construction. For example, programming languages such as FORTRAN or COBOL allow a programmer to define the behavior of a single module, which is a part of a computer program that employs physical and computational resources to convert inputs into desired outputs. Existing operating systems provide facilities for allocating resources and directing inputs and outputs. In combination with languages and operating systems, programming environments allow the programmer to specify how individual modules should be combined to build the entire system. In systems supporting multiple languages for program specification, the programs are combined into modules by use of linkloaders with programs inside a module communicating either by sharing data (example Common in FORTRAN) or by subroutine calls (including subroutines such as Functions that return data to the caller). Such subroutine calls establish a master-slave relationship by virtue of which the calling program gives control to the called subroutine and also passes it data in the form of arguments that bind to formal parameters in the subroutine definition; termination of the caller terminates the called subroutine.

Programming environments provided with current operating systems permit only a limited number of ways for building modules and assembling modules into bigger modules or systems. Each of such existing environments or "frameworks" provides a restricted syntax for describing the ways to combine parts and transfer a component's output to another component as input. Although these frameworks embody a language for describing the desired componential structure and overall behavior of the system and provide an implementation mechanism that combines the behaviors of the components in a manner that yields the specified desired behavior of the new modules, certain disadvantages are inherent to them. For instance, in system development, different languages embody different problem-solving approaches and, as a result, are best suited to solving different kinds of problems. Consequently, system designers prefer one kind of language for mathematical problem-solving (e.g., FORTRAN), another for commercial problem-solving (e.g., COBOL), another for AI programming (e.g., LISP), another for graphics (e.g., SMALLTALK), another for conventional data flow programming (e.g., some type of data flow language), and yet another for cooperative expert systems (e.g., a blackboard language). It hence becomes desirable, when an overall system embodies subproblems of different kinds, to use distinctly appropriate languages for each subproblem. This objective cannot be achieved with conventional systems because such diverse languages (e.g., SMALLTALK and DATAFLOW) produce modules that are incapable of being composed and integrated.

Although conventional operating systems such as UNIX and the IBM System/370 do provide some means for composing and integrating modules into larger or composite modules by sequencing of individual modules, i.e., by ensuring that data produced during the execution of the module is made available to subsequently executing modules, a significant disadvantage is that modules developed for use in one system (such as UNIX) generally cannot be assembled with modules in a different system (such as the IBM System/370). The resulting modules are dependent upon the framework in which they are assembled and consequently cannot be combined in different frameworks. Current technology is incapable of developing a module to provide a specified functionality unless the functionality is specified in terms of the framework in which the module is to be used.

Similarly, existing techniques for passing data between modules in one framework do not apply to modules connected in another framework. For example, there is no way to connect to the program steps in the IBM System/370 framework with the pipe construct of UNIX, nor is there a way to make a program that reads file records process another module's output files byte-by-byte.

In addition, if a system designer aims to assemble modules into a system with a more complex network of inputs and outputs and to employ a specific control regimen to govern the exact sequence of activities within the network of interacting modules, he is forced to resort to explicit low level programming instructions; current programming environments, including existing shells and high level languages, provide no support for such goals.

Another limitation of existing programming technology is that programming frameworks which are applicable to object-oriented or message-passing systems, in spite of providing a self-contained mechanism for implementing message-passing between objects, are incapable of allowing object sets to be composed into a module or the combination of modules with other modules in different programming frameworks in order to build heterogenous systems. For instance, it is not possible to incorporate into a SMALLTALK program a pre-existing computer program that is not a collection of SMALLTALK objects. Moreover, existing programming languages such as SMALLTALK do not provide general purpose techniques for expressing the connections among modules that are necessary to specify the system design. This constitutes a major deficiency in the building of complex systems where the structure and connection topology can make the difference between practical and excessive amounts of message-passing communication.

Accordingly, in order to efficiently build complex systems, there is a need for a flexible computing architecture for developing applications by the assembly of collections of modules into systems of parts that interact via message-passing, where the functionality of each module is independent of its implementation, and each module can be composed of an assembly of modules in a recursive fashion.

Computer systems are being called upon to perform increasingly complex planning and design tasks. In many applications the design process is so complex that a valid plan or design is obtained only after considerable human effort and machine time, and it is nearly impossible to provide a plan or design that can handle all anticipated situations of interest. Consequently, it has been necessary to provide a new plan or design when the overall situation has changed so far as to render the original design potentially invalid as a result of certain underlying or critical assumptions of the plan becomming no longer true.

Accordingly, to enhance the reliability of designs or plans and to facilitate the provision of a new design or plan to reflect changing conditions, there is a need for a novel computer system for testing designs or plans and modifying plans or designs so that a valid design or plan will be available at the time of implementing the plan or design.

OBJECTS OF THE INVENTION

It is a primary object of this invention to provide a flexible computing architecture which supports module-oriented programming for developing complex systems composed of application-independent, interacting, composite modules implemented in diverse frameworks.

It is an important object of this invention to provide knowledge processing methodology which permits complex systems to be composed out of interacting component subsystems.

A related object of this invention is to provide such a methodology which provides knowledge processing capabilities that can be used effectively in a large variety of applications and which permits integration by virtue of an underlying architecture that can support a variety of system structures.

It is a specific object of this invention to provide software engineering tools (SET's) which permit integration of diverse component technologies and support large scale application system development by providing capabilities which support reuse of previously structured components.

A more specific object of this invention is to provide SET's which support alternative implementations of various software engineering functionalities as modules, and provide means for configuring software systems and software system tools out of these modules.

A related object is to provide such new tools which are based on a plurality of preprogrammed functional modules and which provide an effective technique for configuring the modules into large systems.

Another object of this invention is to provide SET's of the above type which, in addition to low level capabilities, provide high level generic solutions to diverse classes of problems.

Another related object of this invention is to provide SET's which, in addition to providing the above capabilities, allow the accumulation and incorporation of new and existing functional modules, both intelligent and conventional.

Still another object of the invention is to provide a more efficient and effective computing system for insuring that a plan or design is valid at the time of its implementation despite changing conditions.

Moreover, another object of the invention is to provide a plan monitoring and replanning facility in which the operation and sequencing of monitoring and replanning functions are explicit and flexible so as to be readily adapted to a variety of application domains.

These and other objects of this invention are achieved, according to the system of this invention, by providing a software engineering tool in the form of an architecture and methodology for building software systems by integrating heterogenous components, including both conventional and knowledge processing components. The tool includes a modular and expandable collection of knowledge and software engineering capabilities including skeletal system structures. A useful initial set of proven, valuable functional capabilities is provided and various levels of the architecture are accessible for modification and augmentation by making the various facilities, and their implementations, easily understandable. Accordingly, this invention provides a multilevel architecture for developing software systems (hereinafter referred to as "the Multilevel Architecture") which can compose computational modules uniformly across diverse developmental frameworks and supports aggregations of cooperating, autonomous, problem-solving components.

At the first level of the Multilevel Architecture, there lies a cooperative operating system which provides support for message-passing and resource allocation. This level is based on a general mode of computation called module-oriented programming (MOP) which is organized around communicating modules. This computational model provides the foundation and building blocks for the higher levels of the architecture for expressing designs of complex systems as interacting networks of problem-solving agents. The computational model also defines a virtual machine which can be mapped onto underlying hardware and operating system environments.

At its second level, the Multilevel Architecture supports various problem-solving frameworks (PSF's) which essentially are programming environments for building modules and module-based systems. The Multilevel Architecture provides for the combination of frameworks in order to construct systems for complex applications.

At its third level, the Multilevel Architecture contains functional processing modules ranging from specialized knowledge processing functions to modules which provide nearly complete solutions, known as "skeletal systems", to application problems.

At the highest level of the Multilevel Architecture, construction of systems for specific applications is conveniently accomplished by selecting a skeletal system and customizing it with domain-specific knowledge. Extension or refinement of such systems is made possible by using additional modules.

The Multilevel Architecture is useful in constructing a complex system by building up layers of capabilities in such a way that each layer draws on the capabilities made available by the layer beneath it and presents a new set to the layer above it. For instance, the MOP serves as a base architecture for building problem-solving frameworks, whereas the problem-solving frameworks form an architecture for building particular functional capabilities. New capabilities are developed by modifying, restricting or reconfiguring the capabilities from the next lower level. In effect, the Multilevel Architecture provides one or more frameworks in response to which a software engineering tool builder can supply corresponding functional processing modules, which might include capabilities such as a rule-interpreter and facilities for tasks such as maintaining knowledge bases and producing explanations of system behavior.

The Multilevel Architecture is configured to permit the creation of a skeletal system by adding structure to and control over a set of processing modules and their interactions with other facilities such as databases. Subsequently, the newly created skeletal system may be customized for a particular application domain by replacing some of the generic constructs with more appropriate terms. At its final level, the Multilevel Architecture provides a domain expert with the capacity to add to this skeletal system knowledge of specific objects and relationships to create a domain-specific application system. The particular choice of levels for the Multilevel Architecture is made in such a way that it supports the goals of building intelligent systems by selecting, customizing and combining modules from growing libraries.

The Multi-Level Architecture is particularly useful for building a plan monitoring and replanning system which monitors whether an initially valid design remains valid prior to its implementation, incrementally modifies the design to insure validity despite changing conditions, applies control knowledge to control sequencing among the monitoring and replanning functions, and also applies knowledge to explain the nature of design failures. A preferred plan monitoring and replanning system has several modular functions, including a plan assumption analyst to determine the "critical assumptions" or requirements of the plan that the plan's own actions do not accomplish, a situation monitor to poll a situation data base periodically to test whether the plan's critical assumptions are true, a situation data base to keep a model about the natural world expressed in terms of first-order predicate calculus, a plan failure explainer to express in a natural language an explanation of a failed plan, an incremental replanner to modify an original plan as needed by finding alternative values for decision parameters that allow the plan to be verified with minimal perturbation, and a plan change analyst to describe differences between an original plan and a modified plan.

BRIEF DESCRIPTION OF THE DRAWINGS

Other objects and advantages of the present invention will become apparent upon reading the following detailed description and upon reference to the drawings, in which:

FIG. 3 is an illustration depicting the operation of a framework in the development of modules, according to the system of this invention;

FIG. 4 is a block diagram type representation of a composite module assembled by using a particular framework, according to a preferred embodiment of this invention;

FIG. 5 is a block diagram type illustration of a composite module assembled according to an alternative embodiment of this invention;

While the invention will be described in connection with certain preferred embodiments, it will be understood that it is not intended to limit the invention to these particular embodiments. On the contrary, it is intended to cover all modifications, alternatives and equivalent arrangements as may be included within the spirit and scope of this invention as defined by the appended claims.

DESCRIPTION OF THE PREFERRED EMBODIMENTS

Figure 1:
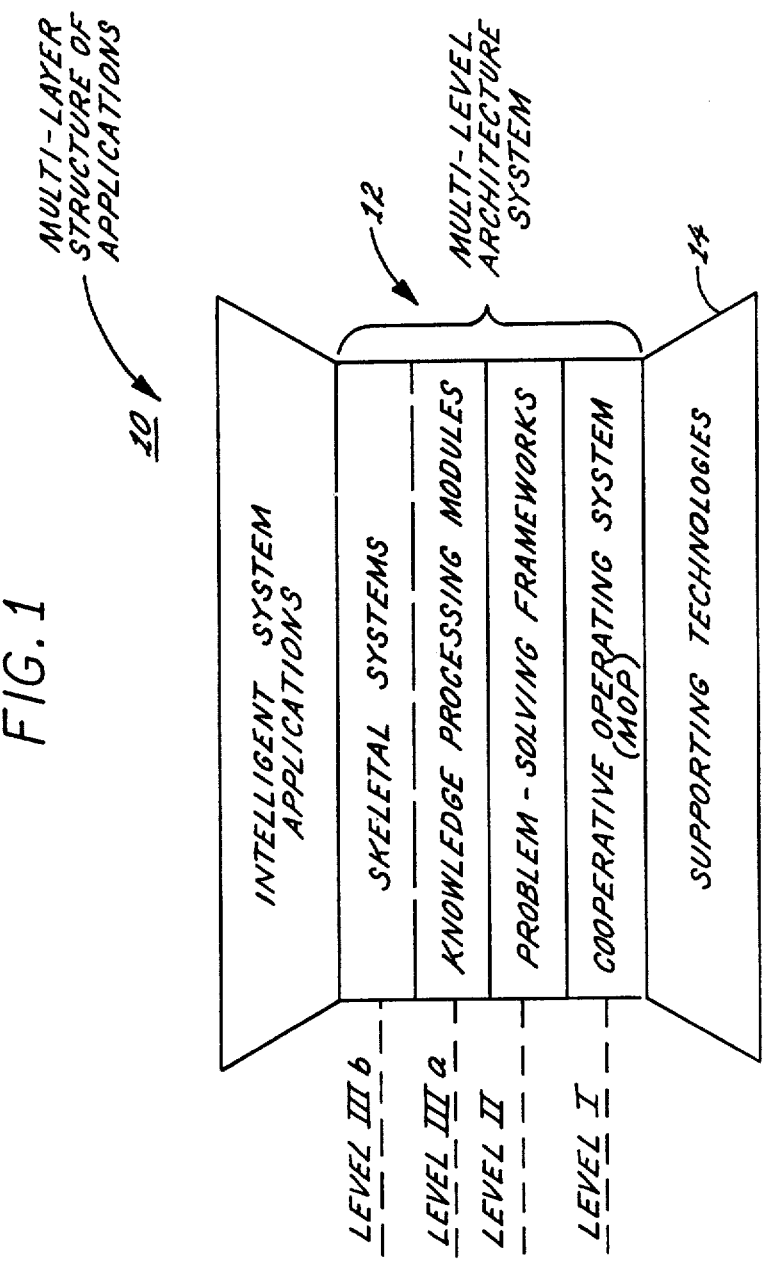
FIG. 1 is an illustration depicting the basic structure of the Multilevel Architecture of this invention.

Referring now to FIG. 1, a multi-layer structure of applications 10 incorporating the present invention is shown to be based upon a Multilevel Architecture system 12 which itself rests on many supporting technologies 14, such as conventional computer hardware and networks. The Multilevel Architecture system 12 essentially comprises three discrete levels. The first level of the system 12 is a cooperative operating system, which includes a general purpose, open organization based computational model. The open organization provides flexibility in the construction of frameworks and the computational model provides a firm semantic basis for understanding the computational properties of the various systems built on the basis of the Multilevel Architecture. According to the preferred embodiment, the open organization is based on communicating modules, and the computational model is consequently called module-oriented programming (MOP). Level I of the Multilevel Architecture system 12 essentially functions to provide support for message-passing and resource allocation.

At level II of the Multilevel Architecture, a plurality of problem-solving frameworks are provided, each of which is a programming environment for building modules and module-based systems. The Multilevel Architecture system permits complex applications to be conveniently built by allowing the composition and combination of frameworks aimed at solving specific application-related problems.

The third level of the Multilevel Architecture supports a plurality of functional processing modules (IIIa) whose complexity ranges from relatively simple specialized knowledge processing functions to complex modules known as "skeletal systems" (IIIb) which provide nearly complete solutions to specific application problems.

At the highest level, a computer system for a specific application is constructed by selecting a desired skeletal system solution from level IIIb and customizing it with domain-specific knowledge. At this level, extension or refinement of the application may also be accomplished by the use of additional preprogrammed software modules.

A more detailed description of the various levels that define the Multilevel Architecture of this invention now follows. Level I of the Multilevel Architecture system 12 is defined by a virtual machine which functions as a cooperative operating system by providing services analogous to those provided by standard operating systems and including module and network creations, communication primitives, computational resource modeling and primitive resource allocation schemes. The virtual machine specifies the primitive operations and how a user may compose and configure those operations into higher level computations. According to a feature of this invention, the virtual machine is defined by a computational model based upon module-oriented programming (MOP) which is distinguished from and is an extension of the model of computation embraced in conventional object-oriented programming systems such as SMALLTALK and ACTORS. In conventional object-oriented systems, computation proceeds by a set of independent objects responding to messages sent explicitly to them by other objects. Under the MOP computational model of this invention, the concept of explicit message-passing invocation of an agent is optionally augmented with the notion of pattern-directed communication. In addition, MOP requires that any agent provide an explicit scheme for the control and distribution of processing resources to components of that module. The virtual machine at level I of the Multilevel system, as embodied by the MOP computational model, is preferably supported by a cooperative operating system which, in addition to providing conventional operating system functions, allows the Multilevel Architecture system to be implemented on arbitrary physical computing environments.

The MOP computational model of the Multilevel Architecture system uses pattern directed communication as the basic computational mechanism by replacing the construct of conventional object-oriented programming system messages with the more general construct of a broadcast message, a message being defined as an arbitrary datum in a medium, called a network, to which a module connects or has access. In MOP, a module responds to the occurrence of specific messages in the network with internally defined activities and the module may or may not react by producing response messages on the network. The set of external messages to which a module reacts as a whole is defined internally by the module. More specifically, if a module A is exposed to some message produced by another module, then module A will autonomously determine whether it will respond to this message. All modules in a given group interact by creating and responding to messages in a shared network which forms the communications medium for patterns that can potentially invoke some response from one or more modules having access to that network. Each module in the MOP model is an integral entity for performing one or more system functions. Thus, looking at an external view of a module, it represents a component in a larger module's network, while the internal view of a non-primitive module depicts it as a group of component modules that interact with each other only via the local network of that module. The activities of a module as a whole are determined by the interaction of the component modules which comprise the larger composite module. This kind of recursive module definition progresses until all component modules are reduced to indivisible, primitive modules. Distinction between external and internal messages to and from modules is provided by control means which manage the transmission of messages between an external network and the module's own internal network.

Figure 2:
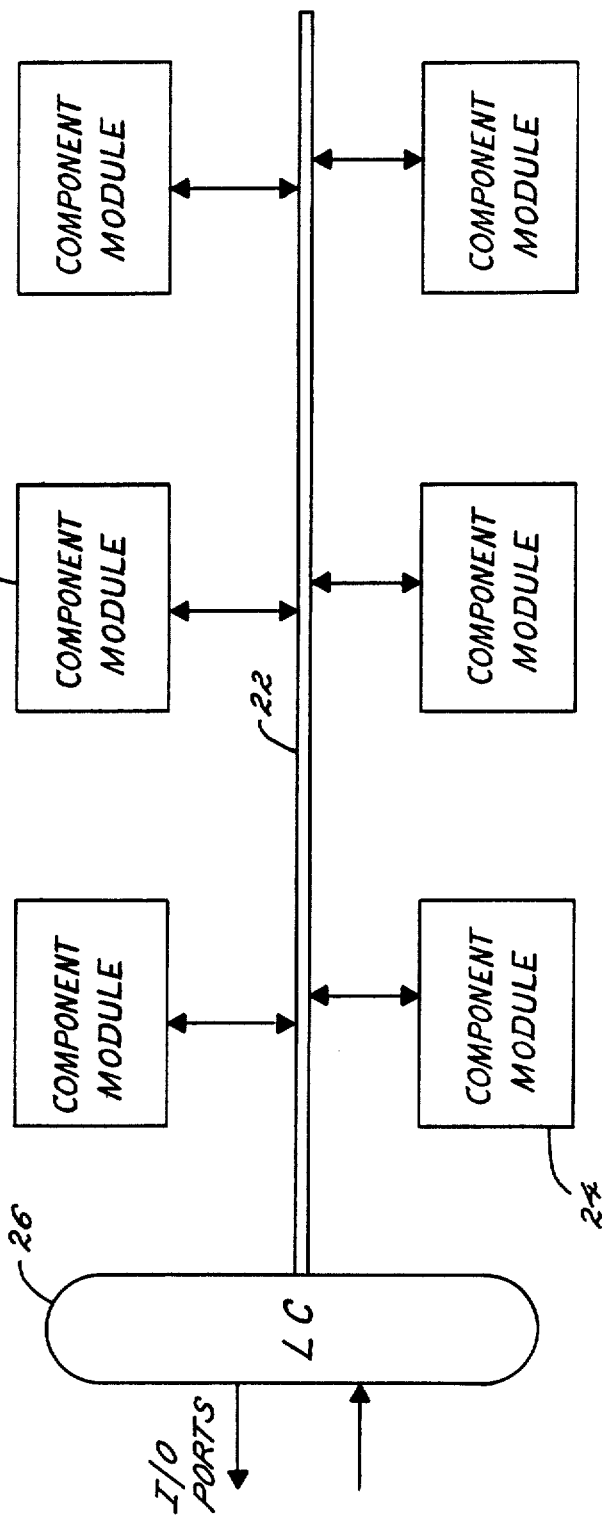
FIG. 2 is a schematic diagram illustrating the organization of a typical module based on the cooperative operating system of the Multilevel Architecture of FIG. 1.

The above description of the MOP computational module is further clarified with reference to FIG. 2 which shows the schematic of a typical module organization under the preferred MOP operating system. As shown, a standard module 20 essentially comprises an internal network 22 to which a plurality of component modules 24 are connected through their respective ports. The ports are designated to be either input ports or output ports and contain means, such as an interest filter, capable of tracking messages on the external network which are defined to be of interest to the module. Each module is provided with a local controller (LC) 26 which, among other functions, monitors external messages, i.e., any messages on any network to which a particular module connects. The LC 26 monitors messages of types declared to be of interest by the interest filter for any of its internal composite modules, and copies such external messages onto the internal network 22. The LC 26 also functions to monitor the internal network for specific types of messages and forwards such messages to an external network. According to the MOP computational model, a module can connect to more than one network so that the Multilevel Architecture is not limited to strict hierarchical organization. The above module organization ensures that computation, according to the module-oriented model, proceeds according to a basic message-response cycle which serves as a basic model upon which other functional/computational models, such as conventional functional or object-oriented programming, may be built.

According to another feature of this invention, a module is defined to model explicitly the management by the module of a given set of processor resources (processors, memory, cycles, etc.) in order to accomplish pending module actions. This provides the MOP model of this invention with the ability to represent computational systems with multiple lines of control and multiple processors. This removes the disadvantages that most conventional object-oriented systems possess by virtue of a computational module defined on the basis of either a single processor and a single thread of control (e.g., SMALLTALK) or on the basis of complete concurrency and full parallelism (e.g., ACTORS). In the illustrative MOP model, knowledge about a module's own activity, i.e., the complete control structure of the module, can be represented explicitly in terms of processor management. Thus, every module contains an LC responsible for managing the message response capabilities of the module as a whole. In addition, an LC manages processor resource distribution by dynamically distributing processors to the components of the module including the LC itself in order to carry out module activity. The LC is the only component of the module that has the authority to manage the various processors on behalf of the aggregation of module components; centralized control of module activity is achieved by the LC by deciding when to allocate processing resources to a module component that needs them. The MOP computational model is also permissive of more distributed models of control also. More specifically, since each component of the module is also a module, one or more such components may have their own, privately held processors; such a module is said to possess its own "local" processor resources and can carry out computations without intervention by the LC of an enclosing module. It is thus possible to extend the MOP model to such an extent that it defines a fully-distributed module in which every component has at least one processor.

Focusing now upon the preferred MOP operating system, it is designed to directly support the description and creation of modules, connection of modules to networks, communication of messages between modules via networks and transfer of processing resources among modules. Many of these services correspond to those provided by conventional operating systems, such as process creation and management and inter-process communication. The preferred MOP operating system is a multi-layered operating system which includes a run-time kernel for providing services such as module and network creation and inter-module communication; structural and behavioral description languages for allowing a user to describe a module in a language the run-time kernel can understand; a set of implementation languages in which the user may program primitive modules; and a set of primitive modules which is based upon the supported implementation languages and is available for incorporation within systems.

The run-time kernel in the preferred MOP operating system provides two distinct kinds of services:

(1) creation of modules and networks, a service class which includes, for example, creation of a new module from a class description of that module, creation of a new network, connection of a module to a network, and bookkeeping; and (2) inter-module communication, including creation of a new message, transmission of a message to a set of recipients, and queuing incoming messages at a module. The run-time kernel provides a system-call interface to access these services. The modules generally do not directly invoke these services; instead the description languages provide the interface to the kernel services. According to the MOP computational model, the complete definition of a given module includes information pertaining to the behavioral and structural description of the module. Information representing the structural description of a module can include the initial set of modules on a network, the initial network topology, a specification of module sharing (i.e., non-hierarchical connections), the set of modules which may connect to a network at any point in time, and specification of whether the composition of a network is fixed or changeable. Information contained in a behavioral description of a module may include the set of input message types which the module is programmed to accept, the set of output message types that the module generates, the functions which the module computes and message protocols for invoking that function, high-level protocols the module understands and the type of local controller specified for the module.

The preferred MOP operating system provides compilers for translation of the module descriptions into run-time calls to the system kernel. The description of a module allows the module to be linked into the system after it has been coded in any supported implementation language, such as LISP or PROLOG. It will be noted that, although the preferred MOP operating system and the local controllers regulating the operation of the composite modules perform similar functions, they are distinguished by the fact that the preferred MOP operating system provides a particular set of services for dealing with modules, whereas a local controller is a program that uses those services to manage a particular set of modules. The preferred MOP operating system thus provides a language and means for building local controllers.

A program listing, written in LISP, for the preferred MOP operating system is represented in Appendix I.

Focusing now on the second level of the Multilevel Architecture, level II consists of problem-solving frameworks (PSF) which are also referred to as problem-solving architectures and are analogous to conventional programming languages. Each of these frameworks is basically a system for developing modules and constitutes a language that embodies an organizing principle that enables specification of which components are to be combined and how the components are to be combined to solve a particular problem and also provides means for implementing the desired effect in a manner consistent with the specification.

A problem-solving framework represents a collection of design choices including control and resource allocation regimens, communication protocols, shared languages, and computational organizing principles. Within the Multilevel Architecture system, these design choices manifest themselves within the local controller (LC) of a module, since the LC is defined to handle these responsibilities. According to the illustrative architecture, a plurality of different frameworks are provided. Two primary problem-solving frameworks, a data flow framework and a control flow framework based respectively on the concepts of standard data flow languages and structured flowcharts, designed specifically for use with the illustrative Multilevel Architecture will be described in detail below. It will be noted that the frameworks in the illustrated system present a view of the system quite different from that underlying the preferred MOP operating system in which modules are linked to specific networks. For instance, a framework may designate certain modules as having some special significance to the global operation of the system or the framework may provide its own visual representation which totally masks the underlying virtual machine.

Referring now to FIG. 3, there is shown an illustration of the basic components of a typical framework 50 for developing modules in accordance with the system of this invention. An essential component of every framework is a module production process 52 which is capable of incorporating necessary pre-existing modules 53 and converting a module description, written in some source language, into a module 54 which is an executable specification in some object language or an executable physical form. In addition, the framework may perform optional functions that aid the module development process. For example, a framework may include a module description process 56 which responds to specifications of desired module characteristics 58 and translates these into a module description 60 suitable for input to the module production process 52 or to a module editor 62.

The module editor 62 is capable of accepting either a specification of the desired module characteristics 58 or desired changes 64 in an existing module in addition to the particular module's existing description and subsequently translating these into a corresponding updated module description. The module editor may be capable of visualizing the module or producing a module portrayal 66. A framework may also be provided with a module analysis system 68 which is capable of accepting a particular module description 60 and/or a particular module 54 in order to produce as an output data of interest, such as execution traces of data values and communications or measures of resource consumption and performance. It is apparent from the above description that, in its basic form, a problem-solving framework functions to accept as inputs desired module characteristics and catalog of modules or descriptions in order to produce corresponding outputs such as the modules themselves or their module descriptions.

Referring now to FIG. 4, there is shown the organization of a typical composite module assembled using a particular framework. As shown, a composite module 100 essentially comprises a series of component modules 102, each possessing a plurality of input/output ports 103. Each of these component modules 102 is referenced in the module description provided by the framework being used (see FIG. 3). Each composite module is provided with an internal inter-module communications system ("Innernet") 104 which functions as a system for transmitting data between a module controller, such as the local controller described above with respect to FIG. 2, and the various modules included within the composite module. The Innernet 104 is capable of accepting as input data to be transmitted and producing a resultant output which causes the specified data to be delivered to the modules which specify an interest in the data. This functionality of the Innernet is provided by the preferred MOP operating system of this invention.

Any particular computer program is preferably realized by putting most of the logic into a module controller 106 which, in combination with an associated module memory 108, implements the program control function of the module and uses the Innernet to pass data between submodules and the program inside the controller. The module controller 106 may be an interpreter of a stored program represented as data inside the module memory or may directly implement a program. It will be apparent that part of the control over message passing between the controller and the various submodules may be implemented by the Innernet itself. The module memory 108 essentially comprises a storage section for the module data 110 and an associated input/output buffer 112 for accepting and transferring the module data through an external communication interface system 114, which includes a plurality of ports 116 functioning as connectors for external inputs and outputs. It should be noted that in the embodiment of FIG. 4, the composite module is organized in such a way that all the submodules which it references lie physically inside the composite module and the Innernet which connects the various submodules and the module controller also lies inside the composite module.

Referring now to FIG. 5, there is shown an alternative embodiment of a composite module in which the module is organized in such a way that the plurality of modules 102, which are referenced within the module description, lie physically outside the composite module. In this embodiment, communication between the submodules themselves and with the module controller is brought by the Innernet 104 which itself extends outside the composite module to the submodules. The operation of the composite module and the functionality of its various components, however, remains the same.

The third level of the Multilevel Architecture incorporates software engineering tools and spans a range with knowledge processing and other functional capabilities at the lower end and skeletal systems at the higher end. Using one or more frameworks provided at level II of the Multilevel Architecture, a tool builder can specify knowledge processing modules which include capabilities such as a rule interpreter, facilities for maintaining knowledge bases, running cases, creating English-like translations of rules and other constructs, and producing explanations of system behavior. The illustrated Multilevel Architecture provides a means for organizing and controlling knowledge in other facilities towards solving a class of problems by the creation of skeletal systems which are particular sets of modules defined within particular frameworks. At the engineering tools level of the Multilevel Architecture, a skeletal system can be created by adding structure to and control over the predefined functional processing modules and their interactions with other system facilities, such as databases. The modules defined within a particular framework and for a given skeletal system are provided with mechanisms for customization with application-specific knowledge. Some of these modules may serve as place holders, which can be conveniently replaced by totally new, but functionally equivalent, application-specific modules.

In essence, a skeletal system is a partially substantiated assembly of modules for solving a class of application problems. This feature provides the Multilevel Architecture with significant advantages over conventional software engineering methodologies, which typically construct a system by starting from a programming language and building up higher-level abstractions appropriate to a particular class of application problems. For instance, the explicit identification and design of generic, skeletal systems as provided by the Multilevel Architecture provides increased modularity of systems, increased reusability of solutions or parts of solutions, easier knowledge acquisition, and easier maintenance of the application.

A specific skeletal system known as the Plan Monitoring and Replanning (PMR) skeletal system implemented for use with the Multilevel Architecture will now be described in detail in order to illustrate the various concepts involved in the Multilevel Architecture as described above. The PMR is a generic structure for adaptive replanning which addresses the specific problem of keeping track of assumptions underlying some plan so that, as situations evolve, a pending plan can be modified appropriately. Although the PMR will be described below in connection with monitoring a design for actions to achieve certain desired effects under assumed conditions, it is equally applicable for monitoring a design for a product to be manufactured to have certain desired effects under assumed conditions.

The PMR system is capable of analyzing a plan to determine its assumptions about the world, monitoring a database describing the unfolding world situation, looking for key assumptions that no longer hold, incrementally replanning around these problems, and keeping selected agents informed of important changes in the situation and the plan. As is the case with all skeletal systems designed for use with the illustrated Multilevel Architecture, the PMR skeletal system is independent of any particular application or application domain.

The PMR skeletal system will be described with respect to its design on the basis of a data flow framework ("DF" framework) which is one of the problem-solving frameworks available at level 2 of the illustrated Multilevel Architecture. The DF framework implements many of the concepts found in standard data flow languages and for more information on these concepts, the reader is referred to the article entitled, "Data Flow Program Graphs," by Davis, A. L., IEEE Computer 15(2): 26-41, February, 1982. DF is a graphical language for expressing data flow programs; a program for the DF framework consists of a number of independent processing modules which perform computations and communicate with each other and the outside world. The DF framework includes special data structuring techniques which support the use of abstract data types (ADT) as tokens passed between processing modules. A semi-deterministic scheduler is also provided for supporting the building of programs with side effects, such as communication with external environments.

DF permits graphical expression of data flow programs and a DF program consists of nodes connected by arcs. In the DF framework, a knowledge-processing module is represented as a node in a DF graph and consequently takes a set of inputs and computes a set of outputs. Another type of node in a DF graph is a "place" which accepts a single input and generates a set of outputs. The various nodes in a DF graph are linked by data connections or data links. A data link indicates the outputs and inputs of a module and connects a module to a place or a place to a module. As in conventional data flow languages, computation in a DF program proceeds by the passing of tokens between modules. Specifically, ADT instances, also known as data tokens, flow along the data links and the various processing modules accept data tokens as inputs and produce new data tokens as outputs, with all data tokens being defined to reside in corresponding place nodes.

A given module is defined to be enabled when a data token resides in each of its input places. The combination of a module and a set of data tokens that enable it are called an enablement. In the DF framework, a module may be enabled more than once simultaneously, provided that more than one token is present in every one of the module's input places. When a data token participates in an enablement, the token is said to be bound by that enablement and no data token is permitted to contribute to more than one enablement. Computation proceeds by the execution of modules, and only enabled modules are permitted to be executed.

A DF interpreter is provided for executing a module, whereupon it passes the input data tokens that enabled that module to the module as input parameters. During the course of its execution, a module is permitted to create ADT instances for any of its output places and upon completion of execution, the module returns control to the interpreter along with its output tokens. The DF interpreter subsequently time stamps the output tokens and moves them into their respective places.

The DF framework supports source modules which are modules that have no data inputs and are always enabled and are hence handled specially. When a source module completes execution, it is capable of generating new output data tokens. Source modules within the DF framework model external asynchronous occurrences, such as clock ticks or other random events. Since every token is time stamped by the DF interpreter as it is created, no two tokens can have the same time stamp and consequently it is possible to compare the age of two tokens by comparing their respective time stamps. The DF interpreter is also responsible for selecting an enabled module for execution and then executing it with appropriate input and output parameters. It then recalculates the set of enabled modules and loops.

The selection or scheduling of an enabled module for execution is an important aspect of this process and is implemented by a DF scheduler. The DF scheduler maintains two internal data structures, namely an ordered list of all enabled modules, and a circular queue of source modules. The list of enabled modules also contains the set of data tokens that enabled the module. Provision is made for a module to be listed multiply as long as a disjoint set of data tokens is available for each occurrence. The scheduler maintains a priority ordering of the enabled module queue on the basis of the age of the data tokens that enable a module. Comparison of two enablements is performed by the DF scheduler on the basis of the following procedural steps:

1. The oldest token in each of the enablements are selected for comparison. If one token is found to be older than the other, the enablement from which it is derived is assigned a higher priority. If the tokens are found to be of the same age, i.e., they are the same token, the next oldest token is compared. This procedure is continued until an age difference between compared tokens is noted.
2. If the comparison procedure is not conclusive after all tokens in a particular enablement have been compared, that enablement is assigned a higher priority.
3. If two compared modules are found to have identical enabling data token sets, a higher priority is assigned at random to one of the two modules.

The DF scheduler monitors the enablement of new modules by the creation of new tokens and places new enablements into the priority queue at the appropriate location by using the priority ordering procedure described above. In addition, the scheduler manages a circular queue of all source modules. Since the DF interpreter considers source modules as being continuously enabled, the DF scheduler must treat source modules specially in order to prevent source modules from always being assigned the highest priority on the basis of the above priority ordering rule. Any time a source module is to be selected for execution, the DF scheduler is programmed to select the first source off the queue and when the selected module finishes execution, the scheduler returns it to the end of the queue. This procedure ensures that all source modules execute in turn once before any source module is allowed to execute again.

The operation of the DF interpreter will now be described under the assumption that a particular DF graph has been initialized with some data tokens and that the DF scheduler has added all enabled modules to the priority queue. The DF interpreter then executes modules according to the procedural steps outlined in the flow diagram of FIG. 6.

Figure 6:
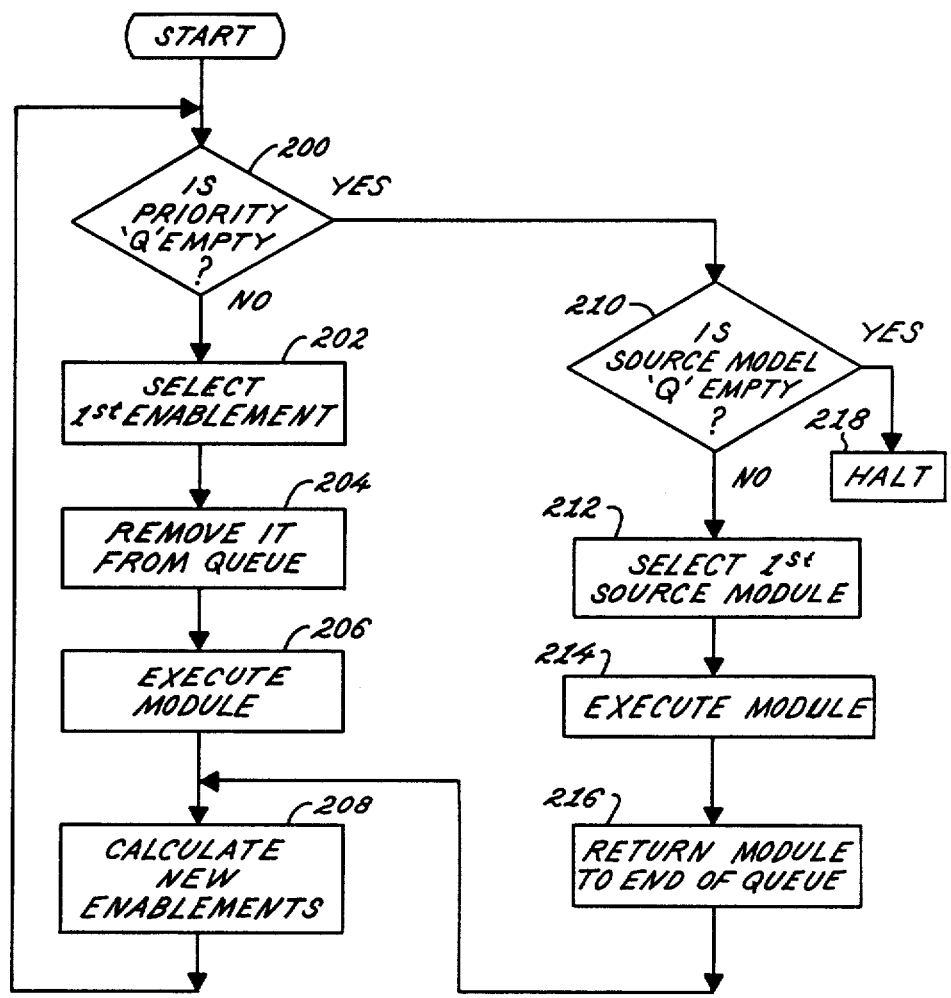
FIG. 6 is a flowchart representation of the sequence of operations undergone by a data-flow (DF) interpreter in executing a module.

As shown in FIG. 6, the initial step 200 taken by the DF interpreter is to check whether the priority queue is empty. If the answer is found to be no, i.e., the priority queue contains at least one instance of enablement, step 202 is accessed whereby the interpreter selects the first enablement from the priority queue and then removes it from the queue at step 204. At the succeeding step 206, the selected enabled module is executed and at step 208 the DF interpreter calculates any new enablements resulting from the creation of new data tokens as a result of the execution. Subsequently, the program returns to step 200 in order to proceed with the selection, removal and execution of the succeeding enablements within the priority queue until the queue is empty.

If the priority queue is found to be empty at step 200, step 210 is accessed where the DF interpreter checks to see if the source model queue is empty and, if the answer is found to be yes, the action of the interpreter comes to a halt at step 218. However, if the source module queue is found not to be empty at step 210, step 212 is accessed where the interpreter selects the first source module in the queue, executes the selected source module at step 214 and subsequently returns the executed module to the end of the source model queue at step 216. The DF interpreter returns to step 208 in order to calculate again any new enablements resulting from the creation of new data tokens as a result of execution of a source module.

When the DF scheduler selects a module for execution, control is handed over to an executor in order to execute the module. The executor has the responsibility for passing the module its correct input parameters, collecting and distributing its output parameters, and notifying the scheduler of any new enabled modules. Execution of a module hence occurs as a result of the DF scheduler calling the executor when a module enablement takes place; upon being called, the executor calls the module with all of its input data tokens. When the module returns from execution, the executor time stamps and distributes the output tokens and finally checks for newly enabled modules and notifies the scheduler of newly established enablements. When the executor distributes a time-stamped output token to a place, it actually produces several virtual tokens, one for each arc leading out of the place, with all virtual tokens pointing to the same physical token. This type of mechanism ensures that every module that has a particular place as its input can process every token coming into that place. If it is found that more than one unbound token can contribute to the enablement, the executor selects the oldest token. The executor then informs the scheduler of the new enablement.

Program listings, written in LISP, for the DF framework and its various segments are represented in Appendix II.

With the above understanding of the data flow framework, a detailed description of the PMR skeletal system, as implemented in the DF framework, and the various modules that it comprises, is now described below.

According to the illustrated Multilevel Architecture, the PMR system is a generic skeletal system for adaptive replanning and is defined to be independent of any particular application or application domain. The PMR system is capable of accepting an input plan and analyzing is to determine its key assumptions about the world, monitoring a database describing the unfolding world situation, looking for key assumptions that no longer hold, incrementally replanning around the problem, and keeping selected agents informed of important changes in the situation and the plan.

Figure 7:
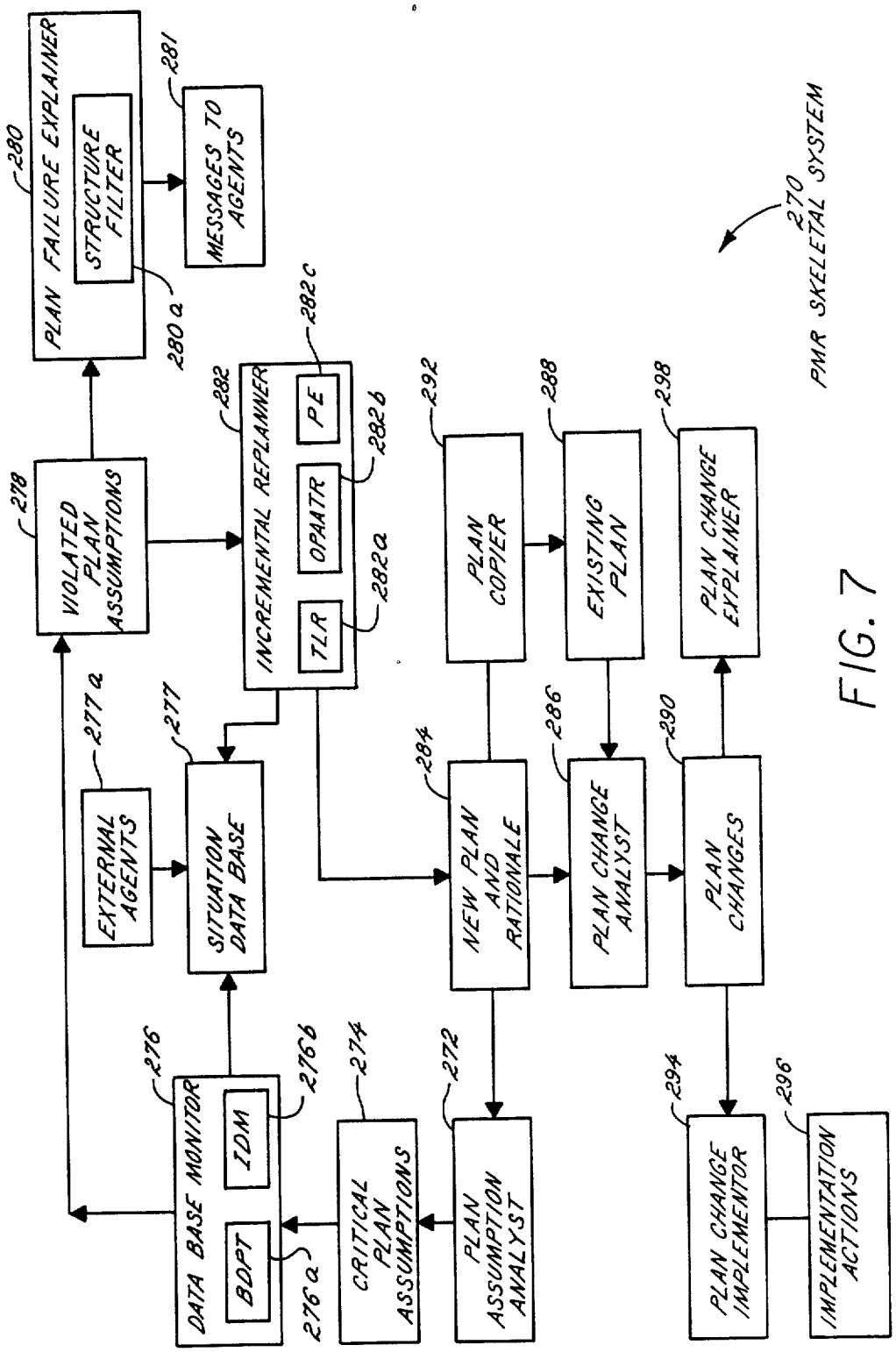
FIG. 7 is a modular illustration of a plan monitoring and replanning (PMR) skeletal system for use with the illustrated Multilevel Architecture.

Referring now to FIG. 7, there is shown a modular representation 270 of the data flow version of the PMR skeletal system. A plan assumption analyst (PAA) 272 is provided for accepting a new system plan that has to be monitored over time and replanned adaptively, if needed. This module determines what assumptions are built into the plan so that a database representing the world or application environment for the plan may be monitored in order to determine whether a particular assumption no longer holds. More specifically, the PAA module is capable of analyzing the structure of the plan, looking for prerequisites that the plan's own actions cannot guarantee; the analyst defines such prerequisites to be critical assumptions of the plan. For example, consider the case of a plan within which an airplane first takes off and then flies from a defined origin to some distant designated location. If the flying action has as a prerequisite the fact that the plane be airborne, the PAA can ascertain that the execution of the plan in general and, in particular, the prior execution of the take-off action, will by itself satisfy that prerequisite. However, if the take-off action has as its prerequisite the fact that the plane be available and there is no action in the plan itself that produces such a result, the PAA will include the availability of the plane as a critical assumption. On a functional level, the PAA accepts a system plan and its corresponding rationale as its input and provides a set of beliefs or critical plan assumptions 274 necessary for the elements of the plan to be effective as its output.

The critical plan assumptions 274 are accepted by a database monitor (DBM) 276 which actively verifies them against a situation database 277 and monitors the database for any subsequent updates via external agents 277a in order to detect and report any violated plan assumptions 278. The database monitor 276 itself is composed of two significant submodules, a belief-to-database pattern translator (BDPT) module 276a and an internal database monitor (IDM) module 276b.

The belief-to-database translator 276a translates the assumptions upon which a system plan is based into database queries. The database provided with the database monitor 276 contains information about the current state of the world. The BDPT module accepts as input a belief, a database schema, and a target query language in order to produce an intermediate result comprising an expression translatable to database queries equivalent to the stated belief. Subsequently, the BDPT module produces as its output a set of queries in the target query language that will return true/false/degree of truth status of the belief and paired sets of forms representing the response and interpretation, respectively, that characterize each possible result.

The internal database monitor (IDM) module 276b monitors the database using the queries generated by the BDPT module. The database is updated asynchronously by other agents and sensors, and is periodically polled by the PMR system.

The DBM module 276 accepts a set of pattern-action rules as its input and generates intermediate outputs comprising a set of queries to the database. Intermediate inputs comprising the database data in response to the queries are subsequently used by the DBM to generate the actions of rules satisfied by database patterns as its ultimate outputs.

Any violated plan assumptions 278 detected by the DBM 276 are communicated to a plan failure explainer (PFE) 280 which is a module for communicating the problems in the plan to concerned agents 281 and presenting the points of interest to those agents. The medium of presentation may be via radio test, graphics or other such media, depending upon the particular information to be communicated. The PFE module accepts as its input a set of violated plan beliefs or assumptions, a target recipient list, and a selection rule set indicative of the extent of interest to be attached to particular violated plan assumptions. In response, this module causes messages to be sent to the targets containing a translation of the interesting part of the set of violated beliefs, where the translation is appropriate for the recipient and formatted for a particular device through which the messages are to be delivered.

The PFE module 280 includes a submodule called the structure filter 280a which functions to select particular parts of the set of violated plan assumptions on the basis of predefined interest patterns by implementing a general pruning of a data structure. The structure filter module accepts as inputs a data structure, a corresponding data type description and selection rules defining a particular pattern to be excluded or included in the pruning of the data structure. This module includes an internal table specifying methods for building up a new structure of the given data type by joining included elements of the given data structure. In response to its inputs, the structure filter module generates as an output a copy of the interesting portion of the initial structure.

The violated plan assumptions 278 determined by the DBM 276 are also fed to an incremental replanner module 282 which attempts to patch the old plan in order to eliminate the assumption violations and, if successful, generates a revised plan. This module 282 applies predefined rules in order to patch each instance of plan failure in turn, until the resulting plan meets the requirements and is satisfactory for the given conditions. The incremental planner includes three submodules including a top level replanner (TLR) module 282a, a one-problem-at-a-time replanner (OPAATR) module 282b, and a plan evaluator module (PE) 282c.

The top level replanner (TLR) module 282a selects the order of plan failures which are to be patched around. This module accepts as its input a tree of violated plan assumptions or beliefs and generates as an intermediate output a selected plan failure that has to be fixed. It also generates a succession of revised plans and rationale as intermediate results prior to generating a final output comprising a patched plan and its accompanying rationale.

The one-problem-at-a-time replanner (OPAATR) module 282b functions to fix a single problem within the plan. This module accepts as its inputs a plurality of plan-patching rules capable of combining a predefined planned result with a violated assumption and other prerequisites in order to produce a modified plan; a set of beliefs; a plan and its rationale; and a designated plan failure to be fixed, as defined by the top level replanner. In response to these inputs, the one-problem-at-a-time replanner module generates an output comprising a modified plane and its rationale.

The plan evaluator (PE) module 282c determines when a particular patch plan is acceptable as a new plan. This module accepts at its input a plan; defined requirements which serve as hard constraints; defined preferences serving as soft constraints; a combining function for preferences; and an acceptability test serving as a threshold of plan "goodness." The plan evaluator module, in response to these inputs, produces outputs comprising a set of plan failures; a composite rating of plan "goodness"; and the result of the acceptability test.

The incremental replanner module 282, in response to the violated plan assumptions 278 and by staying in contact with the situation database 277, produces a new plan with its rationale 284 which can then be fed back to the plan assumption analyst 272 in order to repeat the main PMR cycle in concurrence with other related activities. The PMR skeletal system also includes a plan change analyst (PCA) 286 which accepts the new plan 284 with its rationale along with the existing old plan 288 and its rationale in order to determine what element in a given plan has changed so that these plan changes 290 may be communicated efficiently to the agents that will follow the plan. The PCA module 286 accepts as its input an old plan; a new plan; and a plan interpretation rule set and generates an output comprising a plan change description.

A plan copier (PC) module 292 is provided for making a copy of a new plan emerging as a result of the patching process. This copy serves as an old plan after another revision of an existing plan occurs. Although this copy function can be implemented implicitly within the DF framework, making the copy operation explicit and separately implementable by the PC module makes the flow of data and its control more understandable from a user's point of view. The PC module accepts a specified plan as its input and generates a copy of the input plan as an output.

A plan change implementer module 294 is provided for communicating new instructions arising as a result of the plan changes 290 to those agents whose role in the plan has changed. This module accepts as its input a plan change description; a set of dispatch rules specifying the particular action to be implemented in response to a particular type of plan change, and a set of exception rules defining the notification or particular actions to be undertaken if a given type of plan change is found to be undispatchable. In response to these inputs, the module generates as its output a series of implementation actions and a series of exception-handling actions.

The plan changes 290 determined by the PCA module 286 are also communicated to a plan change explainer (PCE) module which functions to communicate changes of interest in the plan to various agents presenting only the parts of interest to a particular agent, the medium of presentation being dependent upon the information being communicated as well as the available device (text, graphics, etc.). This module accepts as its input the plan charge description, a set of plan actions, a set of plan implementation exceptions, the set of belief changes that motivated the replanning, a selection rule set indicative of the extent of interest, and a set of target recipients. The output generated by this module 298 comprises messages to the target recipients describing parts of interest of plan changes, justifications for these plan changes, plan implementation changes, plan implementation exceptions, and the corresponding changes in assumptions leading to the plan changes.

Program listings, written in LISP, for the plan monitoring and replanning (PMR) skeletal system and its various component modules are represented in Appendix VI.

In the data flow (DF) framework implementation of the PMR skeletal system, the operation of the PMR system is specified by specifying the modules and abstract data types (ADT's) used by the PMR and their interconnections. The DF framework provides implicit control over the execution of modules by monitoring token (data) flow. As described above, when a module has at least one token for each of its inputs, it changes to an enabled state and the DF interpreter selects one enabled module for execution, and then checks to see if any new modules have been enabled. It will be noted that the ordering of module execution is entirely determined by the data connection between modules.

The DF framework thus has certain inherent limitations because of its data-triggered nature. A system architect cannot force one module to execute before another unless there is a data flow link between them. When modules have side-effects, such as communicating to users or changing the state of the external world, control over the order of side-effects is critical. For example, when the database monitor produces some violated plan assumptions, both the incremental replanner and the plan failure explainer simultaneously become enabled. The system architect has no way of asserting that the failure explainer should execute first, telling interested agents what went wrong with the plan before replanning around those failures.

According to a feature of this system, limitations of the above type are significantly reduced by an alternative implementation of the PMR skeletal system that permits the system designer to specify explicitly the control flow in a system. In such a system, a module executes when the module preceding it finishes execution. Other modules can select among different control paths, causing a branching in the control flow. Still other modules explicitly start and halt execution of the system. This alternate embodiment of the PMR system is based upon a procedural module control (PMC) framework.

Figure 8:
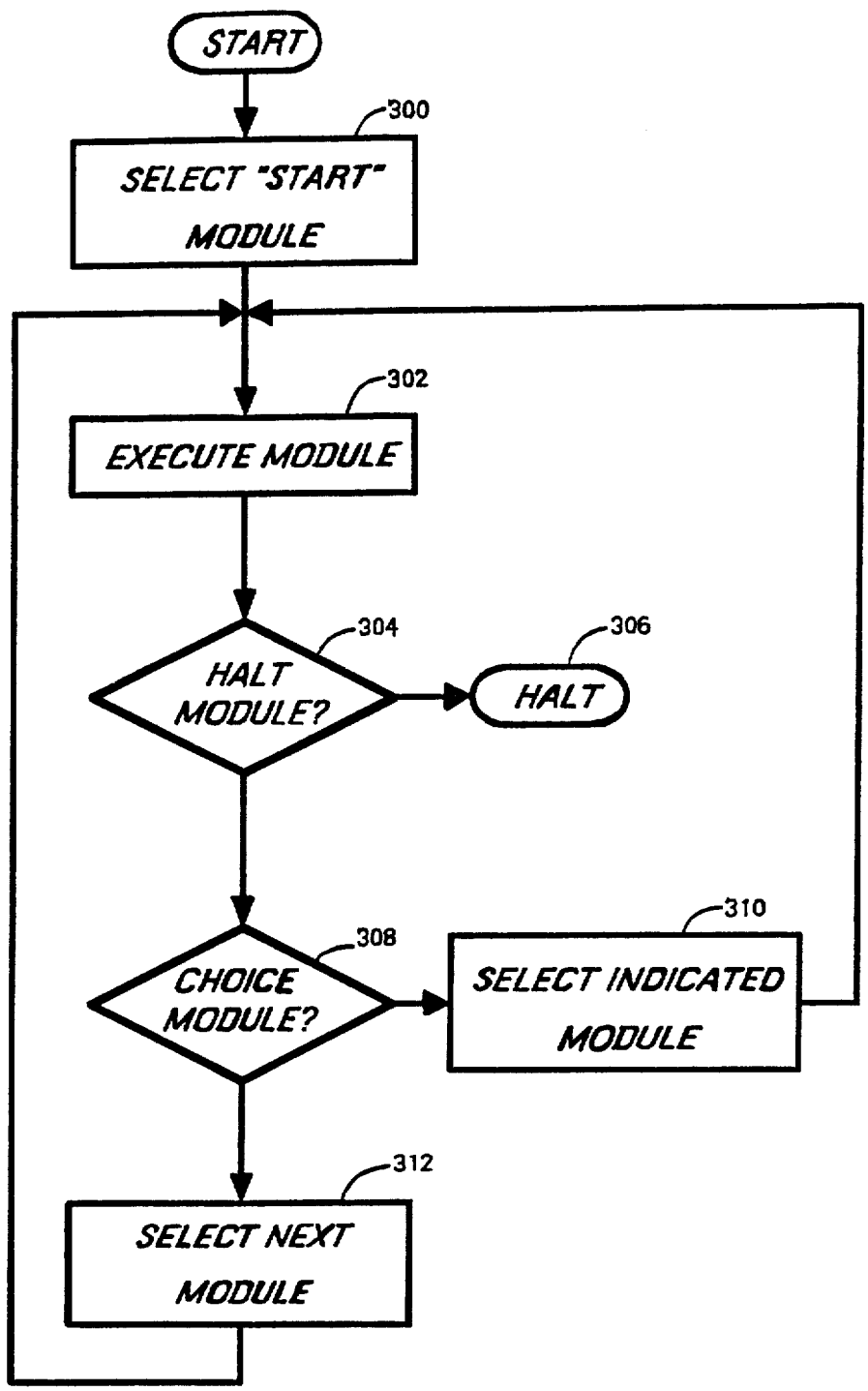
FIG. 8 is a flowchart representation of the sequence of operations undergone by a procedural module control (PMC) interpreter in executing a module.

Referring now to FIG. 8, there is shown a flowchart indicating the steps the PMC interpreter goes through executing a module. The initial step 300 is to select the unique module labeled START. At the next step 302 the module is executed. At the next step 304 the interpreter tests if the module has been designated a halt module, and if so, the interpreter halts 306. If the module is not a halt module at step 304, it is tested at step 308 to determine if the module is a choice module. If it is, the interpreter at the next step 310 examines the value returned by the choice module when it was executed and selects the next module for execution based on that value. That module is then executed by the interpreter at step 302. If the module tested at step 308 is not a choice module, the interpreter at step 312 selects the unique next module following the just-executed module for execution at step 302.

Program listings, written in LISP, for the PMC framework are represented in Appendix III.

Under the PMC implementation, the database monitor of the PMR has a link pointing from it to the plan failure explainer, and from the plan failure explainer to the incremental replanner. This necessarily causes the plan failure explainer to execute before the incremental replanner. The implementor of the PMR can change the order of execution of other modules as well. For example, the plan change explainer can be made to run either before or after the plan change implementor, at the discretion of the system implementor. This provides great flexibility in controlling the overall operation of the PMR system.

The PMC framework thus provides a means for adding knowledge for controlling the sequence of actions involved in solving applications related problems; an operation which is difficult and at times impossible in the DF framework. It will be noted that since the implementation of modules in the illustrated Multilevel Architecture is separated from the framework used to combine them, it becomes possible to use in the PMC framework the same modules that have been defined for and used with the DF framework. In essence, the Multilevel Architecture provides a plurality of techniques for composing modules. For instance, modules assembled in one framework can hierarchically embed modules assembled in a different framework so that systems in one framework can contain modules that themselves contain subsystems implemented in some other framework. As an extension of this technique, the framework independent composition of the modules also allows the "meshing" of modules whereby systems implemented in different frameworks can conveniently be interconnected by sharing modules.

Figure 9:
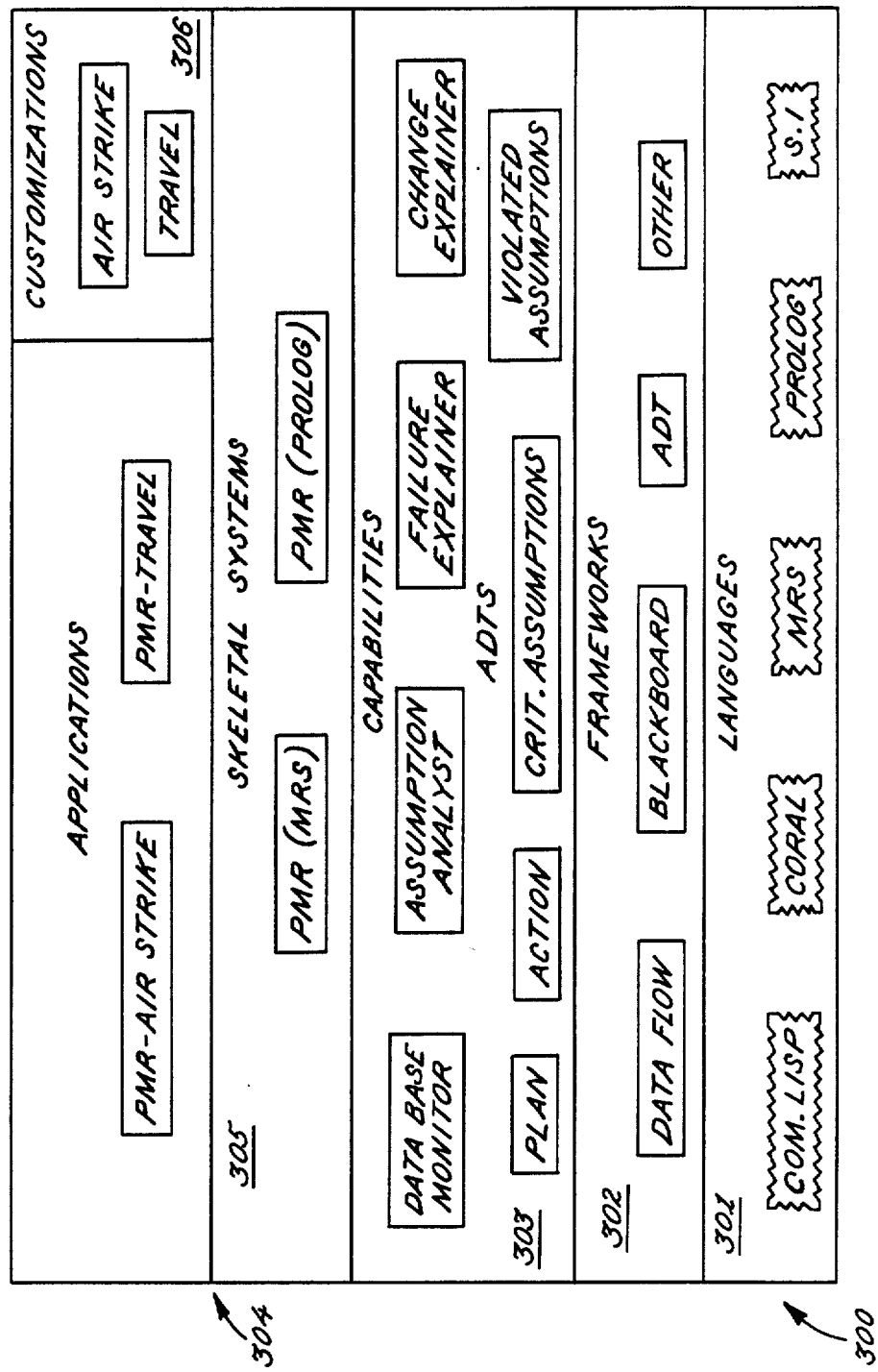
FIG. 9 is an illustration of a catalog or menu of components provided at various levels of the Multilevel Architecture of FIG. 1.

Referring now to FIG. 9, there is shown a catalog 300 of components provided at various levels of the illustrated Multilevel Architecture and which a system developer can use to construct a system by selecting, combining and refining specific components, as well as creating and storing new components when necessary. At the lowest level 321, there is provided a variety of programming languages including COMMON, LISP, PROLOG, CORAL (an object-oriented language developed by Teknowledge, Inc. of Palo Alto, Calif.), MRS (a knowledge representation and manipulation language developed by Stanford University; for further details, see "The Complete Guide to MRS", Rothschild, S., Technical Report KSL-85-12, Stanford University, 1985), and S.1 (a higher-level knowledge engineering shell which is a commercial product of Teknowledge, Inc. of Palo Alto, Calif.). The next level 322 houses the various frameworks which represent the different ways in which modules can be implemented. These include the data flow (DF) and control flow (PMC) frameworks that have been discussed above. The set of facilities for abstract data types (ADT's) may also be considered to be a framework. Another framework known as the transaction (TX) framework, which is especially applicable to the implementation of a server module (such as a database) that has one or more recipient modules, is also included.

Program listings, written in LISP, for the TX framework, and the logical formulae and plans for the ADT's are represented in Appendices IV and V, respectively.

A collection of modules of various capabilities 323 is provided above the frameworks. These include the actual ADT facilities such as modules representing a plan, action, critical assumptions and violated assumptions. Other capabilities are provided by modules representing the database monitor, the assumption analyst, the failure explainer and the change explainer.

At the highest level 324, skeletal systems 325 are provided and include the plan monitoring and replanning system (PMR), containing a situation database capability alternately implemented in two languages, MRS and PROLOG. Using the various capabilities 323, it is possible for a knowledge engineer to create different skeletal systems by adding structure to and control over the knowledge processing modules and their interactions with other facilities such as databases. The illustrated Multilevel Architecture also provides different "customizations" 326 which incorporate customizing knowledge for different domains and which can be used to build specific applications by customizing a selected skeletal system. More specifically, a knowledge engineer can customize a skeletal system for a particular application domain by replacing some of the generic constructs with more appropriate terms. For instance, an "Air Strike" (AS) customization is provided for customizing the PMR skeletal system to the application domain involving the planning of offensive air strike missions. In this application domain, the generic constructs of a particular implementation of the PMR are replaced by appropriate terms such as "flight", "target", and "ordnance" in order to yield a customized skeletal system called AS-PMR. Finally this customized skeletal system is augmented with knowledge of specific objects and relationships to create a domain-specific application system. In the case of the air strike customization of the PMR skeletal system, this domain knowledge includes such information as characteristics of particular aircraft models, targets, and ordinances. The domain-specific knowledge can also include the particular rules which govern the interaction of the defined characteristics, such as rules designating conditions under which a particular ordnance is available on a particular aircraft and the ability of the aircraft to destroy a particular target.

It will be noted that the ability to customize generic skeletal system structures allows standard components to be reapplied to applications which may differ dramatically in their specific domain characteristics, by using an appropriate customization which includes definitions for actions and states, plan structures, and example test-case plans and situations specific to the various applications. For example, the same PMR skeletal system used for the air strike application can be customized to a "Travel Planning" application by using the "Travel" customization which provides appropriate domain-specific knowledge pertinent to the handling of the trips from a traveler's home to one of a predefined set of hotels in a selected city.

The "Travel" customization demonstrates a number of the features of the PMR system and its method of implementation. The "Travel Planner" uses a PMR skeletal system including composite module definitions of the "Situation Monitor" and "MRS Replanner" in Appendix VII, core primitive module and abstract data type definitions in Appendix VIII, and definitions of underlying functions in Appendix IX. The skeletal system is customized by the addition of definitions of Travel Plan Actions and Data Inputs (including initial values for the situation data base) listed in Appendix X, along with the Plan Failure Explainer Rules of Appendix XI and the Plan Change Explainer Rules of Appendix XII.

The Travel Plan Actions of Appendix X define the general structure of the travel plan, and parameters referred to in the Travel Plan Actions take on values which further define a specific plan. The actions include "go-to-airport," "take-flight," "go-to-hotel," "check-in," and "get-settled." The actions are defined as a hierarchy; for example, the action "get-settled" includes an ordered sequence of the actions "go-to-hotel" and "check-in."

In order to make a plan from an ordered sequence of actions, a function named "tp-make-plan" is also defined in Appendix II. In addition to a list of actions defined for the function, "tp-make-plan," there are defined at least one goal indicating the desired result of the plan to be made, and at least one set of choices for parameters which assume values to further specify the actions for implementing a specific plan. As shown on page 2 of Appendix X, a set of choices named "*tp-plan-1*" defines a plan for traveling from Menlo Park to Boston via flight AA-437, and a set of choices named "*tp-plan-2*" defines an alternative plan for traveling from Menlo Park to Boston via flight AA-453.

To be valid, the steps in the plan must be consistent with changing situations. In order to determine consistency, there is defined on page 3 of Appendix X a parameter named "*tp-consistency*" which, for example, indicates whether a succeeding step in a travel plan originates from the destination of an immediately preceding step in the plan. In order to determine consistency of the plan with changing conditions, there is also defined a parameter called "*tp-situation*" for monitoring the situation data base for changes in flight schedules, hotel room bookings, and ground transportation availability. Also shown on page 3 of Appendix X is a listing of the "Facts and Current States" which define the original world situation stored in the situation data base.

Shown in Appendix XI are Plan Failure Explainer Rules. The general nature of the Plan Failure Explainer is characterized by a shared rule named PRINT-INTRO which concludes that a certain plan will fail because a particular critical assumption is false which prevents a certain step or action from being properly implemented. Specific travel planning rules, shown on page 2, are provided to test for respective critical assumptions, including the assumptions that a traveler is able to go to an airport, take a flight, go to a hotel, and check in at the hotel. A general rule named GENERIC-PRINT-VPA is provided for explaining in English the pertinent criticality in the event of plan failure.

As shown in Appendix XII there is provided a Plan Change Analyst Rule named "compare-plans" which identifies changes between an original plan and a modified plan by comparing the old and new values of predefined parameters of a general plan, and explains the changes in English following the comment "Changes in Plan:."

Figure 10:
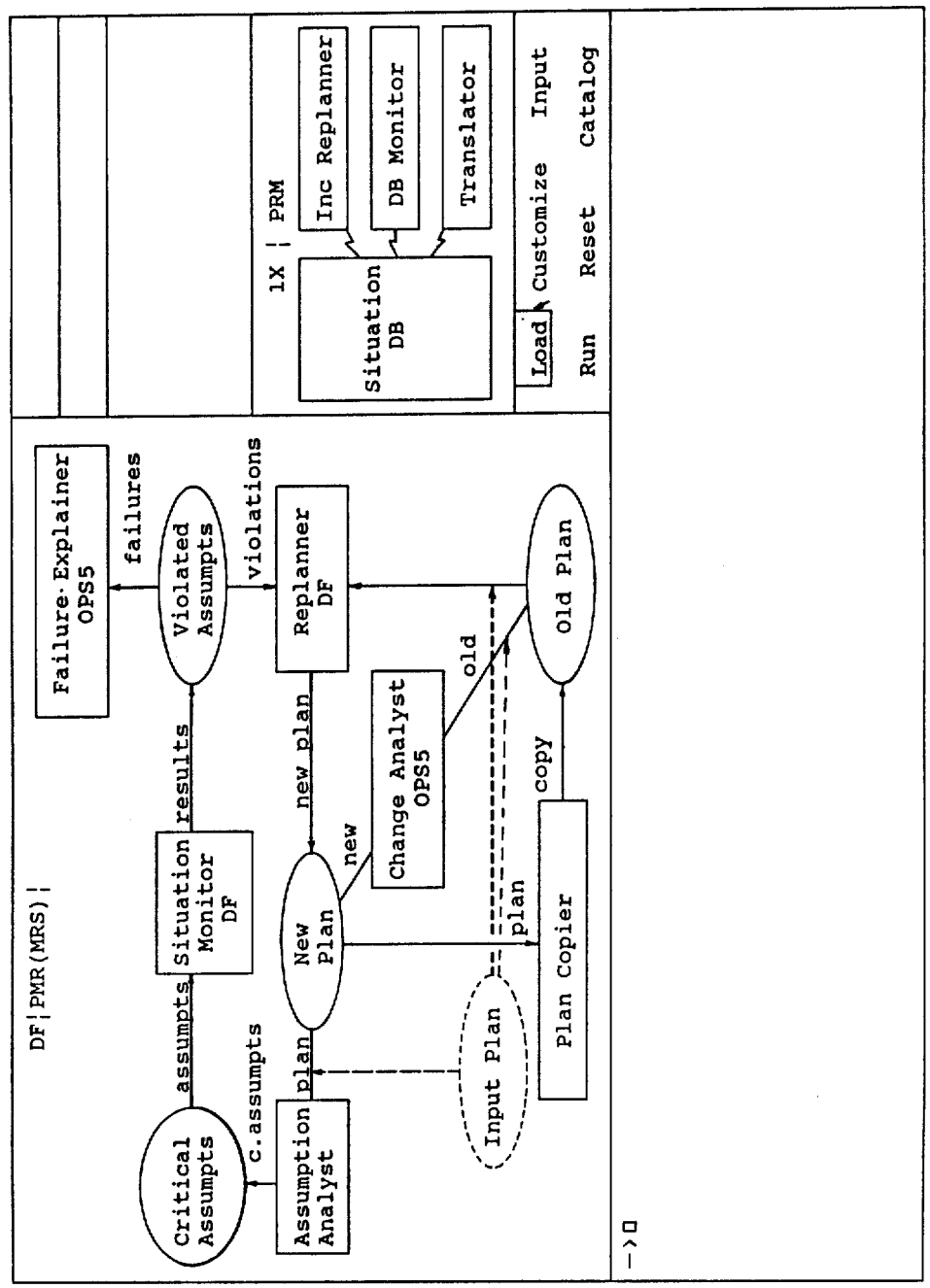
FIGS. 10 to 22 are successive screen displays during a trace of one cycle of a "PMR Travel Planner" incorporating the present invention.
Figure 11:
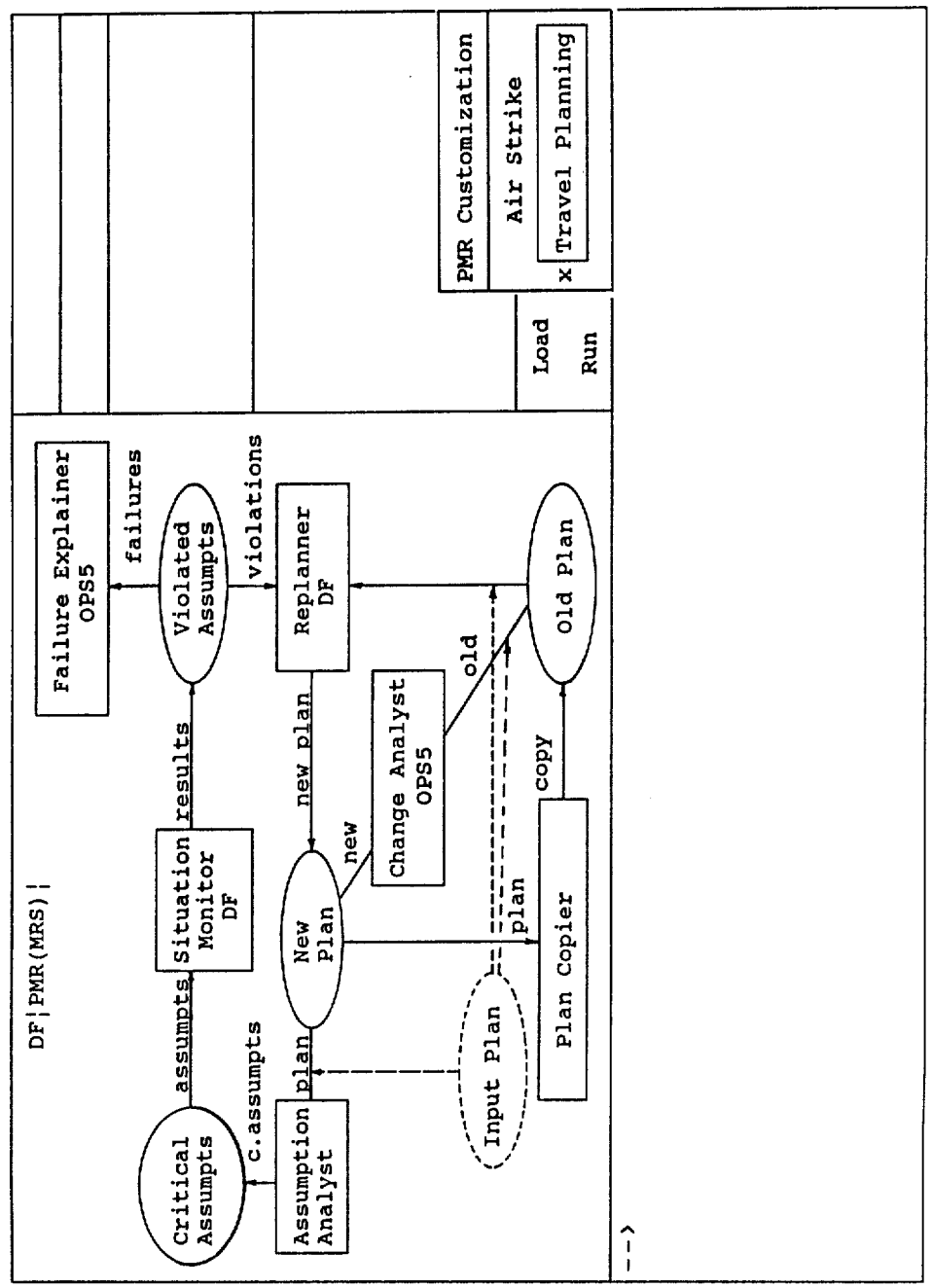
Figure 12:
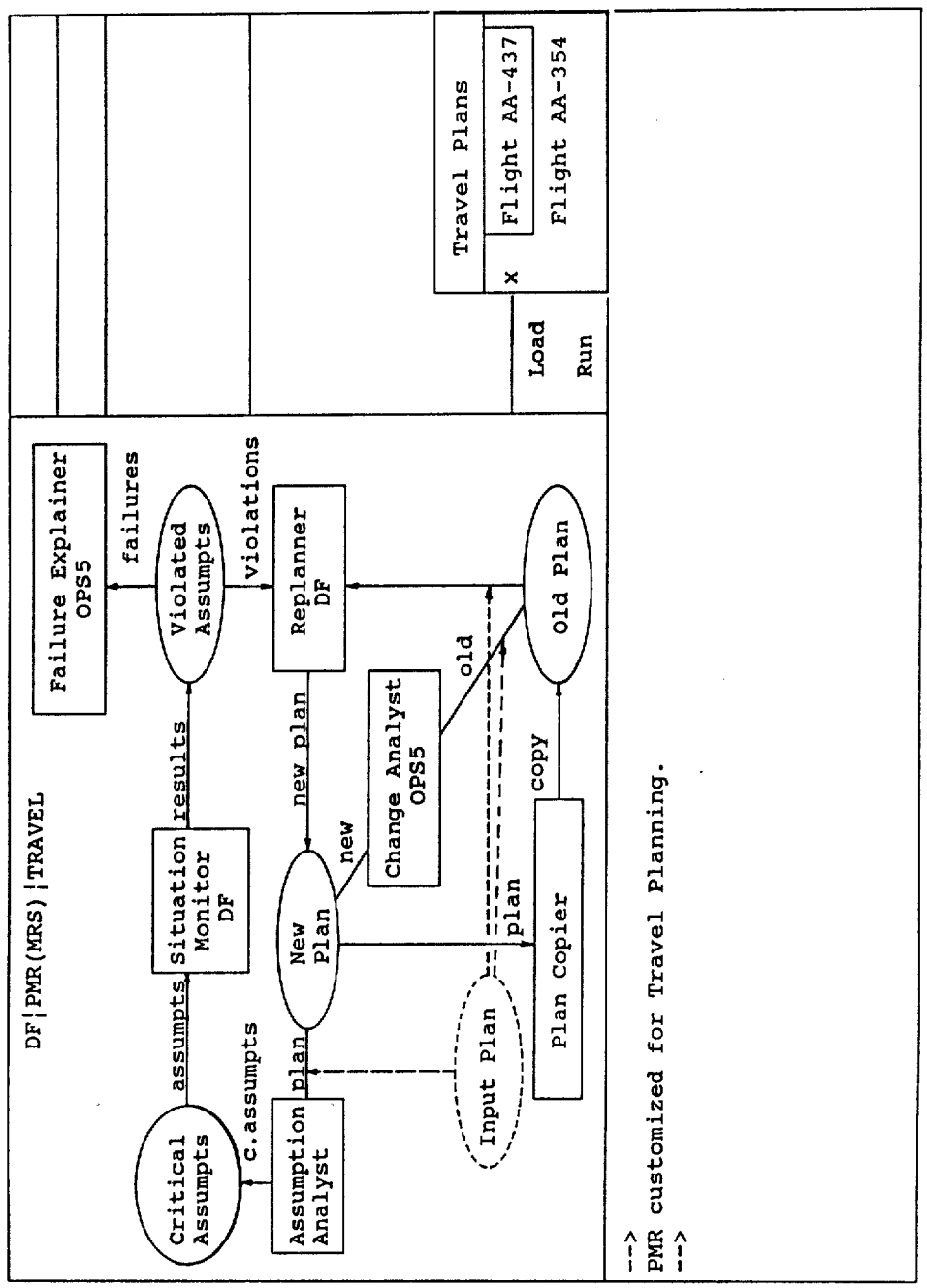
Figure 13:
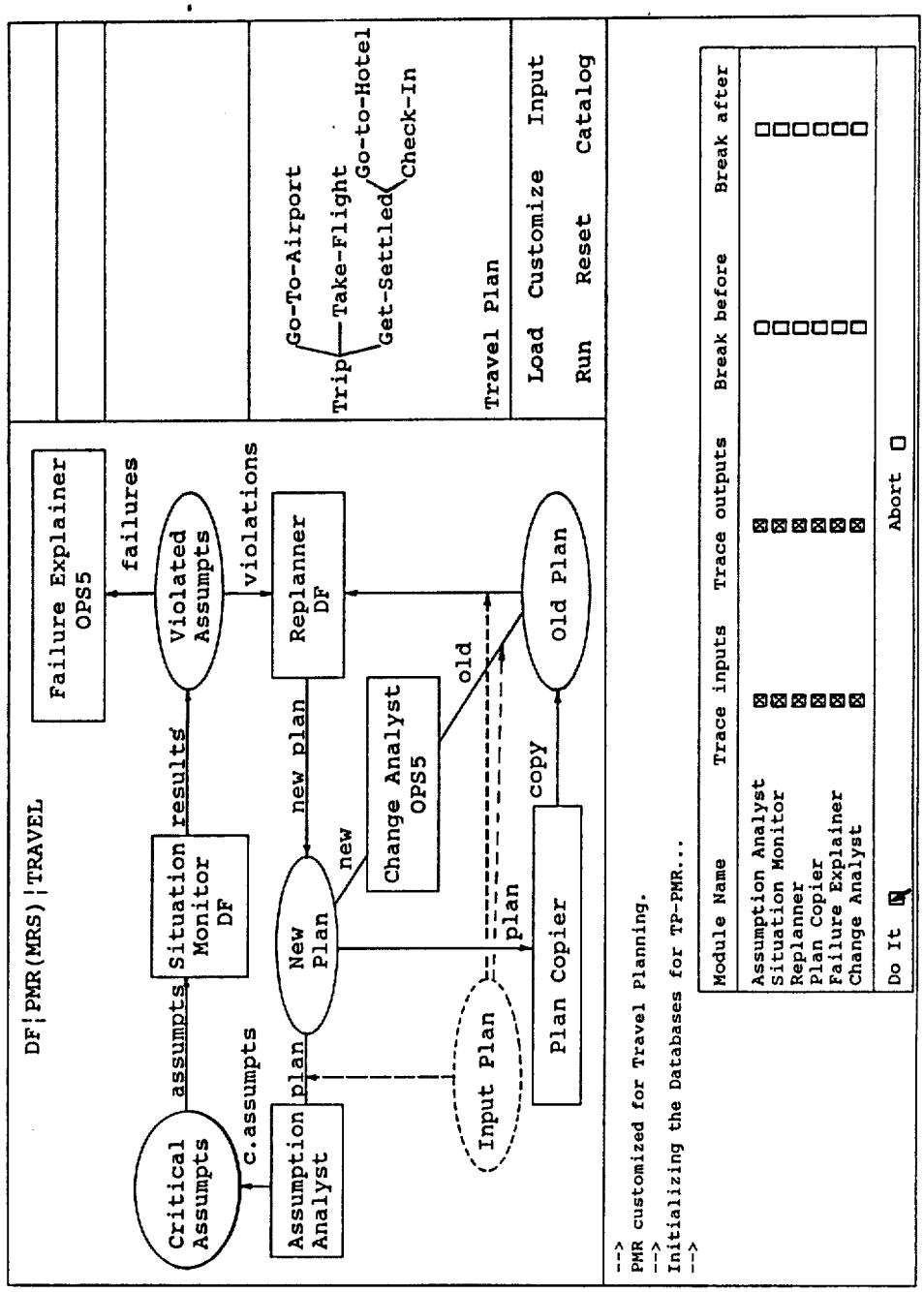

The operation of the Travel Planner is further illustrated by the trace listing in Appendix XIII which corresponds to the output display screen listing in FIGS. 10 to 22. FIG. 10 shows the data flow version of PRM being selected for execution. Next, in FIG. 11, the Travel Planning customization of PRM is selected. In FIG. 12 the user selects the first predetermined travel plan for flight AA-437. The selected plan is then displayed as a hierarchy, as shown in FIG. 13.

Figure 14:
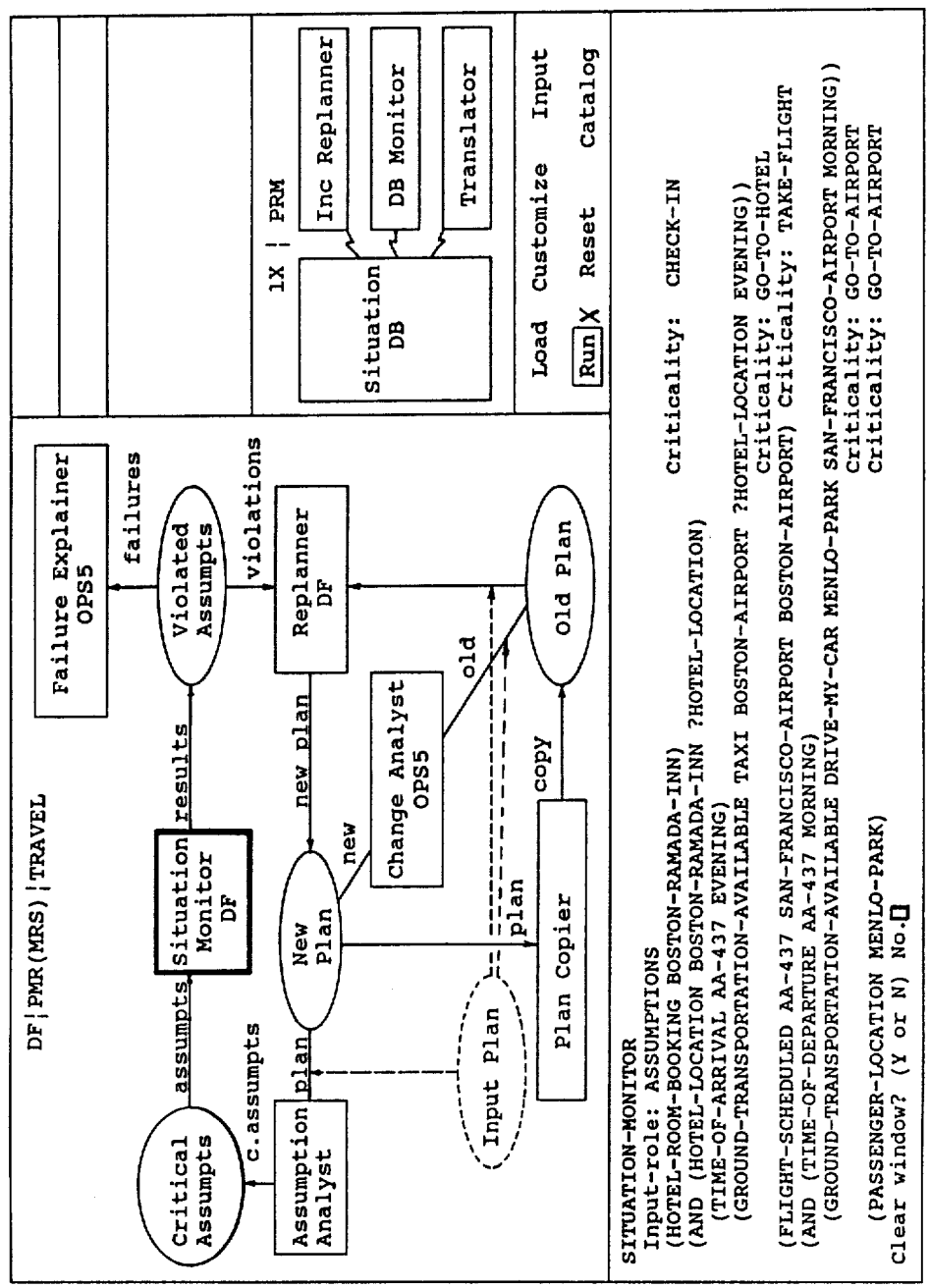
Figure 15:
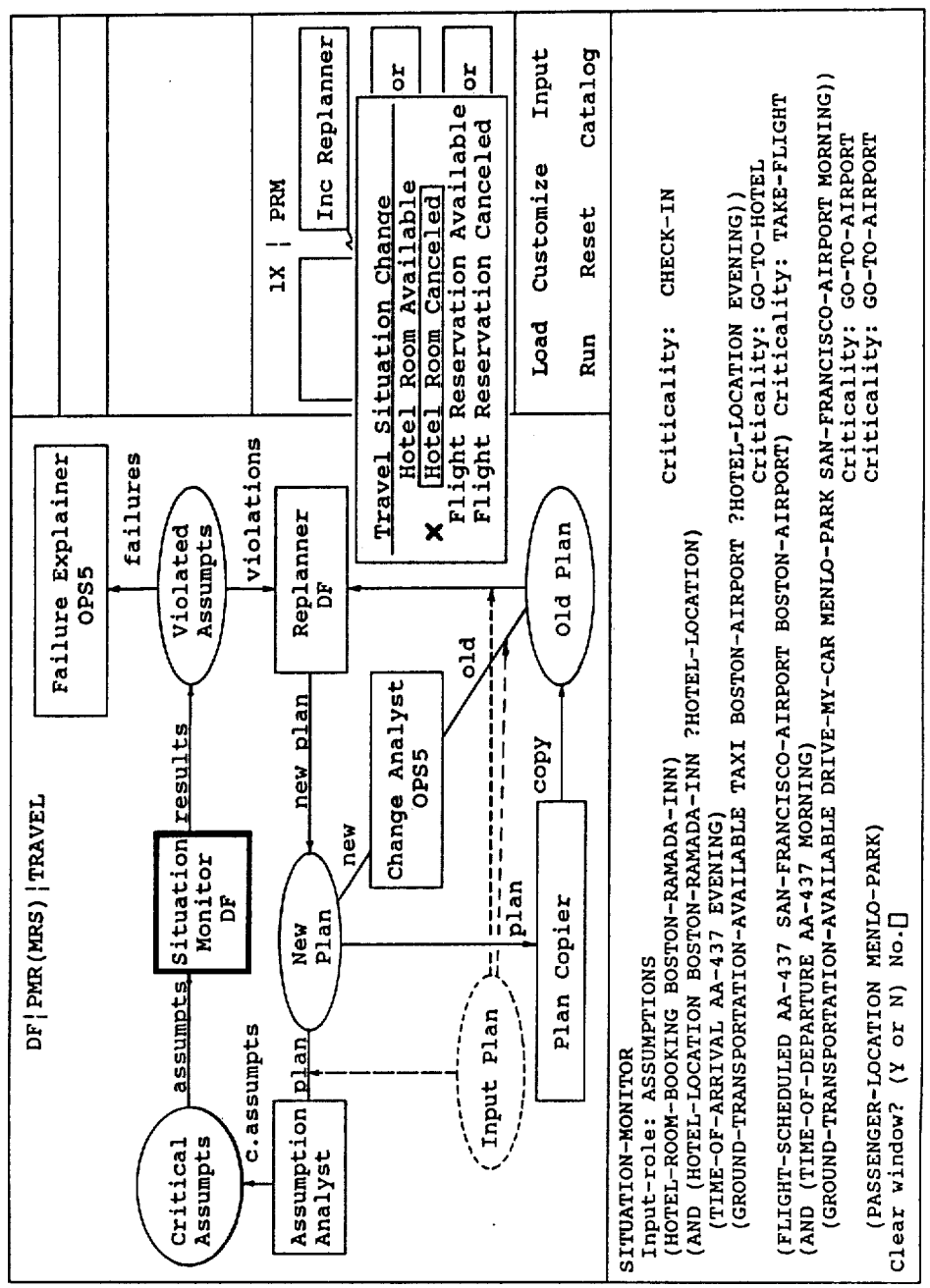
Figure 16:
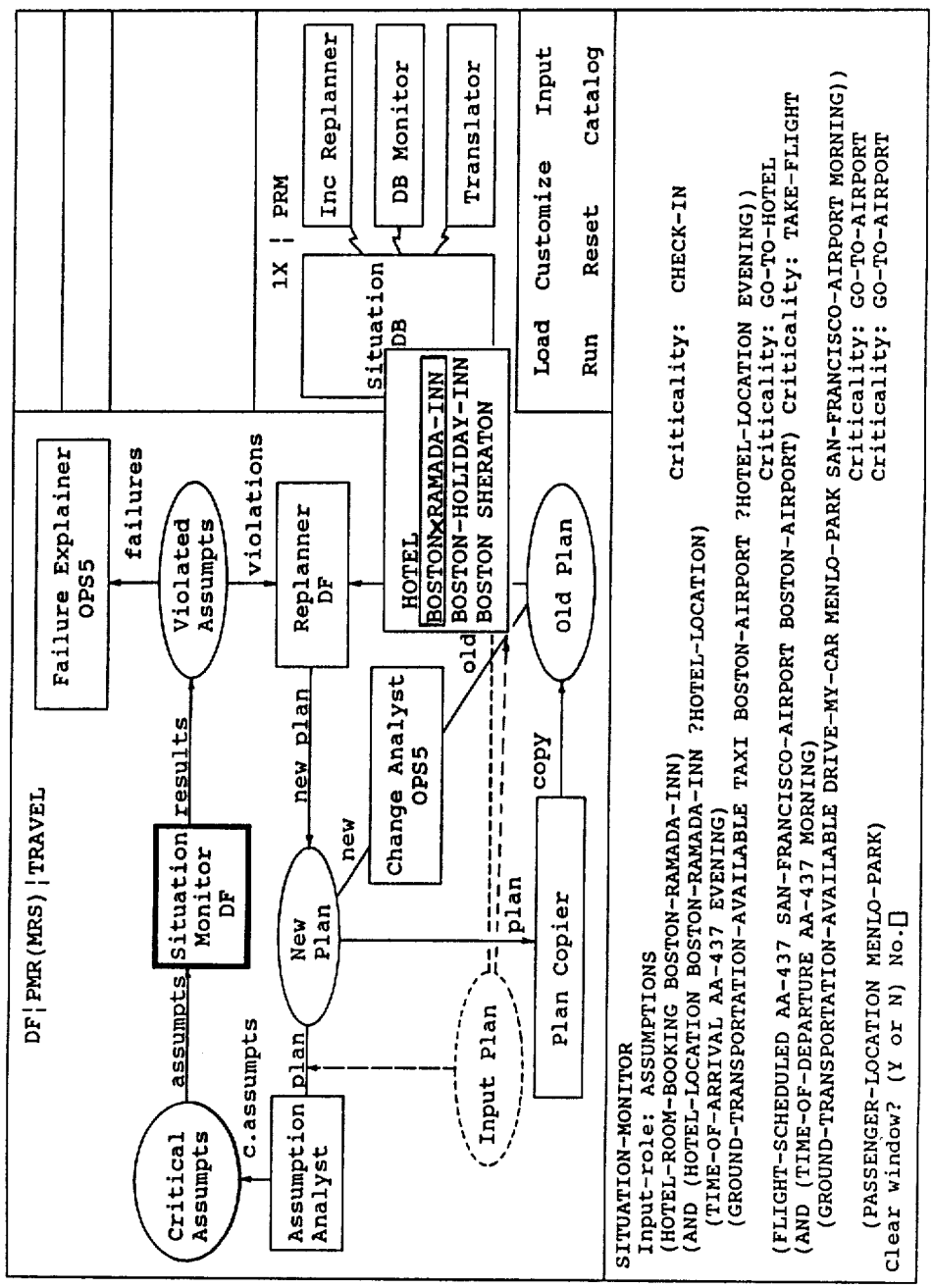
Figure 17:
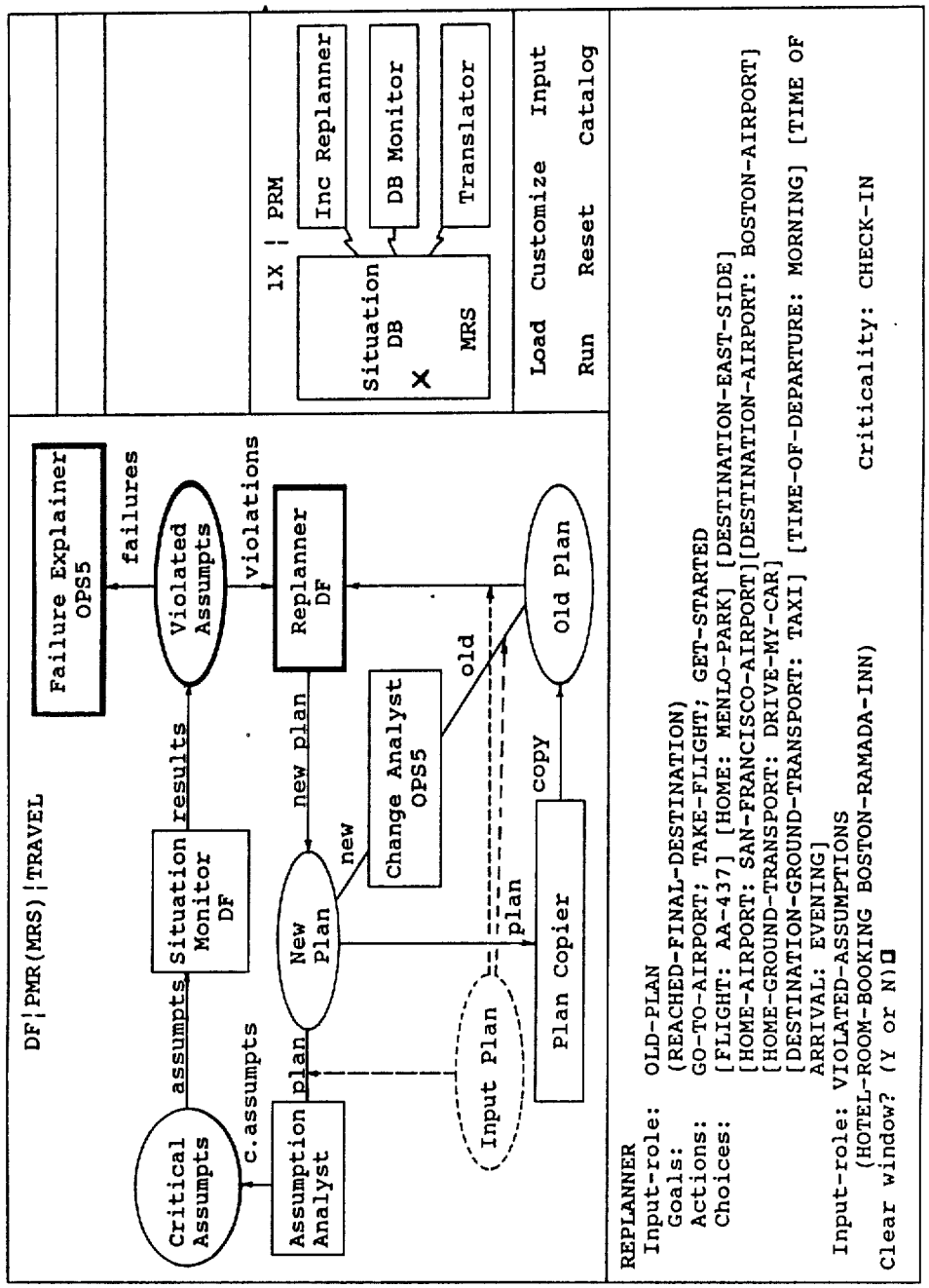

As shown in FIG. 14, the user runs the Travel Planning System. The sequence of operation of the PMR modules is shown in the trace of Appendix XIII. The selected plan is fed as input to the Plan Assumption Analyst. The plan has the traveler leaving his home in Menlo Park and driving himself to San Francisco airport. The traveler should then take flight AA-437 which departs in the morning and arrives in Boston in the evening. The traveler should then take a taxi to the Ramada Inn on the east side of town.

The Plan Assumption Analyst looks at the sequence of actions which constitute the plan and determines which action prerequisites will not be met by previously executed plan actions. In the present case it finds five such prerequisites, called critical assumptions, which are:

(1) the traveler has a reservation at the Boston Ramada Inn;
(2) taxis will be available to get from the airport to the hotel's part of town in the evening;
(3) the traveler's flight is still scheduled;
(4) the traveler's car is available for use on the morning of the flight; and
(5) the traveler is located in Menlo Park that morning.

As shown in FIG. 14, the Situation Monitor receives these critical assumptions and periodically polls the Situation Database to verify the status of any which might change. In the present example, as shown in the Situation Change Message in FIG. 15 and the Hotel in FIG. 16, the Situation Database is informed that the traveler's reservation at the Boston Ramada Inn has been cancelled. When the Situation Monitor next polls the database, it discovers that this critical assumption has been violated, and exits after sending a report, which appears as a travel situation change message in FIG. 17.

Figure 18:
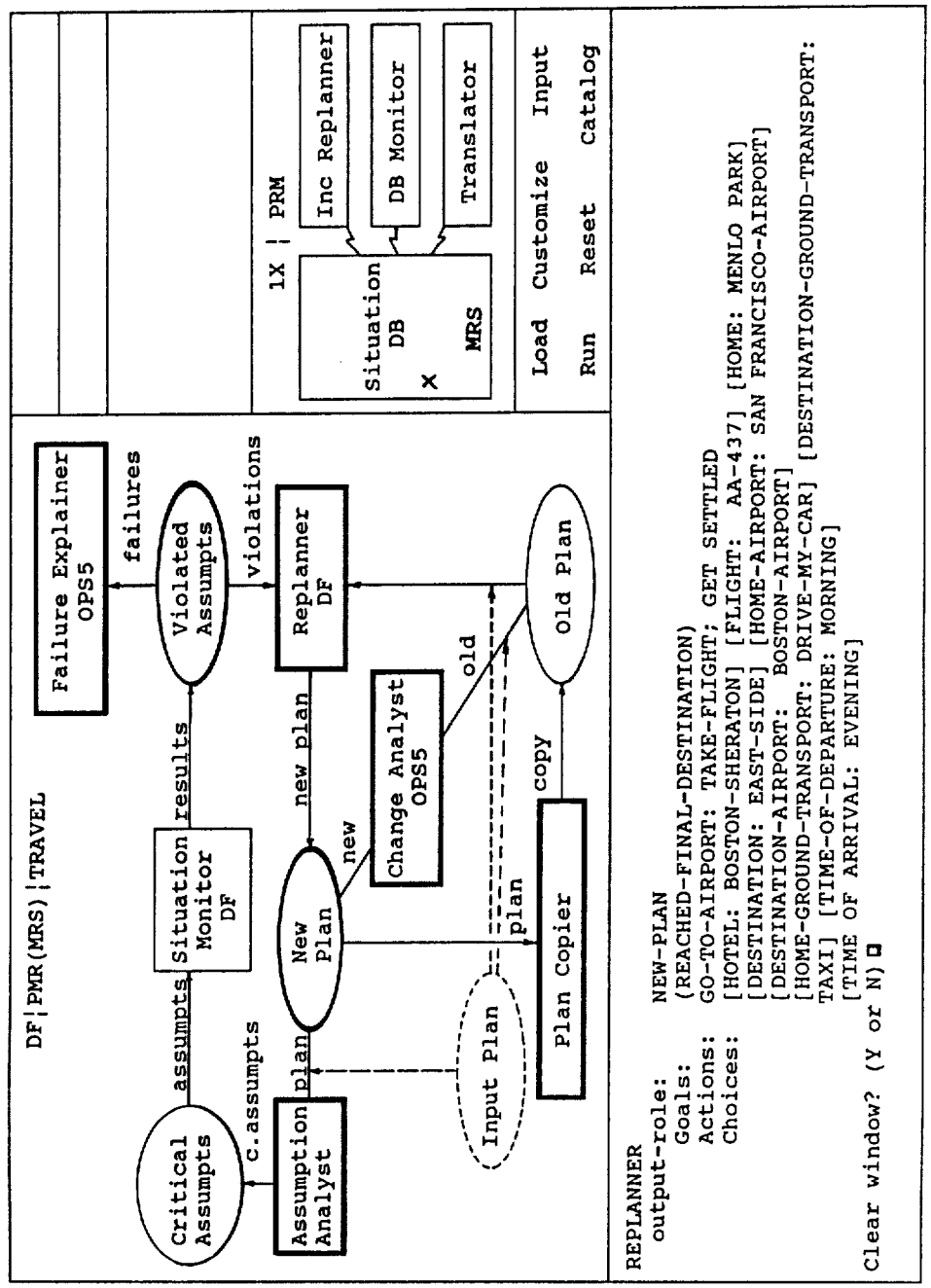
Figure 19:
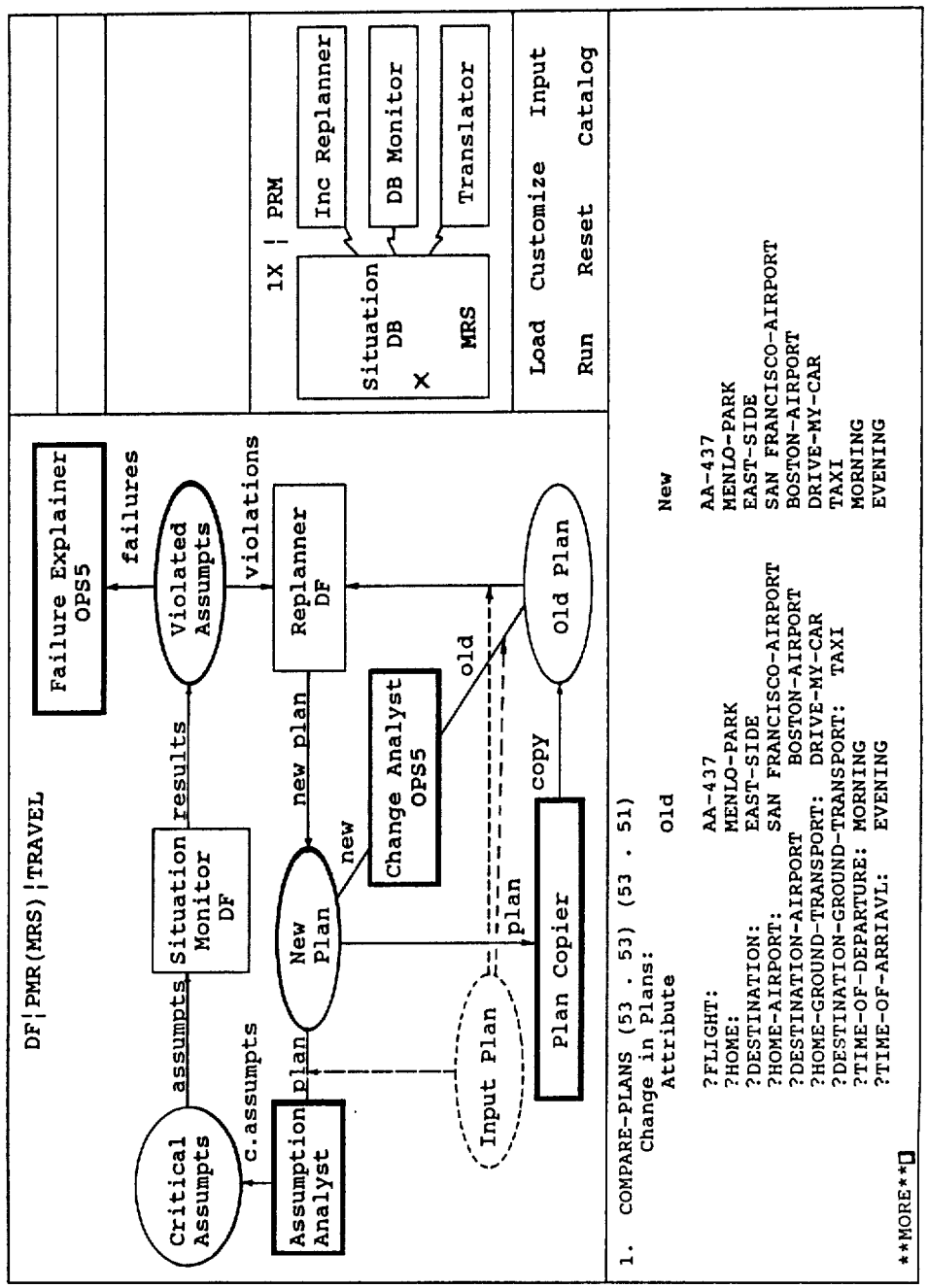
Figure 20:
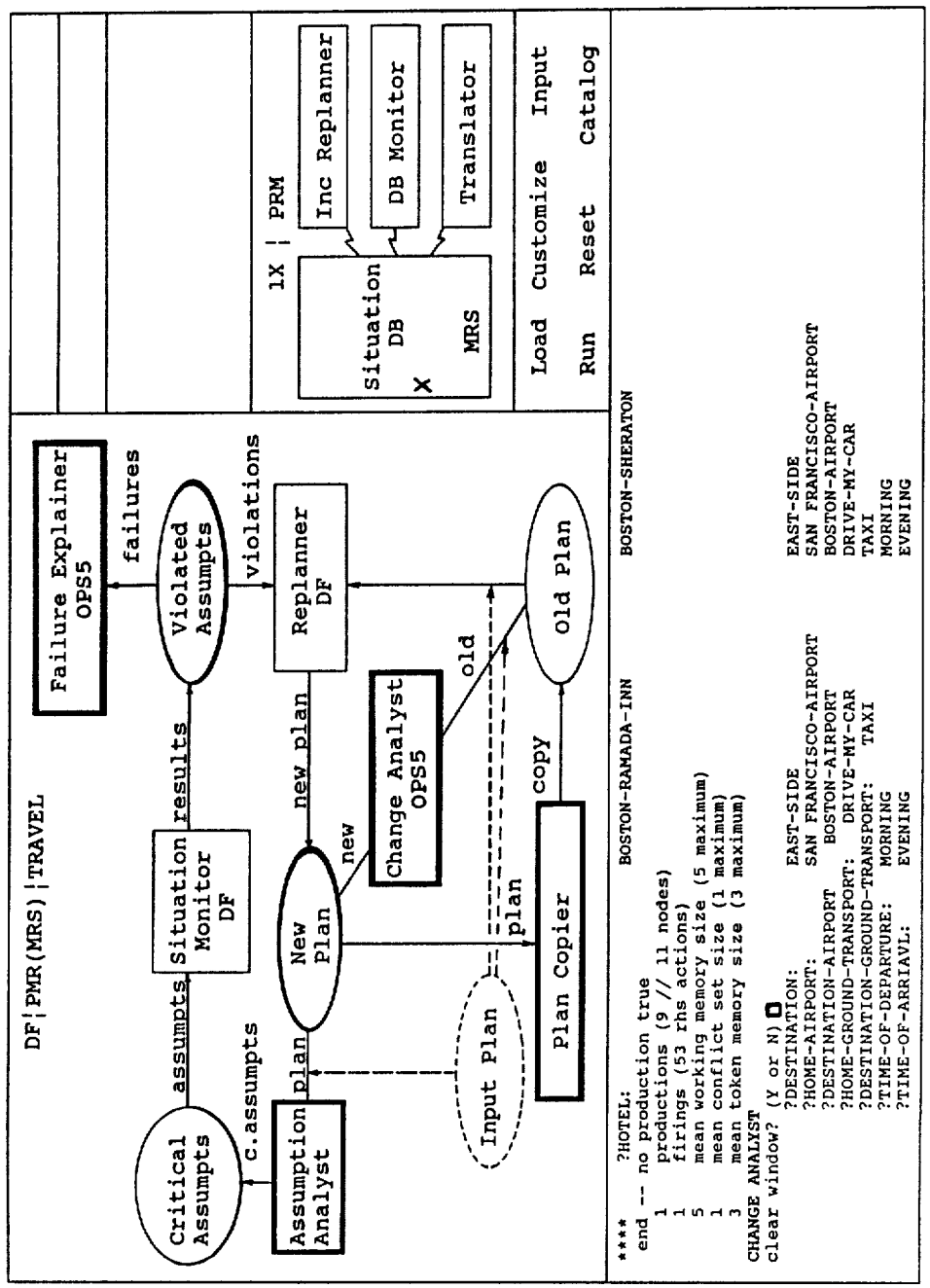
Figure 21:
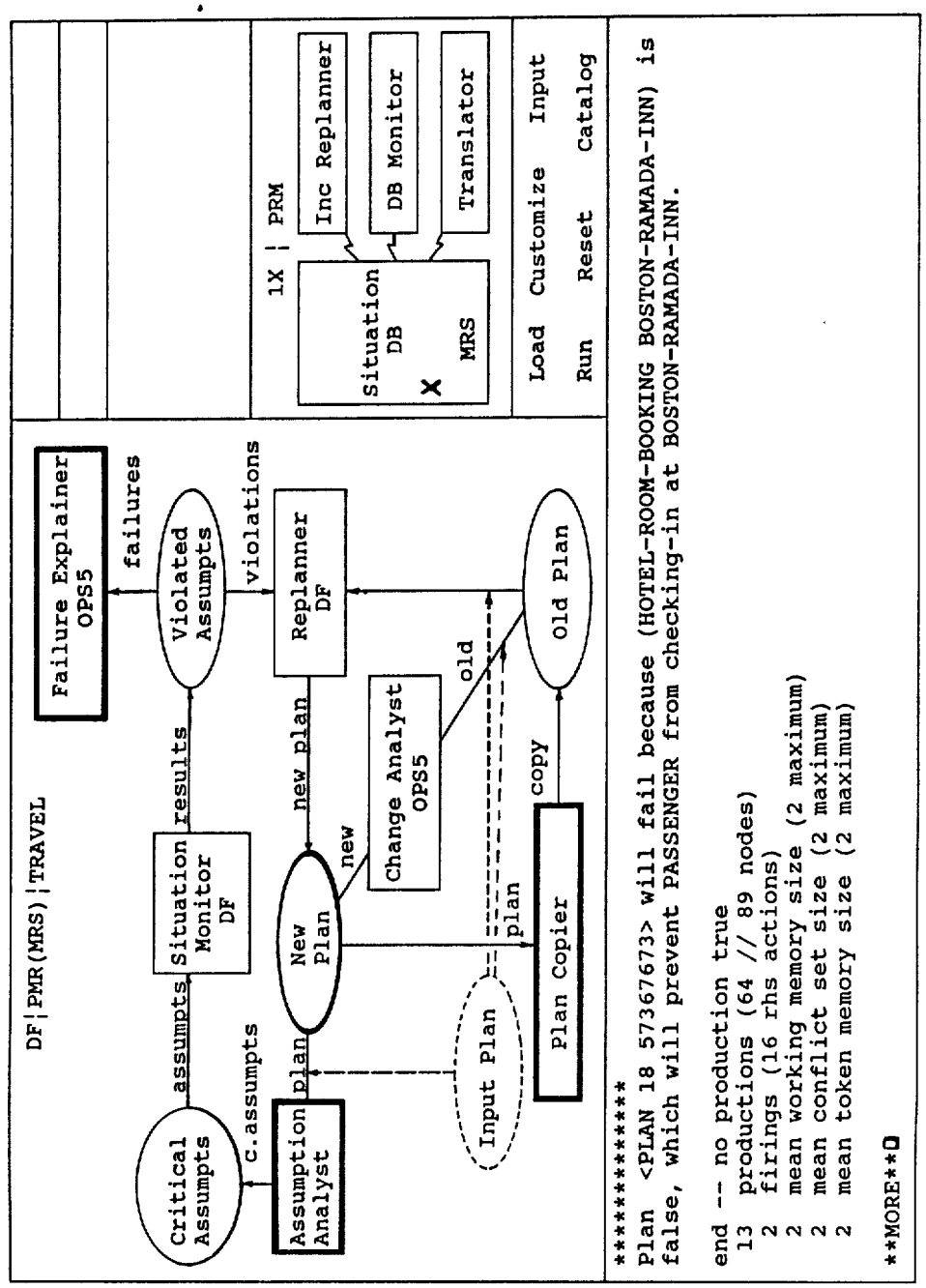
Figure 22:
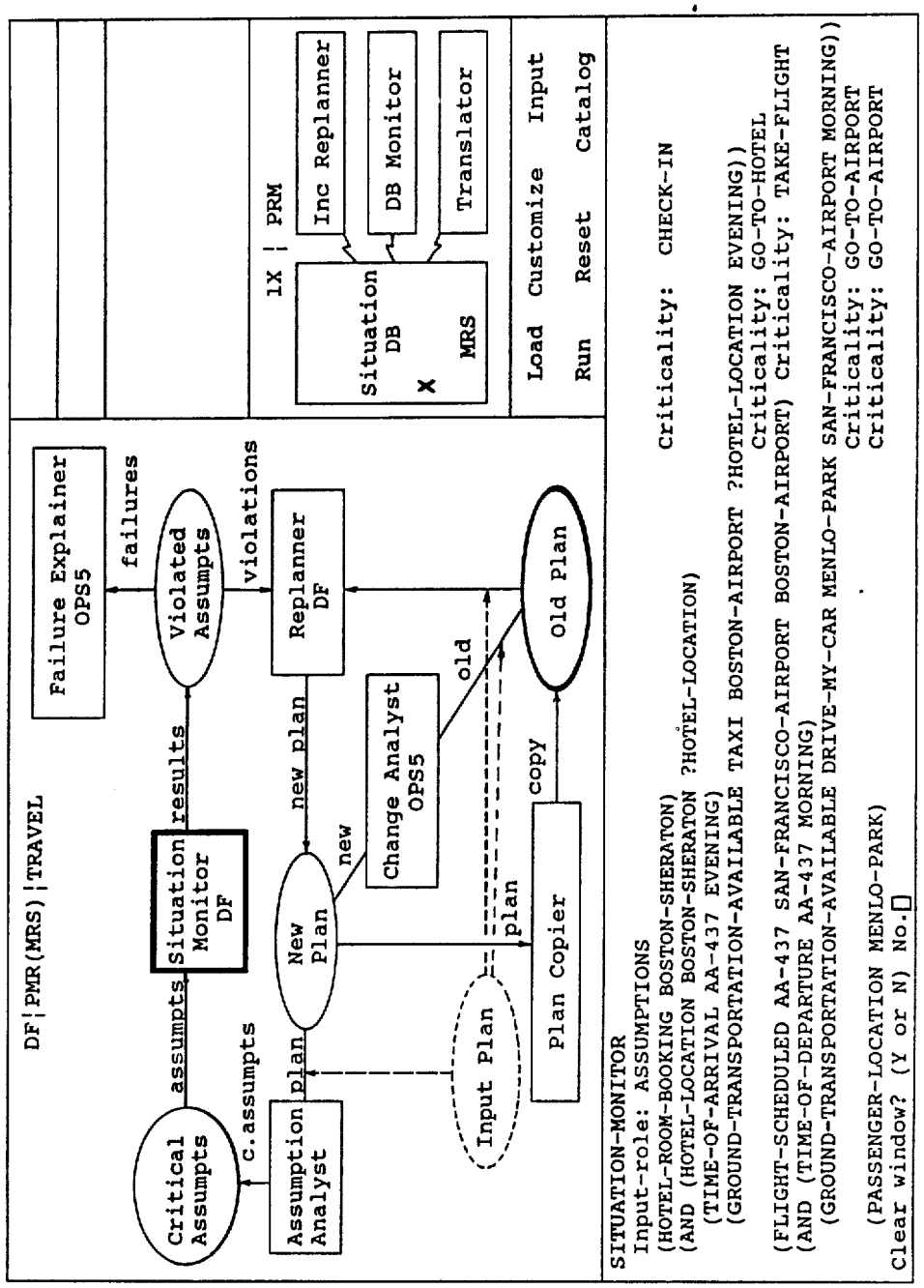

Next, as shown in FIG. 18, the Replanner takes the violation and the original plan, and determines a minimal change which will patch around the problem. In the present example, the Replanner substitutes the Boston Sheraton for the Boston Ramada Inn. As shown in FIG. 19, the Plan Change Analyst then compares the modified plan to the original plan and determines that the only change was to the hotel, so it highlights this plan choice in its report shown on FIG. 20. In FIG. 21, the problem with the original plan is explained in English by the Plan Failure Explainer.

For monitoring of the modified plan, the Plan Assumption Analyst determines the critical assumptions of the new plan. Since the plan structure has not changed, the critical assumptions have not changed, except that the hotel has changed. As shown FIG. 22, the Situation Monitor then begins monitoring for any violations of the critical assumptions of the new plan. This completes a full cycle of operation of the Travel Planner.

In view of the above, there has been described a flexible computing architecture which supports module-oriented programming for developing complex systems composed of application-independent, interacting, composite modules implemented in diverse frameworks. A module production mechanism has been disclosed for the diverse frameworks which interprets descriptions of the functional characteristics of the module to be included in a desired application system. The functional characteristics may be specified apart from the framework in which the module is implemented. More specifically, diverse modules or module components are encapsulated in an outer shell that provides the appearance of modularity in the incorporated program functions so as to be uniformly includable in other modules, independent of which frameworks are used. Therefore, the functionality of a module is separable from the framework in which it is implemented, thereby accelerating the module production process and enhancing the capabilities for reusing and modifying modules. A mechanism for assembling collections of modules has also been described including message-passing means for intermodule communication between modules of various frameworks. Moreover, a specific modular collection of knowledge processing capabilities has been disclosed that can be used, modified, and reused effectively in a large variety of applications.

A specific application of plan monitoring and replanning has been described which illustrates the advantages of replaceable functional units and flexible control for planning functions. A specific set of planning and replanning functions has also been described for monitoring whether initially valid plans remain valid over a period of time prior to their execution, for scheduling plan monitoring activities, for incrementally modifying plans that have not already been executed, for explaining failed plans and plan changes, and testing plan feasibility by testing only the assumptions underlying the plan. Such a planning and replanning system is therefore espcially advantageous for management of designs or plans which are shelved for a while prior to execution, or which require a good deal of time and effort to modify to suit changing conditions.

| APPENDICES I-XIV TABLE OF CONTENTS | |
|---|---|
| APPENDIX I | Code listing for the Preferred Module Oriented Programming (MOP) Operating System |
| APPENDIX II | Code listing for the Data Flow (DF) Framework |
| APPENDIX III | Code listing for the Procedural Module Control (PMC) Framework |
| APPENDIX IV | Code listing for the Transaction (TX) Framework |
| APPENDIX V | Code listing for the Abstract Data Types (ADT's): Logical Formulae and Plans |
| APPENDIX VI | Code listing for the Plan Monitoring and Replanning (PMR) Skeletal System |
| APPENDIX VII | Code listing for the PMR Travel Planner Composite Modules |
| APPENDIX VIII | Code listing for the PMR Travel Planner Core Primitive Modules |
| APPENDIX IX | Code listing for the PMR Travel Planner Primitive Functions |
| APPENDIX X | Code listing for the PMR Travel Planner Customiezed Plan Actions and Data Inputs |
| APPENDIX XI | Code listing for the PMR Travel Planner Plan Failure Explainer Rules |
| APPENDIX XII | Code listing for the PMR Travel Planner Plan Change Explainer Rules |
| APPENDIX XIII | Listing of a Trace of one cycle of the PMR Travel Planner |

APPENDIX I    Code listing for the Preferred

Module Oriented Programming (MOP)

Operating System

```
(in-package 'KIOSK)
(import '(amac:pconsf) 'kiosk)
```

BEST AVAILABLE COPY

```
#|                                                    ;sample for testing
(defmodule COPIER
    :description "This module copies an ADT."
    :documentation "This returns its input (doesn't really copy it)."
    :ports ((adt :direction :read :graphical-name "Input")
            (copy :direction :write :graphical-name "Copy"))
    :code (let ((adt-instance (read-port adt)))
            (write-port copy adt-instance)))
|#

(defvar *OPERATION-KEYWORDS* '(:customize :execute :reset)
  "A list of other keyword arguments which will be passed to any kiosk module.")

;;; *** Check if body is a lambda-expression. If so, then produce a compilable function in
;;; its place.
(defmacro DEFMODULE (module-name &key (description "") (documentation "") code function
                                  ports (module-type 'basic-module))
  "Define a new black-box module, consisting of a function body and a set of ports."
  (when (and code function)
    (error "Cannot supply both a code and function spec in the -S DEFMODULE form."
           module-name))
  (flet ((PARSE-PORT-SPEC (port-spec)
            `(sand 'basic-port :instantiate
                   :name ',(first port-spec)
                   ,@(rest port-spec))))
    `(sand ',module-type :instantiate
           :name ',module-name
           :description ,description
           :documentation ,documentation
           :ports '(list ,.(mapcar #'parse-port-spec ports))
           :body ,(if code
                      #'(lambda (operation &key ,.(mapcar #'first ports))
                          ,code)
                      function))))

(defclass BASIC-MODULE
  (:doc "An ABE module. It is defined by a global name, an implementation framework, and
its I/O connections. It lives in a single file, and can be pointed to (meshed into) many
other modules.")
  (:ivars
    (Description
      :initable
      (:format string)
      (:doc "A one line description of the module."))
    (Documentation
      :initable
      (:format string)
      (:doc "A verbose description of this module."))
    (Implementation
      :initable
      (:default-init :black-box)
      (:format keyword)
      (:doc "The name of the framework this module is implemented in, eg, :PMC."))
    (Name
      :initable
      (:format symbol)
      (:doc "The global name of this module."))
```

```
    (Ports
      :initable
      (:format (listof basic-port))
      (:doc "The I/O ports for this module."))
    (Views
      (:format (listof basic-component))
      (:doc "Back pointer to the composite module objects that currently point to this
module."))
    (Body
      :initable
      (:format t)
      (:doc "The body of the module, ie, a LISP function that can be applied to an operation
name and a plist of port keywords/ports."))))

(defresponse (basic-module EXECUTE) (operation)
  "Execute a module by applying its body to the plist of its ports."
  (let ((port-plist '()))
    (dolist (port Ports)
      (pconsf port-plist (sand port 'keyword) port))
    (apply Body operation port-plist)))

(defresponse (basic-module EXECUTE-AND-FORWARD) (msg &rest args)
  "Execute a given message locally, with no one to forward it to."
  (sand* self msg args))

(defresponse (basic-module FORWARD-AND-EXECUTE) (msg &rest args)
  "Execute a given message locally, with no one to forward it to."
  (sand* self msg args))

(defresponse (basic-module INTERN-PORT) (port-name &key (error-p t))
  "Lookup a given named port in a module."
  (let ((port (find port-name Ports :key #'(lambda (port) (sand port 'name)))))
    (cond (port)
          (error-p (error "No port named -S in module -S." port-name Name))
          (t nil))))

;;; A pathname matches a black-box only if the it is an empty (ie, null) path.

(defresponse (basic-module LOOKUP-MODULE) (module-path)
  "Lookup a module as specified by a module path."
  (if (null module-path)
      self
      (error "-S is a black-box module, so it cannot contain -S."
             Name (sand module-path 'head))))

(defclass BASIC-COMPOSITE-MODULE
  (:doc "An ABE composite module, ie, a basic-module with internal structure.")
  (:supers basic-module)
  (:ivars
    (Subcomponents
      (:format (listof basic-component))
      (:doc "The representations of the modules and other objects contained within this
composite module."))
    (Innernet
      (:format basic-innernet)
      (:doc "A structure representing all of the logical connections between the composite
module objects."))
    (Interpreter-Classes
```

```
            (:format plist)
            (:doc "An plist of interpreter object type/instantiable class pairs, used to determine
what kind of objects to instantiate at runtime."))))

(defresponse (basic-composite-module CREATE-MODULE-CONNECTION)
             (mod1-name port1-name mod2-name port2-name &optional (conn-type :basic))
  "Create a new connection between named ports on two modules, only if OK to do so."
  (let* ((mod1 (sand self 'intern-module mod1-name))
         (mod2 (sand self 'intern-module mod2-name))
         (port1 (sand mod1 'intern-port port1-name))
         (port2 (sand mod2 'intern-port port2-name))
         (conn-class (sand self 'get-class-of conn-type))
         (connection (sand conn-class :instantiate :port1 port1 :port2 port2)))
    (if (sand connection 'ok-to-install?)
        (sand Innernet 'install-connection connection)
        (error "-S is not a consistent connection." connection))))

(defresponse (basic-composite-module GET-CLASS-OF) (object-type)
  "Return the instantiable class corresponding to a particular interpreter object type."
  (or (getf object-type Interpreter-Classes)
      (error "Unknown interpreter object type -S." object-type)))

(defresponse (basic-composite-module EXECUTE-AND-FORWARD) (msg &rest args)
  "Execute a given message locally, and then forward it to all child components."
  (let ((result (sand* self msg args)))
    (dolist (component Subcomponents)
      (sand* component 'execute-and-forward msg args))
    result))

(defresponse (basic-composite-module FORWARD-AND-EXECUTE) (msg &rest args)
  "Forward a given message to all child components, and then execute it locally."
  (dolist (component Subcomponents)
    (sand* component 'forward-and-execute msg args))
  (sand* self msg args))

(defresponse (basic-composite-module INTERN-MODULE) (alias &key (error-p nil))
  "Test if a child component with a given alias exists within a composite module."
  (let ((component (find alias Subcomponents
                         :key #'(lambda (obj) (sand obj 'alias)))))
    (cond (component)
          (error-p (error "No module named -S within -S." test-name Name))
          (t nil))))

;;; Defines the search semantics for module pathnames. If the path is null, then it matches
;;; (by definition) the current module. Otherwise, find the module with the same name as
;;; the head of the pathname, and match the tail to it. Everything else is an error now,
;;; but may be extended later to include upward-relativization, wildcards, and absolute
;;; positions.
(defresponse (basic-composite-module LOOKUP-MODULE) (module-path)
  "Lookup a module as specified by a module path."
  (if (null module-path)
      self
      (sand (sand self 'intern-module (sand module-path 'head) :error-p t)
            'lookup-module (sand module-path 'tail))))

(defclass BASIC-COMPONENT
  (:doc "An arbitrary named component used by a composite module.")
  (:ivars
```

```
    (Alias
      :gettable
      (:format symbol)
      (:doc "The unique name of this component relative to the composite module."))
    (Graphical-Name
      (:format string)
      (:doc "The string to display when depicting this component in its composite module."))
    (Composite-Module
      (:format basic-composite-module)
      (:doc "Back pointer to the composite module that this component lives in."))))

(defclass BASIC-COMPONENT-MODULE
  (:doc "The representation of an ABE module within another module.")
  (:supers basic-component)
  (:ivars
    (Module
      (:format basic-module)
      (:doc "The module that this component represents."))))

(defclass MODULE-PATHNAME
  (:doc "A relative pathname for modules, used for looking up a module somewhere within
another module.  It consists of a head and a tail (basically an expensive cons cell).")
  (:ivars
    (Head
      :initable :gettable
      (:format symbol)
      (:doc "The first (local) component of the path.  Cannot be NIL."))
    (Tail
      :initable :gettable
      (:format module-reference)
      (:doc "The rest of the pathname, or NIL if nothing left."))))

(defresponse (module-pathname :PRINT-SELF) (stream &rest ignore)
  "Print a module pathname in its standard printed representation."
  (format stream "\#m\"~S" Head)
  (when Tail
    (send Tail 'print-self-internal stream))
  (format stream "\""))

(defresponse (module-pathname PRINT-SELF-INTERNAL) (stream)
  "Helper response to print a single module pathname component."
  (format stream "|~S" Head)
  (when Tail
    (send Tail 'print-self-internal stream)))

;;; Treats a vertical bar like a space, ie, neutral token delimiter
(defvar *MODULE-PATHNAME-READTABLE* (copy-readtable nil)
  "Readtable used to read module pathnames.")
(set-syntax-from-char #\| #\space *module-pathname-readtable*)

;;; Read the printed representation of a module pathname, ie, #m"mod1|mod2|mod3".  First we
;;; read in all the pathname components as a list, and then build the parse tree.
;;;
;;; *** Need to handle absolute pathname, upward relativization, etc.
(defun READ-MODULE-PATHNAME (stream subchar arg)
  "Read the printed representation of a module pathname."
  subchar arg
```

```
  (read-char stream nil nil t)                    ;eat the first string quote
  (let ((*readtable* *module-pathname-readtable*))
    (create-module-pathname (nreverse (read-delimited-list #\" stream t)))))

;;; *** Error check if elements is null.
(defun CREATE-MODULE-PATHNAME (elements)
  "Convert a list of module names into a module pathname."      BEST AVAILABLE COPY
  (let ((path (sand 'module-pathname :instantiate
                    :head (first elements)
                    :tail nil)))
    (dolist (element (rest elements))
      (setq path (sand 'module-pathname :instantiate :head element :tail path)))
    path))

(set-dispatch-macro-character #\# #\M #'read-module-pathname)

(in-package 'KIOSK)
(import 'amac:neq 'kiosk)

(defclass BASIC-INNERNET
  (:doc "A representation of the logical connection between a set of modules all
contained within the same composite module.")
  (:ivars
    (Connections
      (:format (listof basic-broadcast-connection))
      (:doc "All individual connections."))
    (Composite-Module
      (:format basic-composite-module)
      (:doc "Back pointer to the composite module containing this innernet."))))

(defresponse (basic-innernet INSTALL-CONNECTION) (connection)
  "Add a new connection to an innernet."
  (sand connection 'set-innernet self)
  (sand connection 'bind-ports)
  (push connection Connections))

(defclass BASIC-BROADCAST-CONNECTION
  (:doc "A multi-port broadcast connection.  The ports are undifferentiated.")
  (:ivars
    (Innernet
      (:format basic-innernet)
      (:doc "Back pointer to the innernet containing this connection."))
    (Ports
      (:format (listof basic-port))
      (:doc "The ports that comprise this broadcast connection."))))

(defresponse (basic-broadcast-connection BIND-PORTS) ()
  "Bind all ports in a connection to the connection."
  (dolist (port Ports)
    (sand port 'set-connection self)))

(defresponse (basic-broadcast-connection BROADCAST-MESSAGE) (sender msg &rest args)
  "Broadcast a message to all ports connected to the sender."
  (dolist (port Ports)
    (unless (eq port sender)
      (sand* port sender args))))
```

```
(defclass BASIC-MODULE-CONNECTION
  (:doc "A single point-to-point connection between a port on each of two modules. Here we
don't differentiate between the two ports; specializations of this class may choose to do
so, eg, data flows only from Port1 to Port2.")
  (:supers basic-broadcast-connection))

(defresponse (basic-module-connection PORT1) ()
  "The first port that comprises this connection."
  (first Ports))

(defresponse (basic-module-connection PORT2) ()
  "The second port that comprises this connection."
  (second Ports))

(defresponse (basic-module-connection OK-TO-INSTALL?) ()
  "Check if the directions of the two ports in a connection are consistent, and he ports are
not already bound."
  (let ((port1 (first ports))
        (port2 (second ports)))
    (and (not (sand port1 'bound?))
         (not (sand port2 'bound?))
         (sand port1 'ok-to-connect? port2))))

(defclass BASIC-PORT
  (:doc "An external interface to a module.")
  (:ivars
    (Name
      :gettable
      (:format symbol)
      (:doc "The unique name of this port relative to its module."))
    (Graphical-Name
      (:format string)
      (:doc "The name of this port to display."))
    (:Direction
      :gettable
      (:format (oneof :read :write :both))
      (:doc "The direction data can flow through this port. Data flows into :read ports and
out of :write ports."))
    (Type
      :initable
      (:default-init t)                      ;ie, untyped
      (:format symbol)
      (:doc "The legal type of data that can pass through this port."))
    (Module
      (:format basic-module)
      (:doc "Back pointer to the module that this port is defined on."))
    (Connection
      (:format basic-module-connection)
      (:doc "Back pointer to the connection that this port participates in."))))

(defmacro QUERY-PORT (port)
  "Check if a port has a value waiting."
  '(sand ,port 'query-value))

(defmacro READ-PORT (port)
  "Read the value from a port."
  '(sand ,port 'read-value))
```

```
(defmacro WRITE-PORT (port value)
  "Write a new value to a port."
  '(sand ,port 'write-value ,value))

(defresponse (basic-port BOUND?) ()
  "A port is bound if it participates in a connection."
  (if Connection t))

;;; *** May want to make this an ivar instead.
(defresponse (basic-port KEYWORD) ()
  "Return the keyword symbol corresponding to a port's name."
  (keyword Name))

(defresponse (basic-port OK-TO-CONNECT) (port)
  "A port can connect to another port if ports are :both/:both or :read/:write."
  (case Direction
    ((:read :write)
     (not (eq (sand port :direction) Direction)))
    (:both (eq (sand port :direction) :both))))

(defclass BASIC-BUFFERED-PORT
  (:doc "A port that buffers data locally.")
  (:ivars
    (Buffer
      :gettable :settable
      (:format t)
      (:doc "The actual data buffer.  At this point its contents are unstructured."))))

(defvar *EMPTY-PORT-MARKER* "Empty Port"
  "A special marker that denotes an empty port.")

(defresponse (basic-buffered-port CLEAR-BUFFER) ()
  "Clear the value of a port's buffer."
  (setq Buffer *empty-port-marker*))

(defresponse (basic-buffered-port READ-BUFFER-AND-CLEAR) ()
  "Reads the value of a port's buffer, and then clears it."
  (if (eq Buffer *empty-port-marker*)
      (error "Port -S does not have a value." Name)
      (prog1 Buffer
             (sand self 'clear-buffer))))

;;; This corresponds to the QUERY-PORT macro.
(defresponse (basic-buffered-port QUERY-PORT) ()
  "Queries a port to see if it has a value waiting."
  (neq Buffer *empty-port-marker*))

;;; This corresponds to the READ-PORT macro.
(defresponse (basic-buffered-port READ-VALUE) ()
  "Reads the value of a port."
  (sand self 'read-buffer-and-clear))

;;; This corresponds to the WRITE-PORT macro
(defresponse (basic-buffered-port WRITE-VALUE) (new-value)
  "Writes a new value into a port."
  (sand self 'set-value new-value))
```

```
(defclass BASIC-TRANSMIT-PORT
  (:doc "A port that transmits data and data requests to its connected port.")
  (:supers basic-port))
```

APPENDIX II    Code listing for the Data Flow
(DF) Framework

```
(in-package 'df)                                        BEST AVAILABLE COPY

;;;; Definition mechanism for DF programs.

(defvar *ALL-DF-PROGRAMS* '()
  "a list of the names (symbols) of all defined DF programs")
(pushnew '*all-df-programs* kiosk:*all-kiosk-module-vars*)

(eval-when (compile load eval)
  (defvar *DEFAULT-INTERPRETER-CLASSES-PLIST*
        '(
          :module         module
          :place          place
          :split          split
          :join           join
          :input-place    place
          :output-place   place
          :module-input   module-input
          :module-output  module-output
          :enablement     enablement
          :token          token
          )
    "default plist for specifying interpreter classes")
  )

(defclass DF-CLASS
  (:supers kiosk:basic-framework-class)
  ;; (:default-ivar-class default-init-null-format-ivar)
  (:ivars
    (Interpreter-Classes
      :initable (:default-init *default-interpreter-classes-plist*)
      (:documentation "the classes of components to instantiate"))
    (Input-Places
      :initable (:default-init '())            :(:format (listof (list string class key)))
      (:documentation "list of input-place definitions"))
    (Output-Places
      :initable (:default-init '())            :(:format (listof (list string class key)))
      (:documentation "list of output-place definitions"))
    (Modules
      :initable (:default-init '())            :(:format (listof (list string class)))
      (:documentation "list of module definitions"))
    (Places
      :initable (:default-init '())            :(:format (listof (list string class)))
      (:documentation "list of place definitions"))
    (Module-Inputs
      :initable (:default-init '())            :(:format (listof (list string string key)))
      (:documentation "list of module-input definitions"))
    (Module-Outputs
      :initable (:default-init '())            :(:format (listof (list string string key)))
      (:documentation "list of module-output definitions"))
```

```
    (Splits
       :initable (:default-init '())
       (:documentation "list of module-output split definitions"))
    (Joins
       :initable (:default-init '())
       (:documentation "list of module-input join definitions")))
 (:documentation "The metaclass for the DF interpreter - instances defines DF programs"))

(defresponse (df-class :PARSE-INPUT-PLACES) (option ignored)
   "handles the :input-places option in define-program"
   (setq input-places (rest option)
         coral::init-plist (list* (first option) '(quote ,(rest option)) coral::init-plist)))

(defresponse (df-class :PARSE-OUTPUT-PLACES) (option ignored)
   "handles the :output-places option in define-program"
   (setq output-places (rest option)
         coral::init-plist (list* (first option) '(quote ,(rest option)) coral::init-plist)))

(defresponse (df-class :PARSE-MODULES) (option ignored)
   "handles the :modules option in define-program"
   (setq modules (rest option)
         coral::init-plist (list* (first option) '(quote ,(rest option)) coral::init-plist)))

(defresponse (df-class :PARSE-PLACES) (option ignored)
   "handles the :places option in define-program"
   (setq places (rest option)
         coral::init-plist (list* (first option) '(quote ,(rest option)) coral::init-plist)))

(defresponse (df-class :PARSE-MODULE-INPUTS) (option ignored)
   "handles the :module-inputs option in define-program"
   (setq module-inputs (rest option)
         coral::init-plist (list* (first option) '(quote ,(rest option)) coral::init-plist)))

(defresponse (df-class :PARSE-MODULE-OUTPUTS) (option ignored)
   "handles the :module-outputs option in define-program"
   (setq module-outputs (rest option)
         coral::init-plist (list* (first option) '(quote ,(rest option)) coral::init-plist)))

(defresponse (df-class :PARSE-SPLITS) (option ignored)
   "handles the :splits option in define-program"
   (setq splits (rest option)
         coral::init-plist (list* (first option) '(quote ,(rest option)) coral::init-plist)))

(defresponse (df-class :PARSE-JOINS) (option ignored)
   "handles the :joins option in define-program"
   (setq joins (rest option)
         coral::init-plist (list* (first option) '(quote ,(rest option)) coral::init-plist)))

(defresponse (df-class :INPUT-KEYWORDS) ()
   (mapcar #'third input-places))

(defresponse (df-class :OUTPUT-KEYWORDS) ()
   (mapcar #'third output-places))

(defresponse (df-class :PORT-KEYWORDS) ()
   nil)

;;; After creating an instance of an interpreter, create the associated graph structure.
;;; Note - the order of the dolists matters.
(defresponse (df-class :AROUND :INSTANTIATE) (&rest init-plist)
   (let ((instance (continue-sand* init-plist)))
```

```
  (sand instance :set-interpreter-classes
      (if (symbolp interpreter-classes)
          (symbol-value interpreter-classes)
          interpreter-classes))
  (dolist (module-spec modules)
    (sand* instance :create-module module-spec))
  (dolist (place-spec places)
    (sand* instance :create-place place-spec))
  (dolist (input-spec input-places)
    (sand* instance :create-input-place input-spec))
  (dolist (output-spec output-places)
    (sand* instance :create-output-place output-spec))
  (dolist (split-spec splits)
    (sand* instance :create-split split-spec))
  (dolist (join-spec joins)
    (sand* instance :create-join join-spec))
  (dolist (mod-conn module-outputs)
    (sand* instance :create-module-output mod-conn))
  (dolist (place-conn module-inputs)
    (sand* instance :create-module-input place-conn))
  (sand instance :sand-if-handles :init)
  instance))

(defmacro DEFINE-PROGRAM (name &body options)
  "Transforms a define-program into a defclass."
  `(progn
     (defclass ,name
       (:meta-class df-class)
       (:supers df)
       (:implementation :dataflow)
       (:instantiable-p t)
       ,@options)
     (pushnew ',name *all-df-programs*)
     ',name))

(defclass BASIC-DF
  (:meta-class df-class)
  (:supers kiosk:module)
  ;; (:default-ivar-class format-ivar)
  (:ivars
    (Sources-Circular-Q
      (:default-init '())
      (:documentation "circular queue for the sources"))
    (Enablement-Priority-Q
      (:default-init '())                    ;(:format (listof enablement))
      (:documentation "priority queue for enablements stored as a list"
                      "highest priority entry at the front of the list"))
    (Current-Time
      (:default-init 0)                      ;(:format integer)
      (:documentation "the current time stamp"))
    (Interpreter-Classes
      :settable                              ;(:format plist)
      (:default-init *default-interpreter-classes-plist*)
      (:documentation "an alist that determines what class of subcomponents to instantiate"))
    (All-Input-Places
      (:default-init '())                    ;(:format (listof intput-para))
      (:documentation "a list of all input-places in the program"))
    (All-Output-Places
      (:default-init '())                    ;(:format (listof output-place))
      (:documentation "a list of all output-places in the program"))
    (All-Modules
      (:default-init '())                    ;(:format (listof module))
```

BEST AVAILABLE COPY

```
        (:documentation "a list of all modules in the program"))
      (All-Sources
        (:default-init '())                    ;(:format (listof module))
        (:documentation "a list of all source modules in the program"))
      (All-Places
        (:default-init '())                    ;(:format (listof place))
        (:documentation "a list of all places in the program"))
      (All-Splits
        (:default-init '())                    ;(:format (listof split))
        (:documentation "a list of all splits in the program"))
      (All-Joins
        (:default-init '())                    ;(:format (listof join))
        (:documentation "a list of all joins in the program"))
      (All-Module-Inputs
        (:default-init '())                    ;(:format (listof module-input))
        (:documentation "a list of all module-inputs in the program"))
      (All-Module-Outputs
        (:default-init '())                    ;(:format (listof module-output))
        (:documentation "a list of all module-outputs in the program")))
    (:documentation "The DF interpreter"))

;;; Lookup the class of an interpreter object.
(defresponse (basic-df :GET-CLASS-OF) (object-type)
  (or (getf interpreter-classes object-type)
      (error "Unknown interpreter object type ~A." object-type)))

;;; Responses to find nodes in the interpreter (defresponse (basic-df :ALL-MODULES) ()
  (append all-sources all-modules))

(defresponse (basic-df :MODULE-AT-PATH) (path &aux component)
  (setq component (or (find (first path) all-modules
                            :test #'(lambda (name module)
                                      (string-equal name (sand module :name))))
                      (find (first path) all-sources
                            :test #'(lambda (name module)
                                      (string-equal name (sand module :name))))))
  (unless component
    (error "The DF program ~s does not have a component ~s." self (first path)))
  (if (rest path)
      (sand (sand component :kiosk-module) :module-at-path (rest path))
      component))

(eval-when (compile)                           ;stupid compiler!
  (defconstant *NODE-LIST-PRETTY-NAME-ALIST*
    '((all-modules       . "module")
      (all-places        . "place")
      (all-input-places  . "input place")
      (all-output-places . "output place")
      (all-splits        . "split")
      (all-joins         . "join"))
    "Alist for finding and generating error messages in :intern-xxx responses"))

(defun EXTRACT-NAME (node)
  (sand node :name))

(defmacro CHECK-NODE-NAMED (name node-list error-p)
  (let ((nodevar (gensym))                     ;bullet-proof the var and name references
        (namevar (gensym))
        (type (or (cdr (assoc node-list *node-list-pretty-name-alist*))
```

```
            (error "Unknown node list -A." node-list))))
  '(let* ((,namevar ,name)
          (,nodevar (find ,namevar ,node-list :test #'string-equal :key #'extract-name)))
     (cond (,nodevar)
           (error-p (error "No -A named -A exists." ,type ,namevar))
           (T NIL)))))
```

;;; These responses check for the existance of a node, optionally signalling an error if the
;;; node doesn't exist. If found, the node is returned.

```
(defresponse (basic-df :INTERN-MODULE) (module-name &key (error-p t))
  (check-node-named module-name all-modules error-p))

(defresponse (basic-df :INTERN-PLACE) (place-name &key (error-p t))
  (check-node-named place-name all-places error-p))

(defresponse (basic-df :INTERN-INPUT-PLACE) (input-name &key (error-p t))
  (check-node-named input-name all-input-places error-p))

(defresponse (basic-df :INTERN-OUTPUT-PLACE) (output-name &key (error-p t))
  (check-node-named output-name all-output-places error-p))

(defresponse (basic-df :INTERN-SPLIT) (split-name &key (error-p t))
  (check-node-named split-name all-splits error-p))

(defresponse (basic-df :INTERN-JOIN) (join-name &key (error-p t))
  (check-node-named join-name all-joins error-p))
```

;;; Create modules and places.

```
(defresponse (basic-df :CREATE-MODULE) (name class &rest options &aux instance)
  (when (sand self :intern-module name :error-p nil)
    (error "Module with name -a already exists." name))
  (setq instance (sand* (sand self :get-class-of :module) :instantiate
                        :name name
                        :interpreter self
                        :framework self
                        :type class
                        :kiosk-class class
                        options))
  (push instance all-modules)
  instance)

(defresponse (basic-df :CREATE-PLACE) (name class &rest options &aux instance)
  (when (sand self :intern-place name :error-p nil)
    (error "Place with name -a already exists." name))
  (setq instance (sand* (sand self :get-class-of :place) :instantiate
                        :name name
                        :interpreter self
                        :type class
                        :xrole nil
                        options))
  (push instance all-places)
  instance)

(defresponse (basic-df :CREATE-INPUT-PLACE) (name class role &rest options &aux instance)
  (when (sand self :intern-input-place name :error-p nil)
    (error "Input place with name -A already exists." name))
  (setq instance (sand* (sand self :get-class-of :place) :instantiate
                        :name name
                        :interpreter self
                        :type class
```

```
                    :xrole (list :input role)
                    options))
  (push instance all-input-places)
  instance)

(defresponse (basic-df :CREATE-OUTPUT-PLACE) (name class role &rest options &aux instance)
  (when (sand self :intern-output-place name :error-p nil)
    (error "Output place with name -A already exists." name))
  (setq instance (sand* (sand self :get-class-of :place) :instantiate
                    :name name
                    :interpreter self
                    :type class
                    :xrole (list :output role)
                    options))
  (push instance all-output-places)
  instance)

;;; Connect modules and places.  Make sure the module has an input or output role
;;; corresponding to the role specified in the define-program form.

(defresponse (basic-df :CREATE-MODULE-OUTPUT) (module-name place-name role &rest options
                                                                          &aux arc)
  "module or place may actually be a split"
  (let ((module (or (sand self :intern-module module-name :error-p nil)
                    (sand self :intern-split module-name :error-p nil)
                    (error "There is no module or split named -s" module-name)))
        (place (or (sand self :intern-output-place place-name :error-p nil)
                   (sand self :intern-place place-name :error-p nil)
                   (sand self :intern-split place-name :error-p nil)
                   (error "There is no place or split named -s" place-name))))
    (when (and (or (not (sand module :known-message-p :verify-output-keyword?))
                   (sand module :verify-output-keyword? role))
               (or (not (sand place :known-message-p :ok-to-connect-input?))
                   (sand place :ok-to-connect-input?)))
      (setq arc (sand* (sand self :get-class-of :module-output) :instantiate
                    :role role
                    :origin module
                    :destination place
                    :interpreter self
                    options))
      (push arc all-module-outputs)
      (sand arc :connect)))
  arc)

(defresponse (basic-df :CREATE-MODULE-INPUT) (place-name module-name role &rest options
                                                                          &aux arc)
  "module or place may actually be a join"
  (let ((place (or (sand self :intern-input-place place-name :error-p nil)
                   (sand self :intern-place place-name :error-p nil)
                   (sand self :intern-join place-name :error-p nil)
                   (error "There is no place or join named -s" place-name)))
        (module (or (sand self :intern-module module-name :error-p nil)
                    (sand self :intern-join module-name :error-p nil)
                    (error "There is no module or join named -s" module-name))))
    (when (or (not (sand module :known-message-p :verify-input-keyword?))
              (sand module :verify-input-keyword? role))
      (setq arc (sand* (sand self :get-class-of :module-input) :instantiate
                    :role role
                    :origin place
                    :destination module
                    :interpreter self
                    options))
```

```
      (push arc all-module-inputs)
      (sand arc :connect)))
  arc)

(defresponse (basic-df :CREATE-SPLIT) (name &rest options &aux instance)
  (when (sand self :intern-split name :error-p nil)
    (error "Split with name -A already exists." name))
  (setq instance (sand* (sand self :get-class-of :split) :instantiate
                        :name name
                        :interpreter self
                        options))
  (push instance all-splits)
  instance)

(defresponse (basic-df :CREATE-JOIN) (name &rest options &aux instance)
  (when (sand self :intern-join name :error-p nil)
    (error "Join with name -A already exists." name))
  (setq instance (sand* (sand self :get-class-of :join) :instantiate
                        :name name
                        :interpreter self
                        options))
  (push instance all-joins)
  instance)

(in-package 'df)

;;;; Definition of nodes and arcs in DF.

(defclass BASIC-OBJECT
  ;; (:default-ivar-class format-ivar)
  (:ivars
    (Name
      :settable                                 ;(:format string)
      (:documentation "the name of the object"))
    (Inputs
      :gettable (:default-init '())             ;(:format (listof arc))
      (:documentation "the input arcs"))
    (Outputs
      :gettable (:default-init '())             ;(:format (listof arc))
      (:documentation "the output arcs"))
    (Interpreter
      :initable :gettable                       ;(:format DF)
      (:documentation "the DF program")))
  (:documentation "the root of first-class DF objects"))

(defresponse (basic-object :PRINT-SELF) (stream &rest ignore)
  (si:printing-random-object (self stream :typep)
    (princ name stream)))

;;; Add an input to a node.
(defresponse (basic-object :ADD-INPUT) (input-arc)
  (pushnew input-arc inputs))

;;; Add an output to a node.
(defresponse (basic-object :ADD-OUTPUT) (output-arc)
  (pushnew output-arc outputs))

(defclass BASIC-NODE
  ;; (:default-ivar-class format-ivar)
  (:supers basic-object)
  (:ivars
    (Type
      :settable                                 ;(:format class)
      (:documentation "the type of implementing object"))
```

```
(Tokens
  :settable (:default-init '())           ;(:format (listof token))
  (:documentation "accumulated tokens")))
(:documentation "the root of DF modules and places"))

;;; Find and input in a node with a given role.
(defresponse (basic-node :FIND-INPUT) (role)
  (let ((role-length (count role inputs :key #'extract-role)))
    (when (> role-length 1)
      (format t "-& >>>>Warning in DF: -a inputs with same role -a for node -a"
              role-length role name))
    (find role inputs :key #'extract-role)))

;;; Find and input in a node with a given role
(defresponse (basic-node :FIND-OUTPUT) (role)
  (let ((role-length (count role outputs :key #'extract-role)))
    (when (> role-length 1)
      (format t "-& >>>>Warning in DF: -a outputs with same role -a for node -a"
              role-length role name))
    (find role outputs :key #'extract-role)))

(defclass BASIC-MODULE
  (:supers basic-node
           kiosk:basic-framework-object)
  (:documentation "a DF level representation of a module"))

;;; Execute a module.  Collect all the input keyword/value pairs from the input tokens,
;;; and collect the output keyword/class pairs from the modules outputs.  Finally, call the
;;; kiosk module (creating it if necessary) with the combined plist, and return the value.
(defresponse (basic-module :EXECUTE) (input-tokens)
  (let ((input-args (mapcan #'(lambda (token) (send token :collect-input-plist))
                            input-tokens))
        (output-types (send self :collect-output-plist)))
    (send* (send self :kiosk-module) :execute (nconc input-args output-types))))

;;; Collect the output keyword/class pairs from a module's outputs.
(defresponse (basic-module :COLLECT-OUTPUT-PLIST) ()
  (mapcan #'(lambda (output)
              (list (send output :role)
                    (send output :get-destination-type)))
          outputs))

;;; Cache a new token at the end of a module's token list.
(defresponse (basic-module :ACCEPT-TOKEN) (token)
  (setq tokens '(,.tokens ,token)))

;;; Remove a set of tokens from a module's token cache.
(defresponse (basic-module :REMOVE-TOKENS) (token-list)
  (remove-if #'(lambda (token) (member token token-list))
             tokens))

;;; Test if a module is enabled.  If so, tell the interpreter about it.  A module is enabled
;;; if it has an unbound token available in its token cache from each of its inputs.
(defresponse (basic-module :MAYBE-ENABLE) (&aux token token-list)
  (dolist (input inputs (send interpreter :create-enablement self token-list))
    (if (setq token (send self :find-unbound-token (send input :role)))
        (push token token-list)
        (return nil))))

;;; Find an unbound token corresponding to a given role.
(defresponse (basic-module :FIND-UNBOUND-TOKEN) (role)
  (find-if #'(lambda (token) (send token :ready-for-enabling? role)) tokens))
```

```
;;; Verify that a module has a given input or output role by checking against its keywords.
;;; Also offer to delete previous connection if one already exists.
;;; Returns t to continue and nil to discontinue adding a new arc.
(defresponse (basic-module :VERIFY-INPUT-KEYWORD?) (role)
  (unless (member role (sand type :input-keywords))
    (error "-A does not have a -A input role." self role))
  (let ((input-arc (sand self :find-input role)))
    (if input-arc
        (let ((ans
                (tv:mouse-y-or-n-p
                  (format nil
                          ">>>>Caution: Existing connection for role -a will be deleted. OK?"
                          role))))
          (when ans
            (sand self :disconnect-input role)
            t))
        t)))

(defresponse (basic-module :VERIFY-OUTPUT-KEYWORD?) (role)
  (unless (member role (sand type :output-keywords))
    (error "-A does not have a -A output role." self role))
  (let ((output-arc (sand self :find-output role)))
    (if output-arc
        (let ((ans
                (tv:mouse-y-or-n-p
                  (format nil
                          ">>>>Caution: Existing connection for role -a will be deleted. OK?"
                          role))))
          (when ans
            (sand self :disconnect-output role)
            t))
        t)))

(defclass BASIC-PLACE
  (:super basic-node)
  (:ivars
    (Xrole
      :settable (:default-init nil)      ;(:format (or (list keyword keyword) nil))
      (:documentation "the external I/O role that this place plays")))
  (:documentation "a location where DF data resides"))

;;; Distribute a new value. Create and transmit a new token to each of the place's outputs,
;;; saving the tokens in its own list.
(defresponse (basic-place :DISTRIBUTE-VALUE) (value time)
  (when (eql (first xrole) :output)
    (setq xrole (list (first xrole) (second xrole) value)))
  (let (token)
    (dolist (output outputs)
      (setq token (sand (sand interpreter :get-class-of :token) :instantiate
                        :role (sand output :role)
                        :value value
                        :place self
                        :timestamp time))
      (setq tokens '(,.tokens ,token))
      (sand output :transmit-token token))
    token))

;;; Remove a token from a place's token buffer
(defresponse (basic-place :REMOVE-TOKEN) (token)
  (setq tokens (delete token tokens)))

;;; Offer to delete existing input if new input connection is being attempted
```

```
(defresponse (basic-place :OK-TO-CONNECT-INPUT?) ()
  (if inputs
      (let* ((arc (car inputs))
             (source-name (sand (sand arc :origin) :graphical-name))
             (ans (tv:mouse-y-or-n-p
                    (format nil
                            ">>>>Caution: Existing connection from ~a will -
                     be deleted. Continue?" source-name))))
        (when ans
          (sand (sand arc :origin) :disconnect-output (sand arc :role))
          t))
      t))

(defresponse (basic-place :RETURN-VALUE) (&aux (role (second xrole))
                                               (value (third xrole)))
  (setf (cddr xrole) nil)
  (when value
    (list role value)))

;;; An arc is a connection between a module and a place, or vice versa. An arc is typed
;;; with the module's role, either input or output, depending on the geometry.
(defclass BASIC-ARC
  ;; (:default-ivar-class format-ivar)
  (:ivars
    (Role
      :initable :gettable              ;(:format keyword)
      (:documentation "the role that data passing over this arc plays"))
    (Origin
      :initable :gettable              ;(:format (OR basic-node basic-join))
      (:documentation "the place data comes from"))
    (Destination
      :initable :gettable              ;(:format (OR basic-node basic-split))
      (:documentation "the place data goes to"))
    (Interpreter
      :initable :gettable              ;(:format DF)
      (:documentation "the DF program instance")))
  (:documentation "a DF program's input or output connection"))

;;; Connect the origin and destination to an arc.
(defresponse (basic-arc :CONNECT) ()
  (sand origin :add-output self)
  (sand destination :add-input self))

(defclass BASIC-MODULE-OUTPUT
  ;; (:default-ivar-class format-ivar)
  (:supers basic-arc)
  (:documentation "a DF module's output connection"))

;;; Transmit a value along an arc from a module to a place, forwarding a copy to the split.
(defresponse (basic-module-output :TRANSMIT-VALUE) (value time)
  (sand destination :distribute-value value time))

;;; Get the type of the place an arc connects with.
(defresponse (basic-module-output :GET-DESTINATION-TYPE) ()
  (sand destination :type))

(defclass BASIC-MODULE-INPUT
  ;; (:default-ivar-class format-ivar)
  (:supers basic-arc)
  (:documentation "a DF module's input connection"))
```

```
;;; Transmit a token from a place to a module
(defresponse (basic-module-input :TRANSMIT-TOKEN) (token)
  (sand destination :accept-token token))

(defun EXTRACT-ROLE (node-or-arc)
  (sand node-or-arc :role))

(defclass BASIC-CONNECTOR
  ;; (:default-ivar-class format-ivar)
  (:supers basic-object)
  (:documentation "a connection of one or more arcs into one or more arcs"))

;;; Find and input in a node with a given role.
(defresponse (basic-connector :FIND-INPUT) (role)
  (find role inputs :key #'extract-role))

;;; Find and input in a node with a given role
(defresponse (basic-connector :FIND-OUTPUT) (role)
  (find role outputs :key #'extract-role))

(defclass BASIC-SPLIT
  ;; (:default-ivar-class format-ivar)
  (:supers basic-connector)
  (:documentation "a split of one module output into many"))

(defresponse (basic-split :DISTRIBUTE-VALUE) (value time)
  (dolist (mo outputs)
    (sand mo :transmit-value value time)))

(defresponse (basic-split :TYPE) ()
  (if outputs
      (sand (first outputs) :get-destination-type)
      (error "The split does not have any outputs")))

(defclass BASIC-JOIN
  ;; (:default-ivar-class format-ivar)
  (:supers basic-connector)
  (:documentation "a join of many module intputs into one"))

(defresponse (basic-join :ACCEPT-TOKEN) (token)
  (dolist (mi outputs)
    (sand mi :transmit-token token)))

(in-package 'df)

;;;; Definition of DF interpreter support objects.

(defclass BASIC-ENABLEMENT
  ;; (:default-ivar-class format-ivar)
  (:ivars
    (module
      :initable :gettable                    ;(:format module)
      (:documentation "the module to be executed"))
    (tokens
      :initable :gettable                    ;(:format (listof token))
      (:documentation "the arguments to be operated upon")))
  (:documentation "an object that represents a DF module invocation"))
```

```
;;; Executes an enablement. First snarfs the tokens out of the places they came from, and
;;; removes the tokens from the module. Finally, an :EXECUTE message is sent to the module
;;; with the tokens as arguments.
(defresponse (basic-enablement :EXECUTE) ()
  (dolist (token tokens)
    (sand token :remove-from-place))
  (sand module :remove-tokens tokens)
  (sand module :execute tokens))

;;; Sorts all the tokens in an enablement by decreasing age (increasing timestamp).
;;; This should happen as a part of the :INIT message.
(defresponse (basic-enablement :SORT-TOKENS) ()
  (sort tokens #'< :key #'(lambda (token) (sand token :timestamp))))

(defclass BASIC-TOKEN
  ;; (:default-ivar-class format-ivar)
  (:ivars
    (role
      :settable                              ;(:format keyword)
      (:documentation "role the token plays in an enablement"))
    (value
      :initable                              ;(:format any)
      (:documentation "an adt which embodies the data"))
    (enablement
      (:default-init nil)                    ;(:format (or enablement nil))
      (:documentation "enablement the token participates in, or NIL if the token is free"))
    (place
      :initable                              ;(:format place)
      (:documentation "the current location of the data"))
    (timestamp
      :initable :gettable                    ;(:format integer)
      (:documentation "an indication of the data's age")))
  (:documentation "DF encapsulation of data"))

;;; Print a token semi-readably. Check for unbound ivars first.
(defresponse (basic-token :PRINT-SELF) (stream &rest ignore)
  (si:printing-random-object (self stream :typep)
    (format stream "-A: -A"
            (if (scl:variable-boundp role) role '*UNBOUND*)
            (if (scl:variable-boundp value) value '*NOVALUE*))))

;;; Snarf a token from its place, in anticipation of module execution.
(defresponse (basic-token :REMOVE-FROM-PLACE) ()
  (sand place :remove-token self))

;;; Returns a new list of token role/value, to send in an :EXECUTE message to a module.
(defresponse (basic-token :COLLECT-INPUT-PLIST) ()
  (list role value))

;;; Bind a token to an enablement.
(defresponse (basic-token :BIND) (new-enablement)
  (if enablement
      (error "-A is already bound to -A." self enablement)
      (setq enablement new-enablement)))

;;; Check to see if a token can participate in an enablement with a particular input role.
(defresponse (basic-token :READY-FOR-ENABLING?) (to-role)
  (and (null enablement)                     ;token is unbound
       (eql to-role role)))                  ;and created for just that role
```

```
(in-package 'df)

;;;;   The DF interpreter execution.                              BEST AVAILABLE COPY ;;; Provide the program interface to the DF interpreter.
(defresponse (basic-df :EXECUTE) (&rest keys &key (cycles 1000) &allow-other-keys)
  (let ((time (sand self :current-time))
        input-place)
    (do-plist (role value keys)                    ;parse the input keywords
      (cond ((eq role :CYCLES))                    ;ignoring DF specific ones
            ((setq input-place (find role all-input-places
                                     :key #'(lambda (p) (second (sand p :xrole))))))
             ;; input place matches an input key, so distribute the value to the modules
             (sand input-place :distribute-value value time))
            ((find role all-output-places          ;ignore output keys for now
                   :key #'(lambda (p) (second (sand p :xrole))))))
            ((error "The I/O keyword ~s is unknown." role))))
    (sand self :main-loop cycles)                  ;call the main interpreter
    (mapcan #'(lambda (output) (sand output :return-value))   ;and return with values
            all-output-places)))

;;; Reset the interpreter by nuking all extant tokens and flushing the queues.
(defresponse (basic-df :RESET) ()
  (setq enablement-priority-q nil)
  (dolist (module all-modules)
    (sand module :reset)
    (sand module :set-tokens nil))
  (dolist (place all-places)
    (sand place :set-tokens nil))
  (dolist (place all-input-places)
    (sand place :set-tokens nil)
    (sand place :set-xrole (list :input (second (sand place :xrole)))))
  (dolist (place all-output-places)
    (sand place :set-tokens nil)
    (sand place :set-xrole (list :output (second (sand place :xrole))))))

;;; Loop for a given number of cycles, taking the highest priority enablement and executing
;;; it.  If nothing is enabled then just return.
;;; **** Need to handle source modules
(defresponse (basic-df :MAIN-LOOP) (cycles)
  (sand self :check-for-enablements)

(dotimes (i cycles)
    (let (enablement results)
      (setq enablement
            (or (sand self :next-enablement)
                (sand self :next-source-enablement)))
      (unless enablement
        (return nil))
      (setq results (sand enablement :execute))
      (sand self :distribute-tokens (sand enablement :module) results)
      (sand self :check-for-enablements)
      (sand self :sand-if-handles :end-of-cycle-hook enablement))))

;;; Hook for tracing etc.
(defresponse (basic-df :END-OF-CYCLE-HOOK) (enablement)
  enablement)

;;; Distribute module results through its outputs
(defresponse (basic-df :DISTRIBUTE-TOKENS) (module results &aux output)
```

```
      (let ((time (sand self :current-time)))      ;all the tokens will have the same time
        (do-plist (role value results)
          (setq output (sand module :find-output role))
          (when output
            (sand output :transmit-value value time)))))

;;; Query all modules to see if they are enabled
;;; **** Should just query the modules that received token from the last module execution.
(defresponse (basic-df :CHECK-FOR-ENABLEMENTS) ()
  (mapc #'(lambda (module) (sand module :maybe-enable))
        all-modules))

;;; Create an enablement, adding it to the current list of enablements
(defresponse (basic-df :CREATE-ENABLEMENT) (module tokens)
  (let ((enablement (sand (sand self :get-class-of :enablement) :instantiate
                          :module module
                          :tokens tokens)))
    (mapc #'(lambda (token) (sand token :bind enablement)) tokens)
    (sand self :add-enablement enablement)))

;;; Get a unique time for token timestamps.
(defresponse (basic-df :CURRENT-TIME) ()
  (incf current-time))

;;; Take the highest priority enablement off the queue
(defresponse (basic-df :NEXT-ENABLEMENT) ()
  (pop enablement-priority-q))

;;; **** This doesn't work now.
(defresponse (basic-df :NEXT-SOURCE-ENABLEMENT) ()
  (when sources-circular-q
    (setf sources-circular-q (append (cdr sources-circular-q)
                                     (list (car sources-circular-q))))
    (car (last sources-circular-q))))

;;; Add a new enablement in to the queue, highest priority first.
(defresponse (basic-df :ADD-ENABLEMENT) (enablement)

(sand enablement :sort-tokens)
  (if (null enablement-priority-q)
      (setq enablement-priority-q (list enablement))
      (do ((queue enablement-priority-q (cdr queue)))
          ((null queue) (nconc enablement-priority-q (list enablement)))
        (when (higher-priority enablement (first queue))
          ;; do a little list surgery to get the new enablement in the correct place
          ;; could use a RPLNODE here
          (let ((new-node (cons (car queue) (cdr queue))))
            (rplaca queue enablement)
            (rplacd queue new-node))
          (return nil)))))

;;; Compares two enablements, by comparing the token lists in the enablements in
;;; lexicographic order by timestamp. If two token lists are equal to the end of one list,
;;; the shorter list has higher priority. Returns T if the first enablement has higher
;;; priority, NIL otherwise.
(defun HIGHER-PRIORITY (en1 en2)
  (do ((token-list1 (sand en1 :tokens) (cdr token-list1))
       (token-list2 (sand en2 :tokens) (cdr token-list2))
       time1 time2)
      ((and (null token-list1) (null token-list2))
       ;; they are twins, so choose among them randomly
       (= (random 2) 1))
```

BEST AVAILABLE COPY

```
(cond ((null token-list1) (return t))
      ((null token-list2) (return nil)))
(setf time1 (sand (first token-list1) :timestamp)
      time2 (sand (first token-list2) :timestamp))
(cond ((= time1 time2))                    ;compare next token
      ((< time1 time2) (return t))         ;t1 is older
      (t (return nil)))                    ;t2 is older
))
```

BEST AVAILABLE COPY

APPENDIX III    Code listing for the Procedural Module Control (PMC) Framework

```
;;;
;;;     COPYRIGHT (c) 1986 BY TEKNOWLEDGE, INC -- ALL RIGHTS RESERVED
;;;
;;;
;;;
;;;
;;;
;;;
;;;
;;;
;;;

;;; jst: Global comments
;;;     All ivar references should be in Mixed Case
;;;     Include :format decls for ivars, or make the :documentation more descriptive (in-package 'pmc)

;;; The PMC-CLASS is the metaclass of BASIC-PMC. Definition mechanism for PMC
;;; programs. Shows how a defining form is instantiated into an actual class.
;;; The responses of the BASIC-PMC include responses for creating PMC objects,
;;; deleting PMC objects, and the interpreter.
;;;

(defvar *ALL-PMC-PROGRAMS* '()
  "a list of the names (symbols) of all defined PMC programs")
(pushnew '*all-pmc-programs* kiosk:*all-kiosk-module-vars*)

(eval-when (compile load eval)
  (defvar *DEFAULT-INTERPRETER-CLASSES-PLIST*
          '(
            :start      start
            :halt       halt
            :module     module
            :box        box
            :choice     choice
            :link       link
            :variable   variable
            )
    "default plist for specifying interpreter classes")
  )
```

```
(defclass PMC-CLASS
  (:supers kiosk:basic-framework-class)
  ;; (:default-ivar-class default-init-null-format-ivar)    BEST AVAILABLE COPY
  (:ivars
    (Interpreter-Classes                       ;(:format (plistof keyword interpreter-class))
      :initable (:default-init *default-interpreter-classes-plist*)
      (:documentation "the classes of components to instantiate"))
    (Starts                                    ;(:format (start-form))
      :initable (:default-init '())
      (:documentation "list of one start definition. Note that Starts is maintained
         as a list for reasons of uniformity, and to avoid special handling especially
         in the graphical editor"))
    (Halts                                     ;(:format (listof halt-form))
      :initable (:default-init '())
      (:documentation "list of halt definitions"))
    (Modules                                   ;(:format (listof module-form))
      :initable (:default-init '())
      (:documentation "list of module definitions"))
    (Boxes                                     ;(:format (listof box-form))
      :initable (:default-init '())
      (:documentation "list of box definitions"))
    (Choices                                   ;(:format (listof choice-form))
      :initable (:default-init '())
      (:documentation "list of choice definitions"))
    (Links                                     ;(:format (listof link-form))
      :initable (:default-init '())
      (:documentation "list of link definitions"))
    (Variables                                 ;(:format (listof variable-form))
      :settable
      (:default-init '())
      (:documentation "a list of all variables in the program"))
  )
  (:documentation "The metaclass for the PMC interpreter - instances define PMC programs"))

(defresponse (pmc-class :PARSE-STARTS) (option ignored)
  "handles the :starts option in define-program"
  (setq Starts (rest option)
        coral::init-plist (list* (first option) '(quote ,Starts) coral::init-plist)))

(defresponse (pmc-class :PARSE-HALTS) (option ignored)
  "handles the :halts option in define-program"
  (setq Halts (rest option)
        coral::init-plist (list* (first option) '(quote ,Halts) coral::init-plist)))

(defresponse (pmc-class :PARSE-MODULES) (option ignored)
  "handles the :modules option in define-program"
  (setq Modules (rest option)
        coral::init-plist (list* (first option) '(quote ,Modules) coral::init-plist)))

(defresponse (pmc-class :PARSE-BOXES) (option ignored)
  "handles the :boxes option in define-program"
  (setq Boxes (rest option)
        coral::init-plist (list* (first option) '(quote ,Boxes) coral::init-plist)))

(defresponse (pmc-class :PARSE-CHOICES) (option ignored)
  "handles the :choices option in define-program"
  (setq Choices (rest option)
        coral::init-plist (list* (first option) '(quote ,Choices) coral::init-plist)))
```

```
(defresponse (pmc-class :PARSE-LINKS) (option ignored)
  "handles the :links option in define-program"
  (setq Links (rest option)
        coral::init-plist (list* (first option) '(quote ,Links) coral::init-plist)))

(defresponse (pmc-class :PARSE-VARIABLES) (option ignored)
  "handles the :variables option in define-program"

(setq Variables (rest option)
        coral::init-plist (list* (first option) '(quote ,Variables)
                                 coral::init-plist)))

;;; These three messages provide the interface as an ABE framework.
(defresponse (pmc-class :INPUT-KEYWORDS) ()
  (mapcar #'(lambda (var-spec)
              (keyword (second var-spec)))
          (collect-if #'(lambda (var-spec)
                          (eq (first var-spec) ':input))
              Variables)))

(defresponse (pmc-class :OUTPUT-KEYWORDS) ()
  (mapcar #'(lambda (var-spec)
              (keyword (second var-spec)))
          (collect-if #'(lambda (var-spec)
                          (eq (first var-spec) ':output))
              Variables)))

(defresponse (pmc-class :PORT-KEYWORDS) ()
  nil)

;;; After creating an instance of an interpreter, create the associated graph structure.
;;; Note - the order of the dolists matters.
(defresponse (pmc-class :AROUND :INSTANTIATE) (&rest init-plist)
  (let ((instance (continue-sand* init-plist)))
    (sand instance :set-interpreter-classes
          (if (symbolp Interpreter-Classes)
              (symbol-value Interpreter-Classes)
              Interpreter-Classes))
    (sand* instance :create-start (first Starts))
    (dolist (halt-spec Halts)
      (sand* instance :create-halt halt-spec))
    (dolist (module-spec Modules)
      (sand* instance :create-module module-spec))
    (dolist (box-spec Boxes)
      (sand* instance :create-box box-spec))
    (dolist (choice-spec Choices)
      (sand* instance :create-choice choice-spec))
    (dolist (link-spec Links)
      (sand* instance :create-link link-spec))
    (dolist (var-box-spec Variables)
      (sand* instance :create-variable var-box-spec))
    ;; set up the PMC interpreter after creating all the variables
    (sand instance :preset)
    instance))

(defmacro DEFINE-PMC-PROGRAM (name &body options)
  "Transforms a define-pmc-program into a defclass."
  '(progn
```

```
(defclass ,name
  (:meta-class pmc-class)
  (:supers pmc)
  (:implementation :pmc)
  (:instantiable-p t)
  ,@options)
(pushnew ',name *all-pmc-programs*)
',name))

(:documentation "The PMC interpreter"))
(defclass BASIC-PMC
  (:meta-class pmc-class)
  (:supers kiosk:module)
  ;; (:default-ivar-class format-ivar)
  (:ivars
    (Interpreter-Classes                        ;(:format (plistof keyword interpreter-class))
      :settable
      (:default-init *default-interpreter-classes-plist*)
      (:documentation "an alist that determines what class of subcomponents to instantiate"))
    (All-Starts                                 ;(:format (basic-start))
      (:default-init '())
      (:documentation "a list of the only start in the program, the :CREATE-START
          response makes sure of this. Note that All-Starts is maintained
          as a list for reasons of uniformity, and to avoid special handling especially
          in the graphical editor"))
    (All-Halts                                  ;(:format (listof basic-halt))
      (:default-init '())
      (:documentation "a list of all halts in the program"))
    (All-Modules                                ;(:format (listof basic-module))
      (:default-init '())
      (:documentation "a list of all modules in the program"))
    (All-Boxes                                  ;(:format (listof basic-box))
      (:default-init '())
      (:documentation "a list of all boxes in the program"))
    (All-Choices                                ;(:format (listof basic-choice))
      (:default-init '())
      (:documentation "a list of all choices in the program"))
    (All-Links                                  ;(:format (listof basic-link))
      (:default-init '())
      (:documentation "a list of all links in the program"))
    (All-Variables                              ;(:format (listof basic-variable))
      :gettable
      (:default-init '())
      (:documentation "a list of all input variables in the program"))
    (Variable-Storage-Class                     ;(:format symbol)
      :gettable
      (:default-init nil)
      (:documentation "this class has all program variable symbols as its ivars, and the
          code of each box and choice as its response"))
    (Executor                                   ;(:format Variable-Storage-Class)
      :gettable
      (:default-init nil)
      (:documentation "the PMC Variable-Storage-Class instance"))
    ;; ***? Do these ivars belong in the editor?
    (Program-Name                               ;(:format string)
      ;; ***? Use this, not being used right now.
      :settable
      (:default-init "")
      (:documentation "the name of this program"))
```

```
(Input-List                                    ;(:format (plistof keyword value))
  :settable
  (:default-init '())
  (:documentation "the list of role values used for running"))
)

;;; Lookup the class of an interpreter object.
(defresponse (basic-pmc :GET-CLASS-OF) (object-type)
  (or (getf Interpreter-Classes object-type)
      (error "Unknown interpreter object type ~S." object-type)))

;;; Responses for the input, local, and output variables.
(defresponse (basic-pmc :INPUT-VARIABLES) ()
  (collect-if #'(lambda (var)
                  (when (equal :input (sand var :type))))
              All-Variables))

(defresponse (basic-pmc :LOCAL-VARIABLES) ()
  (collect-if #'(lambda (var)
                  (when (equal :local (sand var :type))))
              All-Variables))

(defresponse (basic-pmc :OUTPUT-VARIABLES) ()
  (collect-if #'(lambda (var)
                  (when (equal :output (sand var :type))))
              All-Variables))

;;; ***? Will this retrofitted into ABE, somewhat?
(defresponse (basic-pmc :INPUT-KEYWORDS) ()
  (mapcar #'(lambda (in-var)
              (keyword (sand in-var :variable-symbol)))
          (sand self :input-variables)))

(defresponse (basic-pmc :GET-VAR) (var-sym)
  "given the Variable symbol returns the Variable"
  (let (the-var)
    (if (setq the-var
              (find var-sym All-Variables
                    :key #'(lambda (var) (sand var :variable-symbol))))
        the-var
        (error "No Variable with Variable Symbol ~S found." var-sym))))
;;; Responses to find nodes in the interpreter (defresponse (basic-pmc :MODULE-AT-PATH) (path &aux component)
  "copied over from DF, a generic ABE mechanism message"
  ;; jst: Why not (setq component (sand self :intern-module (first path)))  ;intern-module
  ;; also provides an error message, so you don't need the next statement either
  (setq component (or (find (first path) All-Modules
                            :test #'(lambda (name module)
                                      (string-equal name (sand module :name))))))
  (unless component
    (error "The PMC program ~s does not have a component ~s." self (first path)))
  (if (rest path)
      (sand (sand component :kiosk-module) :module-at-path (rest path))
      component))

;;; *** Is the intern-xxx message the kind of thing that might be changed?
;;; It looks the instance instead of name would work fine, but then how about
;;; the defining form?
;;; Check into this.
```

```
(eval-when (compile)                              ;stupid compiler!
  (defconstant *NODE-LIST-PRETTY-NAME-ALIST*
              '((All-Starts      . "start")
                (All-Halts       . "halt")
                (All-Modules     . "module")
                (All-Boxes       . "box")
                (All-Choices     . "choice")
                (All-Variables   . "variable"))
    "Alist for finding and generating error messages in :intern-xxx responses"))

(defun EXTRACT-NAME (node)
  (sand node :name))

(defmacro CHECK-NODE-NAMED (name node-list error-p)
  (let ((nodevar (gensym))                        ;bullet-proof the var and name references
        (namevar (gensym))
        (type (or (cdr (assoc node-list *node-list-pretty-name-alist*))
                  (error "Unknown node list -S." node-list))))
    '(let* ((,namevar ,name)
            (,nodevar (find ,namevar ,node-list :test #'string-equal :key #'extract-name)))
       (cond (,nodevar)
             (error-p (error "No -S named -S exists." ,type ,namevar))
             (T NIL)))))

;;; These responses check for the existance of a node, optionally signalling an error if the
;;; node doesn't exist. If found, the node is returned.

(defresponse (basic-pmc :INTERN-START) (start-name &key (error-p t))
  (check-node-named start-name All-Starts error-p))

(defresponse (basic-pmc :INTERN-HALT) (halt-name &key (error-p t))
  (check-node-named halt-name All-Halts error-p))

(defresponse (basic-pmc :INTERN-MODULE) (module-name &key (error-p t))
  (check-node-named module-name All-Modules error-p))

(defresponse (basic-pmc :INTERN-BOX) (box-name &key (error-p t))
  (check-node-named box-name All-Boxes error-p))

(defresponse (basic-pmc :INTERN-CHOICE) (choice-name &key (error-p t))
  (check-node-named choice-name All-Choices error-p))

(defresponse (basic-pmc :INTERN-VARIABLE) (var-name &key (error-p t))
  (check-node-named var-name All-Variables error-p))

;;; ***? This could be buggy if two objects have the same name.
;;; jst: Why not check for same names and signal an error?
;;; ksb: Another way is to require the object name and type.
(defresponse (basic-pmc :INTERN-OBJECT) (obj-name &key (error-p t))
  (or (check-node-named obj-name All-Starts nil)
      (check-node-named obj-name All-Halts nil)
      (check-node-named obj-name All-Modules nil)
      (check-node-named obj-name All-Boxes nil)
      (check-node-named obj-name All-Choices nil)
      (not error-p)
      (error "No object named -S exists." obj-name)))
```

;;; Create Start, Halts, Modules, Boxes, Choices, Links, Variables.

```lisp
(defresponse (basic-pmc :CREATE-START) (name &rest options &aux instance)
  (when (sand self :intern-start name :error-p nil)
    (error "Start with name ~s already exists." name))
  (setq instance (sand* (sand self :get-class-of :start) :instantiate
                        :name name
                        :interpreter self
                        options))
  (when All-Starts
    (error "Trying to create another Start."))
  (setq All-Starts (list instance))
  instance)

(defresponse (basic-pmc :CREATE-HALT) (name &rest options &aux instance)
  (when (sand self :intern-halt name :error-p nil)
    (error "Halt with name ~s already exists." name))
  (setq instance (sand* (sand self :get-class-of :halt) :instantiate
                        :name name
                        :interpreter self
                        options))
  (push instance All-Halts)
  instance)

(defresponse (basic-pmc :CREATE-MODULE) (name class &rest options &aux instance)
  (when (sand self :intern-module name :error-p nil)
    (error "Module with name ~s already exists." name))
  (setq instance (sand* (sand self :get-class-of :module) :instantiate
                        :name name
                        :interpreter self
                        :framework self
                        :kiosk-class class
                        options))
  (push instance All-Modules)
  instance)

(defresponse (basic-pmc :CREATE-BOX) (name &rest options &aux instance)
  (when (sand self :intern-box name :error-p nil)
    (error "Box with name ~s already exists." name))
  (setq instance (sand* (sand self :get-class-of :box) :instantiate
                        :name name
                        :interpreter self
                        options))
  (push instance All-Boxes)
  instance)

(defresponse (basic-pmc :CREATE-CHOICE) (name &rest options &aux instance)
  (when (sand self :intern-choice name :error-p nil)
    (error "Choice with name ~s already exists." name))
  (setq instance (sand* (sand self :get-class-of :choice) :instantiate
                        :name name
                        :interpreter self
                        options))
  (push instance All-Choices)
  instance)

(defresponse (basic-pmc :CREATE-LINK) (name obj1-name obj2-name &rest options)
  (let ((obj1 (sand self :intern-object obj1-name :error-p nil))
        (obj2 (sand self :intern-object obj2-name :error-p nil))
        link)
```

```
     (when (and obj1 obj2)
       (setq link (sand* (sand self :get-class-of :link) :instantiate
                         :name name
                         :origin obj1
                         :destination obj2
                         :interpreter self
                         options))
       (push link All-Links)
       (sand link :connect))
     link))

;;; The slightly odd form of the variables is to easily know
;;; the input/output variables as the input/output keywords from an ABE framework
;;; point of view.
(defresponse (basic-pmc :CREATE-VARIABLE) (var-type var-symbol &rest options)
  (let ((v-name (string var-symbol))
        instance)
    (when (sand self :intern-variable v-name :error-p nil)
      (error "Variable with name ~s already exists." v-name))
    (unless (find var-type '(:input :output :local))
      (error "Incorrect type for a variable: ~s." var-type))
    (setq instance (sand* (sand self :get-class-of :variable) :instantiate
                          :name v-name
                          :type var-type
                          :variable-symbol var-symbol
                          :interpreter self
                          options))
    ;; reset the Interpreter
    (when executor
      (setq executor nil))
    (push instance All-Variables)
    instance))

;;; Delete responses for Module, Box, Choice, Link, Variable.
;;; *** Could do error checking here to make sure the deleted object is found.

(defresponse (basic-pmc :DELETE-START) (name)
  (let ((start (sand self :intern-start name)))
    (sand start :disconnect-all)
    (setq all-starts (remove start all-starts))))

(defresponse (basic-pmc :DELETE-HALT) (name)
  (let ((halt (sand self :intern-halt name)))
    (sand halt :disconnect-all)
    (setq all-halts (remove halt all-halts))))

(defresponse (basic-pmc :DELETE-MODULE) (name)
  (let ((module (sand self :intern-module name)))
    (sand module :disconnect-all)
    (setq all-modules (remove module all-modules))))

(defresponse (basic-pmc :DELETE-BOX) (name)
  (let ((box (sand self :intern-box name)))
    (sand box :disconnect-all)
    (setq all-boxes (remove box all-boxes))))

(defresponse (basic-pmc :DELETE-CHOICE) (name)
  (let ((choice (sand self :intern-choice name)))
```

```
    (sand choice :disconnect-all)
    (setq all-choices (remove choice all-choices))))

(defresponse (basic-pmc :DELETE-LINK) (from to link)
  (sand from :delete-output link)
  (sand to :delete-input link)
  (when (find link all-links :test #'equal)
    (setq all-links (remove link all-links))
    t))

;;; *** This does error checking.  Should the others change like this too?
(defresponse (basic-pmc :DELETE-VARIABLE) (a-var)
  (when (find a-var all-variables)
    (setq all-variables
          (remove a-var all-variables))
    ;; Reset the Interpreter.
    (when executor
      (setq executor nil))
    ;; Remove all references to this variable.
    (dolist (io-obj (append All-Boxes All-Choices All-Modules))
      (sand io-obj :remove-var-reference (sand a-var :variable-symbol)))
    t))

;;;
;;; The PMC interpreter. A flowchart like connected diagram consists of Boxes, Choices,
;;; Modules, a Start, and Halts. They are connected by Links. The Box and module have
;;; only one object connected on output, which is the next object to be executed. A Choice
;;; can have many objects connected on output. The executuion of the Choice returns a link
;;; name, which indicates the next object to be executed. A PMC program execution begins
;;; from a Start, of which there is only one. A PMC program halts at a Halt, of
;;; which there may be many.
;;;
;;; A PMC program has input, output, and local Variables. The input and output Variables
;;; serve as the input and output keywords when the PMC program itself behaves as an ABE
;;; module. All Variables can be used in the Boxes and Choices. For a module a mapping is
;;; done between any of the PMC variables and the input/output keywords of the module. So
;;; when the module runs it takes in values from some of the PMC variables, executes, and
;;; then changes the values of those PMC Variables which are mapped along its roles.

(defun MAKE-VARIABLE-IVAR (name-value)
  "take in a a cons of the ivar and its value"
  `(,(first name-value) :settable (:default-init ,(rest name-value))
    (:documentation "a variable of the program")))

;;; ***? Intern in cl-user instead of pmc, since some of the interface
;;; for mapping modules to variables deals only with cl-user symbols.
;;; This is true now for writing lisp code for nodes in TV:Choose-Variable-Values.
;;; Is this also related to the ABE desktop?
;;; *** Check for var-name that has special characters like blank, semi-colon, etc.
;;; This will look a little funny when asking for input keywords before running.

(defun make-pmc-symbol (var-name)
  (intern (string-upcase var-name) 'cl-user))

(defmacro DEFINE-VARIABLE-STORAGE-CLASS (name var-value-list)
  "defines a class with ivars for all variables, responses to get and set ivars"
  `(progn
     (defclass ,name
       (:ivars ,@(mapcar #'make-variable-ivar var-value-list)))
```

```
      (defresponse (.name :set-var-value) (var value)
        (sand self :eval-inside-yourself (list 'setq var value)))
      (defresponse (.name :get-var-value) (var)
        (sand self :eval-inside-yourself var))))

(defresponse (basic-pmc :PRESET) ()
  "sets up the interpreter by creating the executor class, responses, instance"
  (let ((all-vars (mapcar #'(lambda (var)
                              (cons (sand var :variable-symbol) nil))
                          All-Variables)))
    (setq Variable-Storage-Class (gensym (string 'variable-storage)))
    (eval '(define-variable-storage-class
             ,variable-storage-class ,all-vars))  ; Compiler complains.
    (dolist (a-node (append All-Choices All-Boxes))
      (sand a-node :update-class Variable-Storage-Class))
    (setq Executor (sand Variable-Storage-Class :instantiate))))

;;;*** No check right now to see if all inputs have been given.

;;; ***? This is a temporary crock, wait till ABE desktop processes have
;;; been fixed.
(defresponse (basic-pmc :EXECUTE) (&rest in-keylist)
  "the ABE level execute message for a framework module"
  (if (sand self :viewers)
      (temp-set-and-run self in-keylist)
      (sand self :set-and-run in-keylist))
  (sand self :give-outputs))

;;; ***? This is temporarily modified from kiosk, will change.
(defresponse (basic-pmc :GET-INPUTS) (&aux form inputs allowable-inputs)
  (setq allowable-inputs (sand self :input-keywords))
  (format t "-&Enter a form to be evaled for each input to -s (or :none)"
          (sand self :class))
  (dolist (i allowable-inputs)
    (format t "-&Input -a> " i)
    (setq form (read t))
    (when (not (eql form :none))
      (push i inputs)
      (push (eval form) inputs)))
  (reverse inputs))

(defresponse (basic-pmc :GIVE-OUTPUTS) ()
  "returns a list of output-keywords and values like any ABE module"
  (let ((out-plist '()))                          ;output plist of keyword roles and values.
    (dolist (a-var (sand self :output-variables))
      (pconsf out-plist
              (keyword (sand a-var :variable-symbol))
              (sand a-var :get-value)))
    out-plist))

;;; ***? This is a temporary kludge to make things work in the existing
;;; state of the desktop.
(defun TEMP-SET-AND-RUN (pmc-module &optional inputs)
  (if :run-in-desktop-process-if-possible
      (sand (car (sand pmc-module :viewers)) :superior)
      #'(lambda (mod ins) (sand mod :set-and-run ins)) pmc-module inputs))

;;; *** What if no inputs are given intentionally?
```

```
(defresponse (basic-pmc :SET-AND-RUN) (&optional inputs)
  "get inputs, modify variables accordingly, and run"
  (let ((input-vars (sand self :input-variables)))
    (unless Executor
      (sand self :preset))
    (when input-vars
      (unless inputs
        (setq inputs
              ;; ***? Are there tradeoffs between getting inputs from the editor or
              ;; like other ABE frameworks?
              ;;(sand self :get-inputlist)))   ; From the editor.
              (sand self :get-inputs)))
      (when inputs
        ;; Set the values of the Input Variables.
        (do-plist (var val inputs)
          (sand Executor :set-var-value (make-pmc-symbol var) val))))
    (sand self :run)))

;;; The execution of any node returns the next node to be executed.
(defresponse (basic-pmc :RUN) ()
  "the loop which runs the next node till a halt node is found"
  (let ((halt-class (sand self :get-class-of :halt))
        (next-node (first All-Starts)))
    (unless next-node
      (error "No start place found."))
    (loop
      (when (typep next-node halt-class)
        (sand next-node :execute-local)         ;Flash the halt node.
        (return (values)))                      ;Compiler needs (values).
      (setq next-node (sand next-node :execute-local)))))

;;; The Consistency Checking of a PMC program.

(defresponse (basic-pmc :DISCONNECTED-ITEMS) ()
  "returns a list of action items that are not connected"
  (let
    ((all-items (append All-Starts All-Halts
                        All-Boxes All-Choices All-Modules))   ; List of all items.
     (visit-items All-Starts)                   ; Items to be visited.
     (visited-items '())                        ; Items already visited.
     the-item                                   ; Item under consideration.
     (loose-items '())                          ; The disconnected items.
     )
    (cl:loop
      (unless visit-items
        (return (values)))
      (setq the-item (pop visit-items))
      (push the-item visited-items)
      ;; Visit an item if it has not already been visited.
      (setq visit-items
            (append visit-items
                    (collect-if #'(lambda (elt)
                                    (not (find elt visited-items)))
                                (mapcar #'(lambda (link)
                                            (sand link :destination))
                                        (sand the-item :outputs))))))
    (dolist (an-item all-items)
      (unless (find an-item visited-items)
```

```
              (push an-item loose-items)))
        loose-items))

(defresponse (basic-pmc :UNUSED-VARS) ()
  "returns a list of all variables whose value has not been accessed"
  (let* ((all-items (append All-Boxes All-Choices All-Modules)) ; All items with variables.
         (all-used-var-syms '())                 ; User specified accessed variable symbols.
         (needed-set-vars                        ; Variables that should be accessed.
            (append (sand self :local-variables)
                    (sand self :input-variables)))
         (unused-vars '()))                      ; Variables not accessed.
    (dolist (an-item all-items)
      (setq all-used-var-syms
            (append all-used-var-syms (sand an-item :in-vars))))
    (dolist (a-var needed-set-vars)
      (unless
        (find (sand a-var :variable-symbol) all-used-var-syms)
        (push a-var unused-vars)))
    unused-vars))

(defresponse (basic-pmc :UNSET-VARS) ()
  "returns a list of all variables whose value has not been set"
  (let* ((all-items (append All-Boxes All-Choices All-Modules)) ; All items with variables.
         (all-set-var-syms '())                  ; User specified set variable symbols.
         (needed-set-vars                        ; Variables that should be set.
            (append (sand self :local-variables)
                    (sand self :output-variables)))

(unset-vars '()))                       ; Variables not set.
    (dolist (an-item all-items)
      (setq all-set-var-syms
            (append all-set-var-syms (sand an-item :out-vars))))
    (dolist (a-var needed-set-vars)
      (unless
        (find (sand a-var :variable-symbol) all-set-var-syms)
        (push a-var unset-vars)))
    unset-vars))

(defresponse (basic-pmc :CONSISTENCY-CHECK) ()
  (let ((warnings '())                           ; List of all warnings.
        loose-items                              ; Disconnected action items.
        unset-vars                               ; Variables not set.
        unused-vars                              ; Variables not accessed.
        )
    (unless All-Starts
      (push "Start Action Item not defined." warnings))
    (unless All-Halts
      (push "No Halt Action Item defined." warnings))
    (when (setq loose-items (sand self :disconnected-items))
      (push
        (format nil "Disconnected Action Items: -30T-{ -A-}."
                (mapcar #'(lambda (itm)
                            (sand itm :describe))
                        loose-items))
        warnings))
    (when (setq unused-vars (sand self :unused-vars))
      (push
        (format nil "Variables not Accessed: -30T-{ -A-}."
```

```
              (mapcar #'(lambda (itm)
                          (sand itm :describe))
                      unused-vars))
      warnings))
(when (setq unset-vars (sand self :unset-vars))
  (push
    (format nil "Variables not Set: -30T-{ -A-}."
            (mapcar #
```

```
;;; -*- Mode: LISP; Syntax: Common-lisp; Package: PMC; Base: 10 -*-
;;;
;;;
;;; JST:>abe>pmc>nodes.lisp.37, 11/04/86 13:56:58, Edit by JLARK
;;;
;;;
;;;
;;;
;;;       COPYRIGHT (c) 1986 BY TEKNOWLEDGE, INC -- ALL RIGHTS RESERVED
;;;
;;; This program contains proprietary information of Teknowledge, Inc and its
;;; receipt or possession does not convey any rights to reproduce, disclose its
;;; contents, or to manufacture, use, or sell anything it may describe.
;;; Reproduction, disclosure, or use without specific written authorization of
;;; Teknowledge, Inc is strictly forbidden.

(in-package 'pmc)

;;; The hierarchy of the class definitions of the objects in PMC.
;;; Objects defined are:
;;; BASIC-OBJECT, BASIC-VARIABLE, BASIC-IO-OBJECT, BASIC-START, BASIC-HALT,
;;; BASIC-MODULE, BASIC-NODE, BASIC-BOX, BASIC-CHOICE, BASIC-LINK.

(defclass BASIC-OBJECT
  ;; (:default-ivar-class format-ivar)
  (:ivars
    (Name
      :initable :gettable
      (:default-init (string (gensym "No-name")))   ;(:format string)
      (:documentation "the name of the object"))
    (Interpreter
      :initable :gettable                            ;(:format PMC)
      (:documentation "the PMC program")))
  (:documentation "the root of first-class PMC objects"))

(defresponse (basic-object :PRINT-SELF) (stream &rest ignore)
  (si:printing-random-object (self stream :typep)
    (princ Name stream)))

(defresponse (basic-object :CHANGE-NAME) (new-name)
  (check-type new-name string)
  (setq Name new-name))
(defclass BASIC-VARIABLE
  (:supers basic-object)
  (:ivars
    (Variable-Symbol                                ;(:format symbol)
      :initable :gettable
      (:documentation "the Symbol that becomes the Variable Storage Class ivar "))
    (Type                                           ;(:format keyword)
      :initable :gettable
```

```
;; *** Could also have input-output later.
    (:documentation "One of :input, :output, or :local."))
  )
  (:documentation "the basic definition of the variable object"))

(defresponse (basic-variable :GET-VALUE) ()
  "get the value of this variable"
  (let ((executor (sand Interpreter :executor)))
    (when executor
      (sand executor :get-var-value Variable-Symbol))))

(defresponse (basic-variable :SET-VALUE) (value)
  "set the value of this variable"
  (let ((executor (sand Interpreter :executor)))
    (when executor
      (sand executor :set-var-value Variable-Symbol value))))

(defclass BASIC-IO-OBJECT
  (:supers basic-object)
  (:ivars
    (Inputs                                    ;(:format (listof basic-link))
      :gettable
      (:default-init '())
      (:documentation "list of the input arcs"))
    (Outputs
      :gettable                                ;(:format (listof basic-link))
      (:default-init '())
      (:documentation "list of the output arcs"))
    (In-Vars                                   ;(:format (listof variable-symbol))
      :initable :gettable
      (:default-init '())
      (:documentation "list of the variables used"))
    (Out-Vars                                  ;(:format (listof variable-symbol))
      :initable :gettable
      (:default-init '())
      (:documentation "list of the variables changed")))
  (:documentation "the root of all connected objects"))

(defresponse (basic-io-object :ADD-INPUT) (link)
  "add an input link to this object"
  (pushnew link Inputs))

(defresponse (basic-io-object :ADD-OUTPUT) (link)
  "add an output link to this object"
  (pushnew link Outputs))

(defresponse (basic-io-object :DELETE-INPUT) (link)
  "delete an input link from this object"
  (setq Inputs (remove link Inputs)))

(defresponse (basic-io-object :DELETE-OUTPUT) (link)
  "delete an output link from this object"
  (setq Outputs (remove link Outputs)))

(defresponse (basic-io-object :DISCONNECT-ALL) ()
  "disconnect this object from all connected objects"
  (dolist (input Inputs)
    (sand interpreter :delete-link (sand input :origin) self input))
```

```
     (dolist (output Outputs)
       (sand interpreter :delete-link self (sand output :destination) output))
     (setq Inputs nil
           Outputs nil))

(defresponse (basic-io-object :REMOVE-VAR-REFERENCE) (var-symbol)
   (setq In-Vars (remove var-symbol In-Vars)
         Out-Vars (remove var-symbol Out-Vars)))

(defclass BASIC-START
   (:supers basic-io-object)
   (:documentation "the object from where the interpreter execution begins"))

(defresponse (basic-start :EXECUTE-LOCAL) ()
   "returns next object"
   (sand (car outputs) :destination))

(defresponse (basic-start :DESCRIBE) ()
   (format nil "<START -A>" Name))

(defclass BASIC-HALT
   (:supers basic-io-object)
   (:documentation "the object where the interpreter execution ends"))

(defresponse (basic-halt :EXECUTE-LOCAL) ()
   "does nothing, but flash"
   nil)

(defresponse (basic-halt :DESCRIBE) ()
   (format nil "<HALT -A>" Name))

(defclass BASIC-MODULE
   (:supers basic-io-object
            kiosk:basic-framework-object)
   (:ivars
      ;; ***? Note that if alist is more convenient, its allright.
      (In-Roles-Vars                            ;(:format (plistof keyword variable-symbol))
         :initable
         (:default-init '())
         (:documentation "mapping between input keyword and variable"))
      (Out-Roles-Vars                           ;(:format (plistof keyword variable-symbol))
         :initable
         (:default-init '())
         (:documentation "mapping between output keyword and variable")))
   (:documentation "a PMC level representation of a module"))

(defresponse (basic-module :EXECUTE-LOCAL) ()
   "the execution of a module involves mapping from the program variables to the input
    and output keywords"
   (let* (in-roles-values              ;plist of input roles and values
          results                      ;plist of output roles and values
          out-var-sym                  ;output variable symbol
          )
      ;; Replace the variable-symbol with its value.
      (do-plist (role var-sym In-Roles-Vars)
         (push
            (sand (sand Interpreter :get-var var-sym) :get-value)
```

```
           in-roles-values)
         (push role in-roles-values))
      ;; Module then executes with that role value plist.   BEST AVAILABLE COPY
      (setq results (sand* self :execute in-roles-values))
      ;; ***? Must a module have results?
      (unless results (error "No results."))
      ;; Put the values of those results into the PMC variables.
      (do-plist (role value results)
         (setq out-var-sym (getf Out-Roles-Vars role))
         (unless out-var-sym
           (error "No variable symbol found for role: -a." role))
         (sand (sand Interpreter :get-var out-var-sym) :set-value value))
      (sand (car outputs) :destination)))

(defun RGETF (place value)
  "given the value gets the indicator"
  (when value
    (getf (reverse place) value)))

(defresponse (basic-module :AFTER :REMOVE-VAR-REFERENCE) (var-symbol)
  "remove the deleted variable's reference to any role"
  (let (var-role)                                    ; The role used by this Variable.
    (when (setq var-role (rgetf In-Roles-Vars var-symbol))
      (setf (getf In-Roles-Vars var-role ) nil))
    (when (setq var-role (rgetf Out-Roles-Vars var-symbol))
      (setf (getf Out-Roles-Vars var-role) nil))))

(defresponse (basic-module :DESCRIBE) ()

(format nil "<MODULE -A>" Name))

(defclass BASIC-NODE
  (:supers basic-io-object)
  (:ivars
    (Lisp-Code                              ;(:format s-exp)
      :settable (:default-init nil)
      (:documentation "the lisp code"))
    (X-Class                                ;(:format symbol)
      :settable (:default-init nil)
      (:documentation "the executable class"))
    (X-Response                             ;(:format symbol)
      :settable (:default-init nil)
      (:documentation "the executable response for the lisp code"))
  )
  (:documentation "the root of PMC boxes and choices"))

(defresponse (basic-node :UPDATE-CLASS) (class-name)
  (setq X-class class-name)
  (sand self :update-response))

(defresponse (basic-node :UPDATE-RESPONSE) ()
  "if a node has a variable storage class and lisp code, create a new response"
  (unless X-Class
    (setq X-Class (sand interpreter :variable-storage-class)))
  (if (and Lisp-Code X-Class)
    (let ()
       ;;***? import amac:keyword?
       (setq X-Response (amac:keyword (gensym name)))
       (eval
          '(defresponse (,x-class ,x-response) ()
```

```
      ,Lisp-Code)))
    (setq X-Response nil)))

(defresponse (basic-node :EXECUTE-CODE) ()
  "call the executor response for this node"
  (when X-Response
    (send (send Interpreter :executor)
          X-Response)))

(defclass BASIC-BOX
  (:supers basic-node)
  (:documentation "a PMC level representation of a box"))

(defresponse (basic-box :EXECUTE-LOCAL) ()
  "execute the code, and pass control to the next object"
  (send self :execute-code)
  (send (first Outputs) :destination))

(defresponse (basic-box :DESCRIBE) ()
  (format nil "<BOX -A>" Name))

(defclass BASIC-CHOICE
  (:supers basic-node)
  (:documentation "a PMC level representation of a choice point"))

(defresponse (basic-choice :EXECUTE-LOCAL) ()
  "execute the code, and pass control to the selected object"
  (let ((path-name (send self :execute-code))
        the-path)
    (setq the-path
          (find path-name Outputs
                :test #'string-equal
                :key #'(lambda (link) (send link :name))))
    (unless the-path
      (error "No path to take."))
    (send the-path :destination)))

(defresponse (basic-choice :DESCRIBE) ()
  (format nil "<CHOICE -A>" Name))

(defclass BASIC-LINK
  (:ivars
    (Name                                      ;(:format string)
      :settable
      (:default-init nil)
      (:documentation "the name of the object"))
    (Origin                                    ;(:format basic-io-object)
      :initable :gettable
      (:documentation "the place data comes from"))
    (Destination                               ;(:format basic-io-object)
      :initable :gettable
      (:documentation "the place data goes to"))
    (Interpreter                               ;(:format PMC)
      :initable :gettable
      (:documentation "the PMC program instance")))
  (:documentation "basic-link is the connection between two basic-io-objects"))

(defresponse (basic-link :CONNECT) ()
```

```
"connect this link to its origin and destination"
(sand Origin :add-output self)
(sand Destination :add-input self))

(defresponse (basic-link :DESCRIBE) ()
  (format nil "<LINK -A>" Name))
```

BEST AVAILABLE COPY

APPENDIX IV          Code listing for the Transaction
                     (TX) Framework

```
(in-package 'tx)
(import '(asac:do-plist) 'tx)

(defparameter *DEFAULT-CLASSES-PLIST*
              '(
                :server  server
                :client  client
                )
  "the default plist for specifying transaction classes")

(defvar *ALL-TX-TRANSACTIONS* '()
  "a list of the names (symbols) of all defined TX transactions")
(pushnew '*all-tx-transactions* kiosk:*all-kiosk-module-vars*)

(defclass TX-CLASS
  (:supers kiosk:basic-framework-class)
  (:ivars
    (Component-Classes
      :initable (:default-init *default-classes-plist*)
      (:documentation "the classes of components to instantiate"))
    (Server
      :initable
      (:documentation "the server definition"))
    (Clients
      :initable (:default-init '())
      (:documentation "a list of client definitions"))
    (Runnable-Module
      :initable (:default-init nil)
      (:documentation "the name of the module that should take any :execute messages")))
  (:documentation "the metaclass for the TX interpreter - instances define transactions"))

(defresponse (tx-class :PARSE-SERVER) (option ignored)
  "handles the :server option in define-transaction"
  (setq server (rest option)
        coral::init-plist (list* (first option) '(quote ,(rest option)) coral::init-plist)))

(defresponse (tx-class :PARSE-CLIENTS) (option ignored)
  "handles the :clients option in define-transaction"
  (setq clients (rest option)
        coral::init-plist (list* (first option) '(quote ,(rest option)) coral::init-plist)))

(defresponse (tx-class :PARSE-RUNNABLE-MODULE) (option ignored)
```

```
(defclass BASIC-TX
  (:meta-class tx-class)
  (:supers kiosk:module)
  (:ivars
    (Component-Classes
      :initable
      (:documentation "a plist that determines what class of subcomponents to instantiate"))
    (Server
      :gettable
      (:documentation "the server in the transaction"))
    (Clients
      :gettable (:default-init '())
      (:documentation "a list of all clients in the transaction"))
    (Runnable-Module
      :gettable
      (:documentation "the module that should take any :execute messages")))
  (:documentation "the TX interpreter"))

(defresponse (basic-tx :GET-CLASS-OF) (object-type &aux class)
  (setq class (getf component-classes object-type))
  (when (null class)
    (error "The object type ~s is unknown." object-type))
  class)

(defresponse (basic-tx :CREATE-SERVER) (name class &rest options &aux instance)
  (dolist (o clients)
    (when (string-equal name (sand o :graphical-name))
      (error "The name ~a is already assigned to client ~s" name o)))
  (setq instance (sand* (sand self :get-class-of :server) :instantiate
                        :graphical-name name
                        :framework self
                        :kiosk-class class
                        options))
  (setq server instance)
  instance)

(defresponse (basic-tx :CREATE-CLIENT) (name class port &rest options &aux instance)
  (when (and server
             (string-equal name (sand server :graphical-name)))
    (error "The name ~a is already assigned to the server ~s" name server))
  (dolist (o clients)
    (when (string-equal name (sand o :graphical-name))
      (error "The name ~a is already assigned to client ~s" name o)))
  (setq instance (sand* (sand self :get-class-of :client) :instantiate
                        :graphical-name name
                        :framework self
                        :kiosk-class class
                        :port-name port
                        options))
  (sand instance :add-class-init (intern (string port) 'keyword) instance)
  (push instance clients)
  instance)

(defresponse (basic-tx :SET-RUNNABLE-MODULE) (module-name)

(setq runnable-module (sand self :module-at-path (list module-name))))

(defresponse (basic-tx :ALL-MODULES) ()
  (if server
      (cons server clients)
      clients))
```

```
(defresponse (basic-tx :MODULE-AT-PATH) (path &aux component)
  (setq component (find (first path) (if server
                                          (cons server clients)
                                          clients)
                        :test #'(lambda (name module)
                                  (string-equal name (send module :graphical-name)))))
  (unless component
    (error "The TX transaction -s does not have a component -s." self (first path)))
  (if (rest path)
      (send (send component :kiosk-module) :module-at-path (rest path))
      component))

(defresponse (basic-tx :DELETE-SERVER) (instance)
  (cond ((eql instance server)
         (setq server nil)
         (send instance :set-framework nil)
         instance)
        (t (error "-s is not the transaction's server." instance))))

(defresponse (basic-tx :DELETE-CLIENT) (instance)
  (cond ((member instance clients)
         (setq clients (remove instance clients))
         (send instance :set-framework nil)
         instance)
        (t (error "-s is not one of the transaction's clients." instance))))

(defresponse (basic-tx :EXECUTE) (&rest args)
  (send* runnable-module :execute args))

(defresponse (basic-tx :RESET) ()
  (send server :reset)
  (dolist (client clients)
    (send client :reset)))

(defclass BASIC-SERVER
  (:supers kiosk:basic-framework-object)
  (:documentation "the transaction framework object that represents the server"))

(defclass BASIC-CLIENT
  (:supers kiosk:basic-framework-object)
  (:ivars
    (port-name
      :gettable :initable
      (:documentation "the port name through which the kiosk module will connect to us")))
  (:documentation "the transaction framework object that represents a client of the server"))

(defresponse (basic-client :EXECUTE) (&rest args &aux server)
  (setq server (send kiosk::framework :server))
  (unless server
    (error "The transaction framework -s does not have a server." kiosk::framework))
  (send* server :execute args))
```

APPENDIX V

Code listing for the Abstract Data Types (ADT's): Logical Formulae and Plans

BEST AVAILABLE COPY

```
(in-package 'par)
(import '(
        kiosk:defadt
        kiosk:defmodule
        )
      'par)

;;;; This file defines the ADTs used in the PMR. Some are PMR-specific, while others are
;;;; more generally useful. ADTs are by default implemented as CORAL objects, but they can
;;;; have other implementations as well. Each definition lists some local state of the ADT,
;;;; and defines message to access and update that state. The user can also define
;;;; additional messages, using the DEFRESPONSE form.

;;; The following form defines an ADT. Each of the :ivar declarations defines one piece of
;;; the local state of that ADT. If the <options> contain the keywords :gettable
;;; (:settable), a message will be automatically created to access (update) the value of
;;; that local variable. Other <options> are generally self-explanatory.
(defadt <new ADT name>
  (:ivars
    (<Ivar name> <options>)
    etc)
  (:documentation <a descriptive string>))

;;; PMR - Plan Monitoring and Replanning System
;;; This file defines the abstract data types that constitute the PMR demo.

(defadt PLAN-CONSTRAINTS
  (:ivars
    (State
      :settable (:default-init nil)
      (:documentation "a conjunction which encodes the constraints on the plan")))
  (:documentation "a description of the constraints which define a valid plan"))

(defresponse (plan-constraints :SET-CONJUNCTS) (conjuncts)
  (setq state (sand 'gdb:conjunction :instantiate :conjuncts conjuncts)))

(defresponse (plan-constraints :PRINT-SELF) (stream &rest ignored)
  (si:printing-random-object (self stream :typep)
    (format stream "-d"
            (if (and (scl:variable-boundp state)
                    (typep state 'gdb:vff))
                (length (sand state :conjuncts))
                "## bad state ##"))))

(defresponse (plan-constraints :PRINT-TRACE) (stream &optional level)
  level
  (format stream "-& -6T (AND-{-12T-a-T-&-})"
          (cdr (sand state :unparse))))

(defadt CRITICAL-ASSUMPTION
  (:ivars
    (State
      :settable (:default-init nil)
      (:documentation "the partial state description"))
```

```
    (Criticality
      :settable (:default-init nil)
      (:documentation "the plan actions for which this state is critical")))
  (:documentation "a state, and an action which depends on it holding"))

(defun GET-KEY-RELATION (wff)
  (etypecase wff
    (gdb:proposition (sand wff :relation))
    (gdb:negation (get-key-relation (sand wff :wff)))
    (gdb:conjunction (get-key-relation (car (last (sand wff :conjuncts)))))
    (gdb:disjunction (get-key-relation (car (sand wff :disjuncts))))
    (gdb:implication (get-key-relation (sand wff :antecedent)))
    (gdb:equivalence (get-key-relation (sand wff :wff1)))
    (gdb:wff (error "~s is an unknown type of wff." wff))))

(defresponse (critical-assumption :VIOLATION-TYPE) ()
  (get-key-relation state))

(defresponse (critical-assumption :PRINT-SELF) (stream &rest ignored)
  (si:printing-random-object (self stream :typep)
    (format stream "~a"
            (if (and (scl:variable-boundp state)
                     (typep state 'gdb:wff))
                (sand state :unparse)
                "## bad state ##"))))

(defadt VIOLATED-CRITICAL-ASSUMPTION
  (:supers critical-assumption)
  (:ivars
    (Violation
      :settable (:default-init nil)
      (:documentation "how this state fails to hold (a symbol or mapping)")))
  (:documentation "a state that must hold, and a description of how it does not"))

(defadt ACTION
  (:ivars
    (Name
      :settable (:default-init nil)
      (:documentation "the name of this action"))
    (Agent
      :settable (:default-init nil)
      (:documentation "the agent responsible for performing this action"))
    (Prerequisites
      :settable (:default-init nil)
      (:documentation "states that must hold for this action to be effective"))
    (Results
      :settable (:default-init nil)
      (:documentation "the states that this action causes to be true"))
    (Implementation
      :settable (:default-init nil)
      (:documentation "the way this action is achieved, if it is composite")))
  (:documentation "a action that is to be taken in a plan"
                  "has either an implementation or prerequisites and results"))

(defresponse (action :PRINT-SELF) (stream &rest ignored)
  (si:printing-random-object (self stream :typep)
    (format stream "~a"
            (if (and (scl:variable-boundp name) name)
                name
                "## bad name ##"))))

(defun DISPLAY-PLAN-ACTION (action &optional button plan-window)
```

```
button plan-window
  (format t "-&-a" (sand action :name))
  (format t "-&-2tAgent: -a" (sand action :agent))
  (cond ((sand action :implementation)
         (format t "-&-2tSub Actions:")
         (dolist (a (sand action :implementation))
           (format t "-&-4t-a" (sand a :name))))
        (t (format t "-&-2tPrerequisites:")
           (dolist (p (sand action :prerequisites))
             (cond ((typep p 'gdb:conjunction)
                    (format t "-&-4T(AND-{-9t-a-t-&-})"
                            (cdr (sand p :unparse))))
                   (t (format t "-&-4t-a" (sand p :unparse)))))
           (format t "-&-2tResults:")
           (dolist (r (sand action :results))
             (cond ((typep r 'gdb:conjunction)
                    (format t "-&-4T(AND-{-9t-a-t-&-})"
                            (cdr (sand r :unparse))))
                   (t (format t "-&-4t-a" (sand r :unparse)))))))
  (format t "-&"))

;;; **** Should have a better way to store and create plans.
(defmacro DEFACTION (name &key agent prerequisites results implementation)
  '(defparameter ,name
     (sand 'action :instantiate
           :name ',name
           :agent ',agent
           :prerequisites (mapcar #'gdb:make-wff ',prerequisites)
           :results (mapcar #'gdb:make-wff ',results)
           :implementation ,implementation
           )
     "An action that is part of some plan - defined by Defaction"))

(defadt DATABASE-MONITORING-PATTERN
  (:ivars
    (Query
      :settable (:default-init nil)
      (:documentation "the database query"))
    (Actions
      :settable (:default-init nil)
      (:documentation
        "the set of actions to take depending on the results of the query")))
  (:documentation "a query and the appropriate actions to take depending on the results"))

(defresponse (database-monitoring-pattern :PRINT-SELF) (stream &rest ignored)
  (si:printing-random-object (self stream :typep)
    (format stream "-a"
            (if (and (scl:variable-boundp query)
                     (typep query 'gdb:wff))
                (sand query :unparse)
                "## bad query ##"))))

(defadt SET
  (:ivars
    (Objects
      :gettable :initable (:default-init nil)
      (:documentation "the objects in the set"))
    (Identity-Test
      :gettable :initable (:default-init #'eql)
      (:documentation "the appropriate equality test function")))
  (:documentation "a set of untyped objects"))
```

```
(defresponse (set :PRINT-SELF) (stream &rest ignored)
  (si:printing-random-object (self stream :typep)
    (format stream "-d"
      (if (and (scl:variable-boundp objects)
               (typep objects 'list))
          (length objects)
          "## bad set ##"))))

(defresponse (set :ADJOIN) (object)
  (if (listp object)
      (setq objects (union objects object :test identity-test))
      (pushnew object objects :test identity-test)))

(defresponse (set :REMOVE) (object &key multiple)
  (if (and multiple (listp object))
      (setq objects (set-difference objects object :test identity-test))
      (setq objects (remove object objects :test identity-test))))

(defresponse (set :MEMBER-P) (object)
  (member object objects :test identity-test))

(defresponse (set :CLEAR) ()
  (setq objects nil))

(defresponse (set :MAP) (function &key append)
  (if append
      (mapcan function objects)
      (mapcar function objects)))

(defadt CRITICAL-ASSUMPTIONS
  (:supers set)
  (:ivars
    (Plan
      :initable :gettable
      (:documentation "The plan to which these assumptions are critical.")))
  (:documentation "a set of critical plan assumptions"))

(defresponse (critical-assumptions :ASSUMPTIONS) ()
  objects)

(defresponse (critical-assumptions :ADD) (state criticality)
  (sand self :adjoin
    (sand 'critical-assumption :instantiate
          :state state
          :criticality criticality)))

(defresponse (critical-assumptions :PRINT-TRACE) (stream &optional level &aux state)
  level
  (dolist (an-object objects)
    (setq state (sand an-object :state))
    (if (typep state 'gdb:conjunction)
        (format stream "-& -6T (AND-(-12T-a-T-&-)) -75TCriticality: -a"
                (cdr (sand state :unparse))
                (sand (sand an-object :criticality) :name))
        (format stream "-& -6T -a -75TCriticality: -a"
                (sand state :unparse)
                (sand (sand an-object :criticality) :name)))))

(defadt VIOLATED-ASSUMPTIONS
  (:supers critical-assumptions)
  (:ivars
    (Plan
```

```
    :initable :gettable
    (:documentation "The plan to which these assumptions belong.")))
  (:documentation "a set of violated plan assumptions"))

(defresponse (violated-assumptions :ADD) (state criticality violation)
  (send self :adjoin
        (send 'violated-critical-assumption :instantiate
              :state state
              :criticality criticality
              :violation violation)))

(defresponse (violated-assumptions :PRINT-TRACE) (stream &optional level)
  level
  (dolist (an-object objects)
    (format stream "~&~6T~a~75TCriticality: ~a"
            (send (send an-object :state) :unparse)
            (send (send an-object :criticality) :name))))

(defadt DATABASE-MONITORING-PATTERNS
  (:supers set)
  (:ivars
    (Plan
      :initable :gettable
      (:documentation "The plan to which these patterns relate.")))
  (:documentation "a set of database monitoring patterns"))

(defresponse (database-monitoring-patterns :PATTERNS) ()
  objects)

(defresponse (database-monitoring-patterns :ADD) (query actions)
  (send self :adjoin
        (send 'database-monitoring-pattern :instantiate
              :query query
              :actions actions)))

(defresponse (database-monitoring-patterns :PRINT-TRACE) (stream &optional level)
  level
  (dolist (an-object objects)
    (format stream "~&~6TQuery:   ~a" (send (send an-object :query) :unparse))
    (format stream "~-75TAction: ~a"
            (send (third (second (send an-object :actions))) :name)
            )))

(defadt PLAN
  (:ivars
    (Goals
      :settable (:default-init nil)
      (:documentation "the goal states of the plan"))
    (Actions
      :settable (:default-init nil)
      (:documentation "the actions that achieve the goal states"))
    (Choices
      :settable (:default-init nil)
      (:documentation "a mapping of the plan roles (choices) to actual objects"))
    (Derived-From-Plan
      :initable :gettable (:default-init nil)
      (:documentation
        "The plan this plan was derived from, or NIL if created stand-alone.")))
  (:documentation "an ordered set of actions that will achieve a collection of goals"))

(defresponse (plan :PRINT-SELF) (stream &rest ignored)
  (si:printing-random-object (self stream :typep)
```

```
(cond ((and (scl:variable-boundp choices)
            (typep choices 'gdb:mapping))
       (format stream "-d " (sand choices :number-of-keys)))
      (t (format stream "-a" "## bad choices ##")))))

(defresponse (plan :PRINT-TRACE) (stream &optional level)
  level
  (format stream "-& -6T Goals:-17T-{-A -}" goals)
  (format stream "-& -6T Actions:-17T-{-A-?; -}"
          (mapcar #'(lambda (action) (sand action :name))
                  actions))
  (format stream "-& -6T Choices:-17T")
  (do* ((keys (sand choices :all-keys) (rest keys))
        (key (first keys) (first keys))
        (value (sand choices :get-mapping key) (sand choices :get-mapping key)))
       ((null keys))
    (format stream "-&   -20&a: -a" (string-trim '(#\?) (string key)) value)))
```

BEST AVAILABLE COPY

APPENDIX VI    Code listing for the Plan Monitoring and Replanning (PMR) Skeletal System

```
(in-package 'par)
(import '(
        df:define-program
        tx:define-transaction
        skeletal:define-skeletal-system
        kiosk:define-customization
        )
        'par)

;;;; This file contains a definition of the PMR skeletal system, with the main PMR loop in
;;;; DF. Each page contains the definition of a single composite module. Here is a brief
;;;; description of the defining forms.

#|

;;; This form define a new composite DF module. It takes a name argument, and a number of
;;; descriptions of objects, such a places, modules, and connections. Each object has a
;;; :graphical-name and :description argument, as well as other arguments specific to the
;;; object type. Argument descriptions are enclosed in angle brackets "<>". Etc means that
;;; there can be more description of objects of the same type, ie, more module descriptions.
(define-program <new DF composite module>
  (:input-places
    (<input place local name>
     <input place type, an ADT name>
     <the role of the place, for the new composite module>
     :graphical-name <a short string>
     :region <a graphical region description>)
    etc)
  (:output-places)                              ;same arguments as :input-places
  (:modules
```

```
    (<new module local name>
     <new module type, a module name>)
    etc)
  (:places
    (<the local name of the new place>
     <the type of the new place, an ADT name>)
    etc)
  (:joins
    (<local name of the new join>)
    etc)
  (:module-inputs
    (<a local module name defined above>
     <a local place name described above>
     <the role the place is to play for the module>)
    etc)
  (:module-outputs)                              ;same as :module-inputs
  (:description
    <a string describing the new composite module>)

;;; This form defines a new TX composite module.  See the comments above on how to read this
;;; description.
(define-transaction <new composite module name>
  (:server                                       ;only one of these
    <server local name>
    <server type, a module name>)
  (:clients
    (<new client local name>
     <client type, a module name>
     <port name on client that wants to talk with server>)
    etc)
  (:runnable-module
    <module to run if this composite module receives an :EXECUTE message>))

;;; This form defines a new SK composite module.
(define-skeletal-system <new composite module name>
  (:modules
    (<new module local name>
     <module type, a module name>)
    etc)
  (:shared-modules
    ;; This section describes meshed modules.  Each entry describes two modules by
    ;; reference, ie, by giving a set of local names.  The SK interpreter arranges for these
    ;; two modules to be the same, ie, the are two different names, in two different
    ;; contexts, that will refer to the same computational object.
    ((<list of local names>)
     (<list of local names>))
    etc)
  (:runnable-module
    <module to run if this composite module receives an :EXECUTE message>))
|#

;;; Definition of the composite PMR modules.

(define-program SITUATION-MONITOR
  (:input-places
    ;; input place name, class, and role of the input
    ("Critical Assumptions"
     critical-assumptions
     :assumptions
     :graphical-name "Assumpts"
     :region (:left 0 :top 0 :right 200 :bottom 50)))
  (:output-places
```

```
;; output place name, class, and role of the output
("Violated Assumptions"
 violated-assumptions
 :results
 :graphical-name "Violated Assmpts"
 :region (:left 230 :top 0 :right 470 :bottom 50)))
(:modules
 ;; module name and class
 ("Database-Translator"
  assumption-to-monitor-pattern-translator
  :graphical-name "Translator"
  :graphical-info ""
  :region (:left 0 :top 75 :right 200 :bottom 125))
 ("Database-Monitor"
  database-monitor
  :graphical-name "DB Monitor"
  :graphical-info ""
  :region (:left 250 :top 75 :right 450 :bottom 125)))
(:places
 ;; place name and its class
 ("Database-Patterns"
  database-monitoring-patterns
  :graphical-name "DB Queries"
  :region (:left 125 :top 150 :right 325 :bottom 200)))
(:module-inputs
 ;; module name, place name, and the role of the place
 ("Database-Patterns"
  "Database-Monitor"
  :patterns
  :graphical-name "")
 ("Critical Assumptions"
  "Database-Translator"
  :assumptions
  :graphical-name ""))
(:module-outputs
 ;; place name, module name, and the role of the place
 ("Database-Translator"
  "Database-Patterns"
  :monitor-patterns
  :graphical-name "")
 ("Database-Monitor"
  "Violated Assumptions"
  :results
  :graphical-name ""))

(:description "Monitors a DB for violations of given critical assumptions"))

(define-program COMPOSITE-REPLANNER
 (:input-places
  ;; input place name, class, and role of the input
  ("Old-Plan"
   plan
   :old-plan
   :graphical-name "Old Plan"
   :region (:left 0 :top 75 :right 200 :bottom 125))
  ("Violated-Plan-Assumptions"
   violated-assumptions
   :violated-assumptions
   :graphical-name "Violations"
   :region (:left 0 :top 150 :right 200 :bottom 200)))
 (:output-places
  ;; output place name, class, and role of the output
```

```
   ("New-Plan"
    plan
    :new-plan
    :graphical-name "New Plan"
    :region (:left 250 :top 225 :right 500 :bottom 275)))
(:modules
   ;; module name and its class
   ("Replanner"
    incremental-replanner
    :graphical-name "Inc Replanner"
    :graphical-info ""
    :region (:left 250 :top 150 :right 500 :bottom 200))
   ("Plan-Assumption-Analyst"
    plan-assumption-analyst
    :graphical-name "Assumpt Analyst"
    :graphical-info ""
    :region (:left 250 :top 0 :right 500 :bottom 50)))
(:places
   ;; place name and its class
   ("Constraints"
    plan-constraints
    :graphical-name "Constraints"
    :region (:left 250 :top 75 :right 500 :bottom 125)))
(:module-inputs
   ;; module name, place name, and the role of the place
   ("Constraints"
    "Replanner"
    :plan-constraints
    :graphical-name "")
   ("Old-Plan"
    "Plan-Assumption-Analyst"
    :plan
    :graphical-name "")
   ("Old-Plan"
    "Replanner"
    :old-plan
    :graphical-name "")
   ("Violated-Plan-Assumptions"
    "Replanner"
    :violated-assumptions
    :graphical-name ""))
(:module-outputs
   ;; place name, module name, and the role of the place
   ("Plan-Assumption-Analyst"
    "Constraints"
    :plan-constraints
    :graphical-name "")
   ("Replanner"
    "New-Plan"
    :new-plan
    :graphical-name ""))
(:description "Repairs a plan with violated assumptions"))
(define-program PMR-DF
   (:places
      ;; input place name, class, and role of the input
      ("Plan With Rationale"
       plan
       :plan-input1
       :graphical-name "Input Plan"
       :region (:left 150 :top 300 :right 350 :bottom 350)))
   (:modules
      ;; module name and its class
```

```
("Plan-Assumption-Analyst"
 plan-assumption-analyst
 :graphical-name "Assumption Analyst"
 :graphical-info ""
 :region (:left 0 :top 225 :right 200 :bottom 275))
("Situation-Monitor"
 Situation-monitor
 :graphical-name "Situation Monitor"
 :graphical-info "DF"
 :region (:left 300 :top 150 :right 500 :bottom 200))
("Replanner"
 composite-replanner
 :graphical-name "Replanner"
 :graphical-info "DF"
 :region (:left 600 :top 225 :right 800 :bottom 275))
("Plan-Copier"
 copier
 :graphical-name "Plan Copier"
 :graphical-info ""
 :region (:left 300 :top 375 :right 500 :bottom 425)))
(:places
 ;; place name and its class
 ("Critical-Plan-Assumptions"
  critical-assumptions
  :graphical-name "Critical Assumpts"
  :region (:left 0 :top 150 :right 200 :bottom 200))
 ("Violated-Plan-Assumptions"
  violated-assumptions
  :graphical-name "Violated Assumpts"
  :region (:left 600 :top 150 :right 800 :bottom 200))
 ("New-Plan-With-Rationale"
  plan
  :graphical-name "New Plan"
  :region (:left 300 :top 225 :right 500 :bottom 275))
 ("Old-Plan-With-Rationale"
  plan
  :graphical-name "Old Plan"
  :region (:left 600 :top 375 :right 800 :bottom 425)))
(:joins
 ;; join name
 ("PAA-join"
  :region (:left 245 :top 245 :width 11 :height 11))
 ("Replanner-join"
  :region (:left 695 :top 320 :width 11 :height 11)))
(:module-inputs
 ;; module name, place name, and the role of the place
 ("Critical-Plan-Assumptions"
  "Situation-Monitor"
  :assumptions
  :graphical-name "assumpts")
 ("Violated-Plan-Assumptions"
  "Replanner"
  :violated-assumptions
  :graphical-name "violations")
 ("New-Plan-With-Rationale"
  "Plan-Copier"
  :adt
  :graphical-name "plan")
 ("New-Plan-With-Rationale"
  "PAA-join"
  :plan
  :graphical-name "")
```

BEST AVAILABLE COPY

```
("Old-Plan-With-Rationale"
 "Replanner-join"
 :old-plan
 :graphical-name "")
("Plan With Rationale"
 "PAA-join"
 :plan
 :graphical-name "")
("Plan With Rationale"
 "Replanner-join"
 :old-plan
 :graphical-name "")
("PAA-join"
 "Plan-Assumption-Analyst"
 :plan)
("Replanner-join"
 "Replanner"
 :old-plan
 :graphical-name "old plan"))
(:module-outputs
 ;; place name, module name, and the role of the place
 ("Plan-Assumption-Analyst"
  "Critical-Plan-Assumptions"
  :assumptions
  :graphical-name "c.assumpts")
 ("Situation-Monitor"
  "Violated-Plan-Assumptions"
  :results)
 ("Replanner"
  "New-Plan-With-Rationale"
  :new-plan
  :graphical-name "new plan")
 ("Plan-Copier"
  "Old-Plan-With-Rationale"
  :copy))
(:description "The Plan Monitoring and Replanning DF program."))

(define-transaction MRS-SITUATION-DATABASE
  (:server "Database"
           gdb:mrs-database
           :region (:left 0 :top 0 :width 200 :height 200))
  (:clients
    ("Translator"
     assumption-to-monitor-pattern-translator
     database
     :region (:left 300 :top 0 :width 100 :height 50))
    ("Database-Monitor"
     database-monitor
     database
     :region (:left 300 :top 75 :width 100 :height 50))
    ("Replanner"
     incremental-replanner
     database
     :region (:left 300 :top 150 :width 100 :height 50)))
  (:runnable-module "Database"))

(defresponse (mrs-situation-database :AFTER :CUSTOMIZE) (customization)
  (update-situation-change-menu self customization))

(define-skeletal-system PMR
  (:modules
    ("par-df"
     par-df
```

BEST AVAILABLE COPY

```
    :region (:left 0 :top 0 :width 100 :height 50))
   ("database"
    ars-situation-database
    :region (:left 0 :top 60 :width 100 :height 50)))
  (:shared-modules
   (("par-df"
     "situation-monitor"
     "database-monitor")
    ("database"
     "database-monitor"))
   (("par-df"
     "situation-monitor"
     "database-translator")
    ("database"
     "translator"))
   (("par-df"
     "replanner"
     "replanner")
    ("database"
     "replanner")))
  (:runnable-module "par-df"))

(defresponse (par :AFTER :CUSTOMIZE) (customization)
  (update-plan-structure-window self customization))

:region (interface:region :left 215 :top 205 :width 130 :height 80))
;;;; Scheduling and other random knowledge sources (BBD:define-scheduling-knowledge-source COPIER-BEFORE-ANALYST
  :bbd par-prime
  :default-level scheduling
  :graphical-name ("Copier" "Before" "Analyst")
  :test (exists (ar1 ar2)
          (ar-name ar1 plan-copier)
          (ar-name ar2 assumption-analyst)
          (not (pre ar1 ar2))
          (not (pre ar2 ar1)))
  :action (assert-pre ar1 ar2)
  :region (interface:region :left 75 :top 5 :width 130 :height 80))

(BBD:define-scheduling-knowledge-source EXPLAIN-FAILURE-BEFORE-REPLANNING
  :bbd par-prime
  :default-level scheduling
  :graphical-name ("Explain" "Failure" "Before" "Replanning")
  :test (exists (ar1 ar2)
          (ar-name ar1 failure-explainer)
          (ar-name ar2 replanner)
          (not (pre ar1 ar2))
          (not (pre ar2 ar1)))
  :action (assert-pre ar1 ar2)
  :region (interface:region :left 215 :top 5 :width 130 :height 80))
;;; The definition for the replanner as a DF program.
(df::define-program-old composite-replanner df:final-df
  :graphical-name "Comp.Replanner"
  :print-documentation "Repairs a plan with violated assumptions"

:modules
  ;; list of lists containing a module name and its generic class and other options
  (("Replanner"
    incremental-replanner
    :graphical-name "Inc Replanner"
    :graphical-info ""
    :region (:left 250 :top 150 :right 500 :bottom 200))
   ("Plan-Assumption-Analyst"
    plan-assumption-analyst
```

```
  :graphical-name "Assumpt Analyst"
  :graphical-info ""
  :region (:left 250 :top 0 :right 500 :bottom 50)))

:places
;; list of lists containing an place name and its class
(("Constraints"
  plan-constraints
  :graphical-name "Constraints"
  :region (:left 250 :top 75 :right 500 :bottom 125)))

:input-parms
;; list of lists of input place name, class, and role of the input
(("Old-Plan"
  plan
  :old-plan
  :graphical-name "Old Plan"
  :region (:left 0 :top 75 :right 200 :bottom 125))
 ("Violated-Plan-Assumptions"
  violated-assumptions
  :violated-assumptions
  :graphical-name "Violations"
  :region (:left 0 :top 150 :right 200 :bottom 200)))

:input-arcs
;; list of lists of input place name, module, and role
(("Old-Plan"                       "Plan-Assumption-Analyst"      :plan
  :graphical-name "")
 ("Old-Plan"                       "Replanner"                    :old-plan
  :graphical-name "")
 ("Violated-Plan-Assumptions"      "Replanner"                    :violated-assumptions
  :graphical-name "")
 )

:output-parms
;; list of lists of output place name, class, and role of the output
(("New-Plan"
  plan
  :new-plan
  :graphical-name "New Plan"
  :region (:left 250 :top 225 :right 500 :bottom 275))
 )

:output-arcs
;; list of lists of output place name, module, and role
(("Replanner"            "New-Plan"             :new-plan
  :graphical-name "")
 )

:module-inputs
;; list of lists containing a module name, a place name, and the role of the place
(("Constraints"          "Replanner"            :plan-constraints
  :graphical-name ""))

:module-outputs
;; list of lists containing a place name, module name, and the role of the place
(("Plan-Assumption-Analyst"    "Constraints"         :plan-constraints
  :graphical-name ""))
)

(in-package 'PUR)

;;;; This file defines the black-box modules that the files PURDEF.LISP and PUR-PRIME.LISP
;;;; use. It uses a special form to define these modules.

;;; Defines a new black-box module. The :execute code can refer to :locals and :ivars by
;;; name, and can refer to the values of :inputs, :outputs, and :ports with the functions
;;; kiosk:get-input, kiosk:return-outputs, and kiosk:send-port.
(defmodule <new black-box module name>
  (:in <a set of input port role names>)
  (:ports <a set of input/output port role names>)
  (:out <a set of output port role names>)
  (:ivars                                      ;persistant local variables
    (<new ivar name>
     <other coral ivar options, usually not important>)
    etc)
  (:local <a set of local variable names>)
  (:description <string describing the new module>)
```

```
(:documentation <longer string>)
(:execute <arbitrary LISP to execute>))

;;;; The PMR black-box modules (defmodule DATABASE-MONITOR
  (:in patterns)
  (:ports database)
  (:out results)
  (:ivars
    (Polling-Wait
      :settable (:default-init 600)
      (:documentation "delay between checks - in 60ths of a second")))
  (:local patterns-list results-instance query-bindings)
  (:description "continuosly monitors a database's contents and applies query/action pairs")
  (:documentation "monitors a database's contents and applies query/action pairs")
  (:execute
    (setq patterns-list (sand (kiosk:get-input patterns) :patterns)
          results-instance (kiosk:create-adt (or (kiosk:get-input results)
                                                 'violated-assumptions)
                                             :plan (sand (kiosk:get-input patterns) :plan)))
    (if patterns-list
        (do (actions query possible-actions action)
            (actions (dolist (a actions)
                       (sand* results-instance a)))
          (dolist (p patterns-list)
            (setq query (sand p :query)
                  possible-actions (sand p :actions))
            (setq query-bindings (kiosk:get-port-output
                                   :result
                                   (kiosk:send-port database :command (list :query query))))
            (cond (query-bindings
                   (if (setq action (getf possible-actions :true))
                       (push (append action (list query-bindings)) actions)))
                  (t (if (setq action (getf possible-actions :false))
                         (push (append action '(:false)) actions)))))
          (if (null actions)
              (scl:process-sleep polling-wait (zl:string "Database Monitoring"))))
      (cerror "Return an empty results adt"
              "There are no patterns to monitor."))
    (kiosk:return-output :results results-instance)))

;;; **** Doesn't say when an assumption is an explicit change from a previous result.
(defmodule PLAN-ASSUMPTION-ANALYST
  (:supers gdb:ars-database)
  (:in plan)
  (:out assumptions plan-constraints)
  (:local plan-instance goals actions choices constraints assumptions-instance
          plan-constraints-instance)
  (:description "identifies the critical assumptions of a plan")
  (:documentation "identifies the critical plan assumptions")
  (:execute
    (sand self :clear)
    (setq plan-instance (kiosk:get-input plan)
          goals (sand plan-instance :goals)
          actions (sand plan-instance :actions)
          choices (sand plan-instance :choices)
          assumptions-instance (kiosk:create-adt (or (kiosk:get-input assumptions)
                                                     'critical-assumptions)
                                                 :plan plan-instance)
          plan-constraints-instance (kiosk:create-adt (or (kiosk:get-input plan-constraints)
                                                          'plan-constraints)))
    (do ((acts actions) p act impl bindings)
```

```
    ((null acts))
  (setq act (pop acts))
  (cond ((setq impl (sand act :implementation))
         (setq acts (append impl acts)))
        (t (dolist (generic-p (sand act :prerequisites))
             (setq p (sand generic-p :substitute choices)
                   bindings (sand self :query p))
             (cond ((null bindings)
                    (pushnew generic-p constraints :test #'gdb:identical-vff)
                    (when assumptions-instance
                      (sand assumptions-instance :add p act)))))
           (dolist (generic-r (sand act :results))
             (sand self :consistent-store
                   (sand generic-r :substitute
                         (if bindings (sand bindings :union choices)
                             choices))))))))
(when plan-constraints-instance
  (sand plan-constraints-instance :set-conjuncts constraints)
  (kiosk:return-output :plan-constraints plan-constraints-instance))
(when assumptions-instance
  (kiosk:return-output :assumptions assumptions-instance))))
(defmodule ASSUMPTION-TO-MONITOR-PATTERN-TRANSLATOR
  (:in assumptions)
  (:ports database)
  (:out monitor-patterns)
  (:local state criticality monitor-patterns-instance)
  (:description "sets up monitor pattern/action pairs for the monitorable assumptions")
  (:documentation "sets up monitor pattern/action pairs for the monitorable assumptions")
  (:execute
    (setq monitor-patterns-instance
          (kiosk:create-adt (or (kiosk:get-input monitor-patterns)
                                'database-monitoring-patterns)
                            :plan (sand (kiosk:get-input assumptions) :plan)))
    (dolist (a (sand (kiosk:get-input assumptions) :assumptions))
      (setq state (sand a :state)
            criticality (sand a :criticality))
      (when (kiosk:get-port-output
              :result
              (kiosk:send-port database :command
                               (list :query
                                     (gdb:make-proposition
                                       '(:monitorable ,(sand state :unparse))))))
        (sand monitor-patterns-instance :add
              state
              '(:false (:add ,state ,criticality)))))
    (kiosk:return-output :monitor-patterns monitor-patterns-instance)))
(defmodule COPIER
  (:in adt)
  (:out copy)
  (:local adt-instance output-type)
  (:description "this copies an ADT")
  (:documentation "this returns its input (doesn't really copy it)")
  (:execute
    (setq adt-instance (kiosk:get-input adt)
          output-type (kiosk:get-input copy))
    (if (typep adt-instance output-type)
        (kiosk:return-output :copy adt-instance)
        (error "~s is not an instance of ~s." adt-instance output-type))))
(defun MAKE-PLAN (plan-class old-plan mapping)
  (sand plan-class :instantiate
        :goals (sand old-plan :goals)
```

```
      :actions (sand old-plan :actions)
      :choices mapping
      :derived-from-plan old-plan))

(defmodule INCREMENTAL-REPLANNER
  (:in old-plan violated-assumptions plan-constraints)
  (:ports database)
  (:out new-plan)
  (:ivars
    (Choice-Relaxation-Order
      :initable :gettable :settable
      (:documentation
        "list of all choices, in the order they are to be relaxed"))
    (Violation-To-Choice-Mapping
      :initable :gettable :settable
      (:documentation
        "mapping between assumption violation types and choices to relax")))
  (:local choices bindings constraints old-plan-instance)
  (:documentation "repairs a violated plan by relaxing the set of required choices")
  (:execute
    (setq old-plan-instance (kiosk:get-input old-plan)
          choices (sand (sand old-plan-instance :choices) :copy)
          constraints (sand (kiosk:get-input plan-constraints) :state))
    (dolist (v (sand (kiosk:get-input violated-assumptions) :assumptions))
      (dolist (a (sand violation-to-choice-mapping :get-mapping (sand v :violation-type)))
        (sand choices :remove-mapping a)))
    (loop (when (setq bindings
                     (kiosk:get-port-output
                       :result
                       (kiosk:send-port
                         database :command
                         (list :query (sand constraints :substitute choices)))))
            (dolist (c choice-relaxation-order)
              (when (null (sand choices :get-mapping c))
                (sand choices :add-mapping c (sand bindings :get-mapping c))))
            (return nil))                      ;return from loop
          (when (sand choices :empty-p) (return))
          (when (null (dolist (choice choice-relaxation-order)
                        (when (sand choices :get-mapping choice)
                          (sand choices :remove-mapping choice)
                          (return t))))       ;removed a choice - return from dolist
            ;; we've tried removing all the choices we can, but still no luck
            (return nil)))
    (if (not (sand choices :empty-p))
        (kiosk:return-output :new-plan (make-plan (kiosk:get-input new-plan)
                                                 old-plan-instance choices))
        (cerror "Exit without creating a new plan"
                "This plan cannot be patched for the current situation."))))

(defun MAPPING-TO-KRS-SLOTLIST (mapping)
  "Translate a mapping of plan choices into KRS slot values.
 A plan choice name must be a slot name preceded by a question-mark char."
  (mapcar #'(lambda (k) (list (intern (subseq (string k) 1) 'zetalisp-user)    ;remove "?"
                              (sand mapping :get-mapping k)))
          (sand mapping :all-keys)))

(defmodule KRS-REPLANNER
  (:in old-plan violated-assumptions)
  (:out new-plan)
  (:ivars
    (Choice-Relaxation-Order
      :settable
      (:documentation
```

```
    "list of all KRS choices, in the order they are to be relaxed"))
  (Violation-To-Choice-Mapping
    :settable
    (:documentation
     "a mapping between KRS violation types and KRS choices to relax")))
(:local choices new-choices old-plan-instance)
(:implementation :importer)
(:description "Repairs a violated plan by relaxing the set of required choices. Imports KRS
             (KNOBS Replanning System), v.6.0 0-2, as supplied by MITRE and RADC.")
(:documentation
  "Repairs a violated plan by relaxing the set of required choices. Uses KRS.")
(:execute
  ;; start with the old choices
  (setq old-plan-instance (kiosk:get-input old-plan)
        choices (sand (sand old-plan-instance :choices) :copy))
  ;; remove any choices which the violations invalidate
  (dolist (v (sand (kiosk:get-input violated-assumptions) :assumptions))
    (dolist (a (sand violation-to-choice-mapping :get-mapping (sand v :violation-type)))
      (sand choices :remove-mapping a)))
  ;; replan using the remaining choices - if this fails, remove another choice and try again
  (loop (setq new-choices (zetalisp-user::plan-oca (mapping-to-krs-slotlist choices)))
        (when (or (consp new-choices)         ;successful plan.
                  (sand choices :empty-p))    ;plan is impossible
          (return nil))
        (dolist (choice choice-relaxation-order)
          (when (sand choices :get-mapping choice)
            (sand choices :remove-mapping choice)
            (return))))
  (if (consp new-choices)                     ;successful plan
      (kiosk:return-output :new-plan (make-plan (kiosk:get-input new-plan)
                                                old-plan-instance
                                                (gdb:make-mapping new-choices)))
      (cerror "Exit without creating a new plan"
              "This plan cannot be patched for the current environment.")))

;;; -*- Mode: LISP; Syntax: Common-Lisp; Package: USER; Base: 10 -*-

(PMC::DEFINE-PMC-PROGRAM PMR::PMR-PMC
                (:STARTS
                  ("START" :GRAPHICAL-NAME "START"- :REGION
                    (:LEFT -495.23648 :TOP -96.539825 :WIDTH 357.89044 :HEIGHT
                     131.74205)))
                (:HALTS
                  ("HALT365" :GRAPHICAL-NAME "HALT" :REGION
                    (:LEFT -485.65576 :TOP 222.01979 :WIDTH 305.1885 :HEIGHT
                     142.3159)))
                (:MODULES
                  ("assumption-analyst" PMR:PLAN-ASSUMPTION-ANALYST
                    :GRAPHICAL-NAME "ass.-analyst" :IN-VARS (A-PLAN) :OUT-VARS
                    (TEMP ASS) :IN-ROLES-VARS (:PLAN A-PLAN) :OUT-ROLES-VARS
                    (:PLAN-CONSTRAINTS TEMP :ASSUMPTIONS ASS) :GRAPHICAL-INFO NIL
                    :REGION
                    (:LEFT 24.518677 :TOP -101.33019 :WIDTH 403.39105 :HEIGHT
                     139.92072))
                  ("situation-monitor" PMR:SITUATION-MONITOR :GRAPHICAL-NAME
                    "sit.-mon." :IN-VARS (ASS) :OUT-VARS (VIOL-ASS) :IN-ROLES-VARS
                    (:ASSUMPTIONS ASS) :OUT-ROLES-VARS (:RESULTS VIOL-ASS)
                    :GRAPHICAL-INFO NIL :REGION
                    (:LEFT 664.0331 :TOP -106.12057 :WIDTH 381.83435 :HEIGHT
                     142.31592))
```

```
("replanner" PMR:COMPOSITE-REPLANNER :GRAPHICAL-NAME
 "replanner" :IN-VARS (VIOL-ASS A-PLAN) :OUT-VARS (A-PLAN)
 :IN-ROLES-VARS
 (:VIOLATED-ASSUMPTIONS VIOL-ASS :OLD-PLAN A-PLAN)
 :OUT-ROLES-VARS (:NEW-PLAN A-PLAN) :GRAPHICAL-INFO NIL :REGION
 (:LEFT 664.0331 :TOP 188.4872 :WIDTH 433.4187 :HEIGHT
  154.56934)))
(:CHOICES
 ("continue?" :GRAPHICAL-NAME "continue?" :LISP-CODE
  (IF (TV:MOUSE-Y-OR-N-P "Continue") "yes" "no") :IN-VARS NIL
  :OUT-VARS NIL :REGION
  (:LEFT 84.398315 :TOP 159.74498 :WIDTH 417.25342 :HEIGHT
   223.27129)))
(:LINKS (NIL "START" "assumption-analyst" :GRAPHICAL-NAME NIL)
 (NIL "assumption-analyst" "situation-monitor" :GRAPHICAL-NAME
  NIL)
 (NIL "replanner" "continue?" :GRAPHICAL-NAME NIL)
 ("NO" "continue?" "HALT365" :GRAPHICAL-NAME "NO")
 ("YES" "continue?" "assumption-analyst" :GRAPHICAL-NAME "YES")
 (NIL "situation-monitor" "replanner" :GRAPHICAL-NAME NIL))
(:VARIABLES
 (:INPUT A-PLAN :GRAPHICAL-NAME " --> A-Plan" :REGION
  (:LEFT -365.89648 :TOP 535.789 :WIDTH 384.2296 :HEIGHT
   137.52557))
 (:LOCAL ASS :GRAPHICAL-NAME "Ass" :REGION
  (:LEFT 264.03717 :TOP 564.53125 :WIDTH 343.5114 :HEIGHT
   92.01703))
 (:LOCAL VIOL-ASS :GRAPHICAL-NAME "Viol-Ass" :REGION
  (:LEFT 271.22272 :TOP 679.5001 :WIDTH 372.25372 :HEIGHT
   87.22662))
 (:LOCAL TEMP :GRAPHICAL-NAME "Temp" :REGION
  (:LEFT 271.22272 :TOP 775.3075 :WIDTH 393.81036 :HEIGHT
   72.85553))))
```

APPENDIX VII      Code listing for the PMR Travel
                  Planner Composite Modules

```
;;; -*- Mode: LISP; Syntax: Common-Lisp; Package: PMR; Base: 10; -*-
;;;
;;;    JST:>abe>pmr>pmrdef.lisp
;;;
;;;    COPYRIGHT (c) 1986 BY TEKNOWLEDGE, INC -- ALL RIGHTS RESERVED
;;;
;;;
;;;
;;;
;;;

(in-package 'PMR)

;;; Definition of the PMR as a DF program.
;;; Includes composite Situation Monitor and MRS Replanner.

;;; The definition for an empty DF program.
(df::define-program-old empty df:final-df
```

```
:graphical-name "*New*"
:print-documentation "An empty DF program")

;;; The definition for the situation monitor as a DF program.
(df::define-program-old situation-monitor df:final-df
  :graphical-name "Sit.Monitor"
  :print-documentation "Monitors a DB for violations of given critical assumptions"

:modules
  ;; list of lists containing a module name and its generic class and other options
  (("Database-Translator"
    assumption-to-monitor-pattern-translator
    :graphical-name "Translator"
    :graphical-info ""
    :region (:left 0 :top 75 :right 200 :bottom 125))
   ("Database-Monitor"
    database-monitor
    :graphical-name "DB Monitor"
    :graphical-info ""
    :region (:left 250 :top 75 :right 450 :bottom 125)))

:places
  ;; list of lists containing an place name and its class
  (("Database-Patterns"
    database-monitoring-patterns
    :graphical-name "DB Queries"
    :region (:left 125 :top 150 :right 325 :bottom 200)))

:input-parms
  ;; list of lists of input place name, class, and role of the input
  (("Critical Assumptions"
    critical-assumptions
    :assumptions
    :graphical-name "Assumpts"
    :region (:left 0 :top 0 :right 200 :bottom 50)))

:input-arcs
  ;; list of lists of input place name, module, and role
  (("Critical Assumptions"          "Database-Translator"           :assumptions
    :graphical-name "")
   )

:output-parms
  ;; list of lists of output place name, class, and role of the output
  (("Violated Assumptions"
    violated-assumptions
    :results
    :graphical-name "Violated Assmpts"
    :region (:left 230 :top 0 :right 470 :bottom 50)))

:output-arcs
  ;; list of lists of output place name, module, and role
  (("Database-Monitor"           "Violated Assumptions"          :results
    :graphical-name "")
   )

:module-inputs
;; list of lists containing a module name, a place name, and the role of the place
(("Database-Patterns"            "Database-Monitor"              :patterns
  :graphical-name ""))

:module-outputs
;; list of lists containing a place name, module name, and the role of the place
(("Database-Translator"          "Database-Patterns"             :monitor-patterns
  :graphical-name ""))
)

;;;; **** PMR (here) gets copied to create KRS-PMR (next page), substituting the code
;;;; **** marked by ;;[...]
(df::define-program-old PMR                     ;;[PMR-KRS]
                        df:final-df
  :graphical-name "PMR"                         ;;["PMR-KRS"]
  :print-documentation
"The Plan Monitoring and Replanning skeletal system. This version has its
situation database system implemented in MRS."

:modules
  ;; list of lists containing a module name and its generic class and other options
  (("Plan-Assumption-Analyst"
    plan-assumption-analyst
    :graphical-name "Assumption Analyst"
    :graphical-info ""
    :region (:left 0 :top 225 :right 200 :bottom 275))
   ("Situation-Monitor"
    Situation-monitor
```

```
   :graphical-name "Situation Monitor"
   :graphical-info "OF"
   :region (:left 300 :top 150 :right 500 :bottom 200))
  ("Replanner"
   composite-replanner                          ;;[krs-replanner]
   :graphical-name "Replanner"
   :graphical-info "OF"                         ;;["KRS"]
   :region (:left 600 :top 225 :right 800 :bottom 275))
  ("Plan-Copier"
   copier
   :graphical-name "Plan Copier"
   :graphical-info ""
   :region (:left 300 :top 375 :right 500 :bottom 425))
;;;("Plan-Failure-Explainer")
;;;("Plan-Change-Analyst")
;;;("Plan-Change-Implementor")
;;;("Plan-Change-Explainer")
  )

:places
;; list of lists containing an place name and its class
(("Critical-Plan-Assumptions"
   critical-assumptions
   :graphical-name "Critical Assumpts"
   :region (:left 0 :top 150 :right 200 :bottom 200))
  ("Violated-Plan-Assumptions"
   violated-assumptions
   :graphical-name "Violated Assumpts"
   :region (:left 600 :top 150 :right 800 :bottom 200))
  ("New-Plan-With-Rationale"
   plan
   :graphical-name "New Plan"
   :region (:left 300 :top 225 :right 500 :bottom 275))
  ("Old-Plan-With-Rationale"
   plan
   :graphical-name "Old Plan"
   :region (:left 600 :top 375 :right 800 :bottom 425))
;;;("Plan-Changes")
  )

:input-parms
;; list of lists of input place name, class, and role of the input
(("Plan With Rationale"
   plan
   :plan-input1
   :graphical-name "Input Plan"
   :region (:left 150 :top 300 :right 350 :bottom 350)))

:input-arcs
;; list of lists of input place name, module, and role
(("Plan With Rationale"          "Plan-Assumption-Analyst"     :plan)
  ("Plan With Rationale"          "Replanner"                   :old-plan)
;;;("Plan With Rationale"          "Plan Change Analyst"         :old-plan)
  )

:module-inputs
;; list of lists containing a module name, a place name, and the role of the place
(("Critical-Plan-Assumptions"    "Situation-Monitor"           :assumptions :graphical-name "assumpts")
  ("Violated-Plan-Assumptions"   "Replanner"                   :violated-assumptions
   :graphical-name "violations")
  ("New-Plan-With-Rationale"     "Plan-Assumption-Analyst"     :plan)
  ("New-Plan-With-Rationale"     "Plan-Copier"                 :adt
   :graphical-name "plan")
  ("Old-Plan-With-Rationale"     "Replanner"                   :old-plan
   :graphical-name "old plan")
;;;("New-Plan-With-Rationale"     "Plan-Change-Analyst"         :in-new-rationale)
;;;("Old-Plan-With-Rationale"     "Plan-Change-Analyst"         :in-old-rationale)
;;;("Plan-Changes"                "Plan-Change-Implementor"     :in-changes)
;;;("Plan-Changes"                "Plan-Change-Explainer"       :in-changes)
  )

:module-outputs
;; list of lists containing a place name, module name, and the role of the place
(("Plan-Assumption-Analyst"      "Critical-Plan-Assumptions"   :assumptions
   :graphical-name "c.assumpts")
  ("Situation-Monitor"            "Violated-Plan-Assumptions"   :results)
  ("Replanner"                    "New-Plan-With-Rationale"     :new-plan
   :graphical-name "new plan")
  ("Plan-Copier"                  "Old-Plan-With-Rationale"     :copy)
;;;("Plan-Change-Analyst"         "Plan-Changes"                :out-changes)
  )
 )
```

BEST AVAILABLE COPY

BEST AVAILABLE COPY

```
;;;; **** The contents on this page is copied from the previous one -- don't make
;;;; **** changes here.
(df::define-program-old PMR-KRS
                        df:final-df
  :graphical-name "PMR (KRS)"
  :print-documentation
"The Plan Monitoring and Replanning skeletal system.  This version uses the KRS
replanner and has its situation database system implemented in MRS."

:modules
  ;; list of lists containing a module name and its generic class and other options
  (("Plan-Assumption-Analyst"
    plan-assumption-analyst
    :graphical-name "Assumption Analyst"
    :graphical-info ""
    :region (:left 0 :top 225 :right 200 :bottom 275))
   ("Situation-Monitor"
    Situation-monitor
    :graphical-name "Situation Monitor"
    :graphical-info "DF"
    :region (:left 300 :top 150 :right 500 :bottom 200))
   ("Replanner"
    krs-replanner
    :graphical-name "Replanner"
    :graphical-info "KRS"
    :region (:left 600 :top 225 :right 800 :bottom 275))
   ("Plan-Copier"
    copier
    :graphical-name "Plan Copier"
    :graphical-info ""
    :region (:left 300 :top 375 :right 500 :bottom 425))
;;;("Plan-Failure-Explainer")
;;;("Plan-Change-Analyst")
;;;("Plan-Change-Implementor")
;;;("Plan-Change-Explainer")
   )

:places
  ;; list of lists containing an place name and its class
  (("Critical-Plan-Assumptions"
    critical-assumptions
    :graphical-name "Critical Assumpts"
    :region (:left 0 :top 150 :right 200 :bottom 200))
   ("Violated-Plan-Assumptions"
    violated-assumptions
    :graphical-name "Violated Assumpts"
    :region (:left 600 :top 150 :right 800 :bottom 200))
   ("New-Plan-With-Rationale"
    plan
    :graphical-name "New Plan"
    :region (:left 300 :top 225 :right 500 :bottom 275))
   ("Old-Plan-With-Rationale"
    plan
    :graphical-name "Old Plan"
    :region (:left 600 :top 375 :right 800 :bottom 425))
;;;("Plan-Changes")
   )

:input-parms
  ;; list of lists of input place name, class, and role of the input
  (("Plan With Rationale"
    plan
    :plan-input1
    :graphical-name "Input Plan"
    :region (:left 150 :top 300 :right 350 :bottom 350)))

:input-arcs
  ;; list of lists of input place name, module, and role
  (("Plan With Rationale"          "Plan-Assumption-Analyst"     :plan)
   ("Plan With Rationale"          "Replanner"                   :old-plan)
;;;("Plan With Rationale"          "Plan Change Analyst"         :old-plan)
   )

:module-inputs
  ;; list of lists containing a module name, a place name, and the role of the place
  (("Critical-Plan-Assumptions"    "Situation-Monitor"           :assumptions
    :graphical-name "assumpts")
   ("Violated-Plan-Assumptions"    "Replanner"                   :violated-assumptions
    :graphical-name "violations")
   ("New-Plan-With-Rationale"      "Plan-Assumption-Analyst"     :plan)
   ("New-Plan-With-Rationale"      "Plan-Copier"                 :adt
    :graphical-name "plan")
   ("Old-Plan-With-Rationale"      "Replanner"                   :old-plan
    :graphical-name "old plan")
```

```
;;;("New-Plan-With-Rationale"      "Plan-Change-Analyst"        :in-new-rationale)
;;;("Old-Plan-With-Rationale"      "Plan-Change-Analyst"        :in-old-rationale)
;;;("Plan-Changes"                 "Plan-Change-Implementor"    :in-changes)
;;;("Plan-Changes"                 "Plan-Change-Explainer"      :in-changes)
  )

:module-outputs
  ;; list of lists containing a place name, module name, and the role of the place
  (("Plan-Assumption-Analyst"      "Critical-Plan-Assumptions"  :assumptions
    :graphical-name "c.assumpts")
   ("Situation-Monitor"            "Violated-Plan-Assumptions"  :results)
   ("Replanner"                    "New-Plan-With-Rationale"    :new-plan
    :graphical-name "new plan")
   ("Plan-Copier"                  "Old-Plan-With-Rationale"    :copy)
;;;("Plan-Change-Analyst"          "Plan-Changes"               :out-changes)
   )
 )
```

BEST AVAILABLE COPY

APPENDIX VIII     Code listing for the PMR Travel
                  Planner Core Primitive Modules

```
;;; -*- Mode: LISP; Syntax: Common-Lisp; Package: PMR; Base: 10; -*-
;;;
;;; JST:>abe>pmr>pmr.lisp
;;;
;;; COPYRIGHT (c) 1986 BY TEKNOWLEDGE, INC -- ALL RIGHTS RESERVED
;;;
;;;
;;;
;;;
;;;
;;;

;;; PMR - Plan Monitoring and Replanning System
;;; This file defines the modules and abstract data types that constitute the PMR demo.

(in-package 'pmr)

;;;; Bookkeeping Code and Classes (defclass DF-MODULE-METACLASS
  (:supers df::catalog-meta-class basic-class)
  (:ivars
    (input-keywords
      :settable
      (:documentation "the module's input port names"))
    (output-keywords
      :settable
      (:documentation "the module's output port names")))
  (:documentation "This metaclass is used to create all DF modules."))

(defclass MODULE
  (:documentation "Used only to provide type system information (typep)."))

(defun KEYWORD-INTERN (symbol)
  (intern (string symbol) 'keyword))

;;; Take care of bookkeeping requirements for the catalog/DF/module interface.
(defmacro DEFMODULE (name (&key
                            supers
                            ivars
                            documentation
                            in
                            out
                            local
                            graphical-name
                            print-documentation
                            graphical-info
                            implementation)
                     &body body)
  '(progn
     'compile
```

```
(defclass ,name
   (:meta-class df-module-metaclass)
   (:supers ,@supers module)
   ,@(when ivars            '((:ivars ,@ivars)))
   ,@(when documentation    '((:documentation ,documentation)))
   ,@(when in               '((:input-keywords ',(mapcar #'keyword-intern in))))
   ,@(when out              '((:output-keywords ',(mapcar #'keyword-intern out))))
   ,@(when graphical-name   '((:graphical-name ,graphical-name)))
   ,@(when print-documentation '((:print-documentation ,print-documentation)))
   ,@(when graphical-info   '((:graphical-info ,graphical-info)))
   ,@(when implementation   '((:implementation ,implementation))))

(defresponse (,name :execute) (&key ,@in ,@out &aux .return-list. ,@local)
  ;; I would include the following if we could specify the class name too.
  ;; (declare (sys:function-parent (:method ,name :execute) defmodule))
  ,@body
  .return-list.)

',name))
```

BEST AVAILABLE COPY

```
;;; The following are probably DF-specific, and are intended for use inside a defmodule.

(defmacro GET-ADT (role)
  role)

(defmacro CREATE-ADT (type &rest inits)
  '(let ((class ,type))
     (when class
       (send class :instantiate ,@inits))))

(defmacro RETURN-ADT (role adt)
  '(setq .return-list. (list* ,role ,adt .return-list.)))

(defclass ADT-METACLASS
  (:supers df::catalog-meta-class basic-class)
  (:documentation "This metaclass is used to create all adts."))

(defclass ADT
  (:documentation "Used only to provide type system information (typep)."))

(defmacro DEFADT (name &key
                    supers
                    ivars
                    documentation
                    graphical-name
                    print-documentation
                    graphical-info
                    (implementation :adt))
  (when (null print-documentation)
    (setq print-documentation documentation))
  (when (null graphical-name)
    (setq graphical-name name))
  '(defclass ,name
     (:meta-class adt-metaclass)
     (:supers ,@supers adt)
     ,@(when ivars            '((:ivars ,@ivars)))
     ,@(when documentation    '((:documentation ,documentation)))
     ,@(when graphical-name   '((:graphical-name ,graphical-name)))
     ,@(when print-documentation '((:print-documentation ,print-documentation)))
     ,@(when graphical-info   '((:graphical-info ,graphical-info)))
     ,@(when implementation   '((:implementation ,implementation)))))

;;;; ADT Definitions (defadt PLAN-CONSTRAINTS
        :graphical-name "Constraints"
        :ivars ((state
                 :settable (:default-init nil)
                 (:documentation "a conjunction which encodes the constraints on the plan")))
        :documentation "a description of the constraints which define a valid plan")

(defresponse (plan-constraints :SET-CONJUNCTS) (conjuncts)
  (setq state (send 'conjunction :instantiate :*conjuncts conjuncts)))

(defresponse (plan-constraints :PRINT-SELF) (stream &rest ignore)
  (si:printing-random-object (self stream :typep)
    (format stream "-d"
            (if (and (variable-boundp state)
                     (typep state 'wff))
                (length (send state :conjuncts))
                "** bad state **"))))

(defresponse (plan-constraints :PRINT-TRACE) (stream &optional level)
```

```
         (declare (ignore level))
         level
         (format stream "-& -6T (AND-{-12T-a-^-&-})"
                 (cdr (sand state :unparse)))))

(defadt CRITICAL-ASSUMPTION
        :graphical-name "Crit.Assumpt"
        :ivars ((state
                    :settable (:default-init nil)
                    (:documentation "the partial state description"))
                (criticality
                    :settable (:default-init nil)
                    (:documentation "the plan actions for which this state is critical")))
        :documentation "a state, and an action which depends on it holding")

(defun GET-KEY-RELATION (wff)
  (typecase wff
    (proposition (sand wff :relation))
    (negation (get-key-relation (sand wff :wff)))
    (conjunction (get-key-relation (car (last (sand wff :conjuncts)))))
    (disjunction (get-key-relation (car (sand wff :disjuncts))))
    (implication (get-key-relation (sand wff :antecedent)))
    (equivalence (get-key-relation (sand wff :wff1)))
    (wff (error "-s is qn unknown kind of wff." wff))
    (otherwise (error "-s is not a wff." wff))))

(defresponse (critical-assumption :VIOLATION-TYPE) ()
  (get-key-relation state))

(defresponse (critical-assumption :PRINT-SELF) (stream &rest ignore)
  (si:printing-random-object (self stream :typep)
    (format stream "-a"
            (if (and (variable-boundp state)
                     (typep state 'wff))
                (sand state :unparse)
                "xx bad state xx"))))

(defadt VIOLATED-CRITICAL-ASSUMPTION
        :graphical-name "Viol.Assumpt"
        :supers (critical-assumption)
        :ivars ((violation
                    :settable (:default-init nil)
                    (:documentation "how this state fails to hold (a symbol or mapping)")))
        :documentation "a state that must hold, and a description of how it does not")

;;; Currently, an action has either an implementation or prerequisites and results.
(defadt ACTION
        :graphical-name "Action"
        :ivars ((name
                    :settable (:default-init nil)
                    (:documentation "the name of this action"))
                (agent
                    :settable (:default-init nil)
                    (:documentation "the agent responsible for performing this action"))
                (prerequisites
                    :settable (:default-init nil)
                    (:documentation "states that must hold for this action to be effective"))
                (results
                    :settable (:default-init nil)
                    (:documentation "the states that this action causes to be true"))
                (implementation
                    :settable (:default-init nil)
                    (:documentation "the way this action is achieved, if it is composite")))
        :documentation "a action that is to be taken in a plan")

(defresponse (action :PRINT-SELF) (stream &rest ignore)
  (si:printing-random-object (self stream :typep)
    (format stream "-a"
            (if (and (variable-boundp name) name)
                name
                "xx bad name xx"))))

;;; **** Should have a better way to store and create plans.
(defmacro defaction (name &key agent prerequisites results implementation)
  '(defparameter ,name
       (sand 'action :instantiate
             :name ',name
             :agent ',agent
             :prerequisites (mapcar #'make-wff ',prerequisites)
             :results (mapcar #'make-wff ',results)
             :implementation ,implementation
             )
```

"An action that is part of some plan - defined by Defaction"))

```
(defadt DATABASE-MONITORING-PATTERN
        :graphical-name "DB Pattern"
        :ivars ((query
                   :settable (:default-init nil)
                   (:documentation "the database query"))
                (actions
                   :settable (:default-init nil)
                   (:documentation
                    - "the set of actions to take depending on the results of the query")))
        :documentation "a query and the appropriate actions to take depending on the results")

(defresponse (database-monitoring-pattern :PRINT-SELF) (stream &rest ignore)
  (si:printing-random-object (self stream :typep)
    (format stream "-a"
            (if (and (variable-boundp query)
                     (typep query 'wff))
                (sand query :unparse)
                "xx bad query xx"))))

(defadt SET
        :graphical-name "Set"
        :ivars ((objects
                   :gettable :initable (:default-init nil)
                   (:documentation "the objects in the set"))
                (identity-test
                   :gettable :initable (:default-init #'eql)
                   (:documentation "the appropriate equality test function")))
        :documentation "a set of untyped objects")

(defresponse (set :PRINT-SELF) (stream &rest ignore)
  (si:printing-random-object (self stream :typep)
    (format stream "-d"
            (if (and (variable-boundp objects)
                     (typep objects 'list))
                (length objects)
                "xx bad set xx"))))

(defresponse (set :ADJOIN) (object)
  (if (listp object)
      (setq objects (union objects object :test identity-test))
      (pushnew object objects :test identity-test)))

(defresponse (set :REMOVE) (object &key multiple)
  (if (and multiple (listp object))
      (setq objects (set-difference objects object :test identity-test))
      (setq objects (remove object objects :test identity-test))))

(defresponse (set :MEMBER-P) (object)
  (member object objects :test identity-test))

(defresponse (set :CLEAR) ()
  (setq objects nil))

(defresponse (set :MAP) (function &key append)
  (if append
      (mapcan function objects)
      (mapcar function objects)))

(defadt CRITICAL-ASSUMPTIONS
        :graphical-name "Crit.Assumpts"  :graphical-info "Set"
        :supers (set)
        :ivars ((Plan :initable :gettable      ;(:format plan)
                      (:documentation "The plan to which these assumptions are critical.")))
        :documentation "a set of critical plan assumptions")

(defresponse (critical-assumptions :ASSUMPTIONS) ()
  objects)

(defresponse (critical-assumptions :ADD) (state criticality)
  (sand self :adjoin
        (make-instance 'critical-assumption
                       :state state
                       :criticality criticality)))

(defresponse (critical-assumptions :PRINT-TRACE) (stream &optional level &aux state)
  (declare (ignore level))
  level
  ;; For PMR'
  ;; (format stream "-& Critical assumptions for plan:  -A" Plan)
  (dolist (an-object objects)
    (setq state (sand an-object :state))
```

```
    (if (typep state 'conjunction)
        (format stream "-& -6T (AND-(-12T-a-^-&-)) -75TCriticality: -a"
                (cdr (sand state :unparse))
                (sand (sand an-object :criticality) :name))
      (format stream "-& -6T -a -75TCriticality: -a"
              (sand state :unparse)
              (sand (sand an-object :criticality) :name)))))

(defadt VIOLATED-ASSUMPTIONS
        :graphical-name "Viol.Assumpts"   :graphical-info "Set"
        :supers (critical-assumptions)
        :ivars ((Plan
                 :initable :gettable           ;(:format plan)
                 (:documentation "The plan to which these assumptions belong.")))
        :documentation "a set of violated plan assumptions")

(defresponse (violated-assumptions :ADD) (state criticality violation)
  (sand self :adjoin
        (make-instance 'violated-critical-assumption
                       :state state
                       :criticality criticality
                       :violation violation)))

(defresponse (violated-assumptions :PRINT-TRACE) (stream &optional level)
  (declare (ignore level))
  level
  ;; For PMR'
  ;; (format stream "-& Violated assumptions for plan:  -A" Plan)
  (dolist (an-object objects)
    (format stream "-& -6T -a -75TCriticality: -a"
            (sand (sand an-object :state) :unparse)
            (sand (sand an-object :criticality) :name))))

(defadt DATABASE-MONITORING-PATTERNS
        :graphical-name "DB Patterns"   :graphical-info "set"
        :supers (set)
        :ivars ((Plan
                 :initable :gettable           ;(:format plan)
                 (:documentation "The plan to which these patterns relate.")))
        :documentation "a set of database monitoring patterns")

(defresponse (database-monitoring-patterns :PATTERNS) ()
  objects)

(defresponse (database-monitoring-patterns :ADD) (query actions)
  (sand self :adjoin
        (make-instance 'database-monitoring-pattern
                       :query query
                       :actions actions)))

(defresponse (database-monitoring-patterns :PRINT-TRACE) (stream &optional level)
  (declare (ignore level))
  level
  ;; For PMR'
  ;; (format stream "-& Database monitor patterns for plan:  -A" Plan)
  (dolist (an-object objects)
    (format stream "-&-6TQuery:  -a" (sand (sand an-object :query) :unparse))
    (format stream "-75TAction: -a"
            (sand (third (second (sand an-object :actions))) :name)
            )))

(defadt PLAN
        :graphical-name "Plan"
        :ivars ((goals
                 :settable (:default-init nil)
                 (:documentation "the goal states of the plan"))
                (actions
                 :settable (:default-init nil)
                 (:documentation "the actions that achieve the goal states"))
                (choices
                 :settable (:default-init nil)
                 (:documentation "a mapping of the plan roles (choices) to actual objects"))
                (Derived-From-Plan
                 :initable :gettable (:default-init 'NIL)
                 (:documentation
                  "The plan this plan was derived from, or NIL if created stand-alone.")))
        :documentation "an ordered set of actions that will achieve a collection of goals")

(defresponse (plan :PRINT-SELF) (stream &rest ignore)
  (si:printing-random-object (self stream :typep)
    (cond ((and (variable-boundp choices)
```

BEST AVAILABLE COPY

```
                    (typep choices 'mapping))
              (format stream "-d "
                      (sand choices :eval-inside-yourself
                            '(length *map-alist))))
              (t (format stream "-a" "** bad choices **")))))

(defresponse (plan :PRINT-TRACE) (stream &optional level)
  (declare (ignore level))
  level
  (format stream "-& -6T Goals:-17T-{-A -}" goals)
  (format stream "-& -6T Actions:-17T-{-A-^; -}"
          (mapcar #'(lambda (action) (sand action :name))
                  actions))
  (format stream "-& -6T Choices:-17T")
  ;;; **** should be changed
  (let ((c-count 0))
    (dolist (c (sand choices :eval-inside-yourself '*map-alist))
      (if (= c-count 3)
          (progn (format stream "-% -17T")
                 (setq c-count 1))
          (incf c-count))
      (format stream "[-a: -a] "(string-trim '(#\?) (string (car c))) (cdr c)))))

;;;; MODULES

;;; This is redefined by the transaction viewer to provide a graphics hook for
;;; ''Transaction Framework'' activity.
(defun GDB-SAND (sender object message &rest args)
  (declare (ignore sender))
  sender
  (sand* object message args))

(defmodule DATABASE-MONITOR
    (
     :graphical-name "DB Monitor"
     :implementation :blackbox
     :print-documentation
     "continuosly monitors a database's contents and applies query/action pairs"
     :in (patterns)
     :out (results)
     :ivars ((polling-wait
              :settable (:default-init 600)      ;600 = 10 seconds
              (:documentation "delay between checks - in 60ths of a second")))
     :local (patterns-list results-instance query-bindings)
     :documentation "monitors a database's contents and applies query/action pairs")
  (declare (special *situation-database*))
  (setq patterns-list (sand (get-adt patterns) :patterns)
        results-instance (create-adt (get-adt results)
                                     :plan (sand (get-adt patterns) :plan)))
  (if patterns-list
      (do (actions query possible-actions action)
          (actions (dolist (a actions)
                     (sand* results-instance a)))
        (dolist (p patterns-list)
          (setq query (sand p :query)
                possible-actions (sand p :actions))
          (setq query-bindings (gdb-sand self *situation-database* :query query))
          (cond (query-bindings
                 (if (setq action (getf possible-actions :true))
                     (push (append action (list query-bindings)) actions)))
                (t (if (setq action (getf possible-actions :false))
                       (push (append action '(:false)) actions)))))
        (if (null actions)
            (process-sleep polling-wait (zl:string "Database Monitoring"))))
      (cerror "Return an empty results adt"
              "There are no patterns to monitor."))
  (return-adt :results results-instance))

;;; **** Doesn't say when an assumption is an explicit change from a previous result.
(defmodule PLAN-ASSUMPTION-ANALYST
    (
     :graphical-name "Assump.Analyst"
     :implementation :blackbox
     :print-documentation
     "identifies the critical assumptions of a plan"
     :in (plan)
     :out (assumptions plan-constraints)
     :ivars ((local-db
              :initable
              (:default-init (sand 'database :instantiate))
              (:documentation "a local database used for plan simulation")))
     :local (plan-instance goals actions choices constraints assumptions-instance
             plan-constraints-instance)
     :documentation "identifies the critical plan assumptions")
```

```
(declare (special *situation-database*))
(sand local-db :clear)
(sand local-db :inherit *consistency-database*)
(setq plan-instance (get-adt plan)
      goals (sand plan-instance :goals)
      actions (sand plan-instance :actions)
      choices (sand plan-instance :choices)
      assumptions-instance (create-adt (get-adt assumptions)
                                       :plan plan-instance)
      plan-constraints-instance (create-adt (get-adt plan-constraints)))
(do ((acts actions) p act impl bindings)
    ((null acts))
  (setq act (pop acts))
  (cond ((setq impl (sand act :implementation))
         (setq acts (append impl acts)))
        (t (dolist (generic-p (sand act :prerequisites))
             (setq p (sand generic-p :substitute choices)
                   bindings (sand local-db :query p))
             (cond ((null bindings)
                    (pushnew generic-p constraints :test #'identical-wff)
                    (when assumptions-instance
                      (sand assumptions-instance :add p act)))))
           (dolist (generic-r (sand act :results))
             (sand local-db :consistent-store
                   (sand generic-r :substitute
                         (if bindings (sand bindings :union choices)
                             choices)))))))
(when plan-constraints-instance
  (sand plan-constraints-instance :set-conjuncts constraints)
  (return-adt :plan-constraints plan-constraints-instance))
(when assumptions-instance
  (return-adt :assumptions assumptions-instance)))

(defmodule ASSUMPTION-TO-MONITOR-PATTERN-TRANSLATOR
    (
     :graphical-name "Pattern Gen."
     :implementation :blackbox
     :print-documentation
     "sets up monitor pattern/action pairs for the monitorable assumptions"
     :in (assumptions)
     :out (monitor-patterns)
     :local (state criticality monitor-patterns-instance)
     :documentation
     "sets up monitor pattern/action pairs for the monitorable assumptions")
  (declare (special *situation-database*))
  (setq monitor-patterns-instance
        (create-adt (get-adt monitor-patterns)
                    :plan (sand (get-adt assumptions) :plan)))
  (dolist (a (sand (get-adt assumptions) :assumptions))
    (setq state (sand a :state)
          criticality (sand a :criticality))
    (when (gdb-sand self *situation-database* :query
                    (make-proposition '(monitorable ,(sand state :unparse))))
      (sand monitor-patterns-instance :add
            state
            '(:false (:add ,state ,criticality)))))
  (return-adt :monitor-patterns monitor-patterns-instance))

(defmodule COPIER
    (
     :graphical-name "ADT Copier"
     :implementation :blackbox
     :in (adt)
     :out (copy)
     :local (adt-instance output-type)
     :print-documentation "this copies an ADT"
     :documentation "this returns its input (doesn't really copy it)")
  (setq adt-instance (get-adt adt)
        output-type (get-adt copy))
  (if (typep adt-instance output-type)
      (return-adt :copy adt-instance)
      (error "~s is not an instance of ~s." adt-instance output-type)))

(defun MAKE-PLAN (plan-class old-plan mapping)
  (sand plan-class :instantiate
        :goals (sand old-plan :goals)
        :actions (sand old-plan :actions)
        :choices mapping
        :derived-from-plan old-plan))

(defmodule INCREMENTAL-REPLANNER
    (
```

```
            :graphical-name "Simple Replanner"
            :implementation :blackbox
            :in (old-plan violated-assumptions plan-constraints)
            :out (new-plan)
            :ivars ((choice-relaxation-order
                      :initable :gettable :settable
                      (:documentation
                        "list of all choices, in the order they are to be relaxed"))
                    (violation-to-choice-mapping
                      :initable :gettable :settable
                      (:documentation
                        "mapping between assumption violation types and choices to relax")))
            :local (choices bindings constraints old-plan-instance)
            :documentation "repairs a violated plan by relaxing the set of required choices")
  (declare (special *situation-database*))
  (setq old-plan-instance (get-adt old-plan)
        choices (sand (sand old-plan-instance :choices) :copy)
        constraints (sand (get-adt plan-constraints) :state))
  (dolist (v (sand (get-adt violated-assumptions) :assumptions))
    (dolist (a (sand violation-to-choice-mapping :get-mapping (sand v :violation-type)))
      (sand choices :remove-mapping a)))
  (loop
    (when (setq bindings (gdb-sand self *situation-database* :query
                                   (sand constraints :substitute choices)))
      (dolist (c choice-relaxation-order)
        (when (null (sand choices :get-mapping c))
          (sand choices :add-mapping c (sand bindings :get-mapping c))))
      (return nil))                         ;return from loop
    (when (sand choices :empty-p) (return))
    (when (null (dolist (choice choice-relaxation-order)
                  (when (sand choices :get-mapping choice)
                    (sand choices :remove-mapping choice)
                    (return t))))           ;removed a choice - return from dolist
      ;; we've tried removing all the choices we can, but still no luck
      (return nil)))
  (if (not (sand choices :empty-p))
      (return-adt :new-plan (make-plan (get-adt new-plan) old-plan-instance choices))
      (cerror "Exit without creating a new plan"
              "This plan cannot be patched given the current situation.")))

;;; Translate a mapping of plan choices into KRS slot values.
;;; A plan choice name must be a slot name preceded by a question-mark char.
(defun MAPPING-TO-KRS-SLOTLIST (mapping)
  (mapcar #'(lambda (k) (list (intern (substring (string k) 1) 'zetalisp-user)  ;remove "?"
                              (sand mapping :get-mapping k)))
          (sand mapping :all-keys)))

(defmodule KRS-REPLANNER
            (
            :graphical-name "KRS Replanner"
            :graphical-info "KRS"
            :implementation :importer
            :print-documentation
"Repairs a violated plan by relaxing the set of required choices.  Imports KRS
(KNOBS Replanning System), v.6.0 0-2, as supplied by MITRE and RADC."
            :in (old-plan violated-assumptions)
            :out (new-plan)
            :ivars ((choice-relaxation-order
                      :settable
                      (:documentation
                        "list of all KRS choices, in the order they are to be relaxed"))
                    (violation-to-choice-mapping
                      :settable
                      (:documentation
                        "a mapping between KRS violation types and KRS choices to relax")))
            :local (choices new-choices old-plan-instance)
            :documentation
"Repairs a violated plan by relaxing the set of required choices.  Uses KRS.")
  ;; start with the old choices
  (setq old-plan-instance (get-adt old-plan)
        choices (sand (sand old-plan-instance :choices) :copy))
  ;; remove any choices which the violations invalidate
  (dolist (v (sand (get-adt violated-assumptions) :assumptions))
    (dolist (a (sand violation-to-choice-mapping :get-mapping (sand v :violation-type)))
      (sand choices :remove-mapping a)))
  ;; replan using the remaining choices - if this fails, remove another choice and try again
  (loop (setq new-choices (zetalisp-user::plan-oca (mapping-to-krs-slotlist choices)))
    (when (or (consp new-choices)           ;successful plan
              (sand choices :empty-p))      ;plan is impossible
      (return nil))
    (dolist (choice choice-relaxation-order)
      (when (sand choices :get-mapping choice)
        (sand choices :remove-mapping choice)
```

```
            (return))))
(if (consp new-choices)                              ;successful plan
    (return-adt :new-plan (make-plan (get-adt new-plan)
                                     old-plan-instance
                                     (make-mapping new-choices))))
    (cerror "Exit without creating a new plan"
            "This plan cannot be patched given the current environment.")))

;;; -*- Mode: LISP; Syntax: Common-Lisp; Package: PMR; Base: 10 -*-

;;; JST:>abe>pmr>pmrinc.lisp
;;;
;;;     COPYRIGHT (c) 1986 BY TEKNOWLEDGE, INC -- ALL RIGHTS RESERVED
;;;
;;;
;;;
;;;
;;;
;;;

(in-package 'pmr)
(import '(cu:run-failure
          cu:change-analyzer))

;;; This file contains the PMR modules that are implemented in KnowledgeCraft.

(defmodule plan-explainer
           (:graphical-name "Failure Expl'r"
            :implementation :blackbox    :graphical-info "OPS5"
            :print-documentation
"Describes, in English, the violated plan assumptions and their effects
on the plan."
            :in (failures)
            :out ()
            :local ()
            :documentation "prints out the violated plan assumptions")
  (cu:run-failure (sand failures :objects) (sand failures :plan)))

(defmodule plan-change-analyst
           (:graphical-name "Change Analyst"
            :implementation :blackbox
            :print-documentation "Determine the differences between two plans."
            :in (new old)
            :out (synthesis)
            :local ()
            :documentation "analyzes the plan changes")
  (cu:change-analyzer (sand old :choices)
                      (sand new :choices))
  (list synthesis))

(defmodule plan-change-explainer
           (:graphical-name "Change Expl'r"
            :implementation :blackbox
            :print-documentation "Explains changes made to a plan."
            :in (changes)
            :out ()
            :local ()
            :documentation "explains the plan changes")
  changes
  ())

(defclass plan-implementor)

(defmodule plan-implementor
           (:graphical-name "Implementor"
            :implementation :blackbox
            :print-documentation "Implements the plan changes."
            :in (changes)
            :out ()
            :local ()
            :documentation "explains the plan changes")
  changes
  ())
```

APPENDIX IX

Code listing for the PMR Travel Planner Primitive Functions

```lisp
;;; -*- Syntax: Common-Lisp; Mode: LISP; Package: CRL-USER; Base: 10 -*-   BEST AVAILABLE COPY
;;; JST:>ABE>PMR>new-kc-pmr.lisp.1, 4/12/86 22:47:50, Edit by JLARK
;;;
;;;     COPYRIGHT (c) 1986 BY TEKNOWLEDGE, INC -- ALL RIGHTS RESERVED
;;;
;;;
;;;
;;;
;;;
;;;

(in-package 'crl-user)
(export '(run-failure change-analyzer))

;;; This file defines functions called by the pmr modules. Typically these functions
;;; convert coral adts into schemas, and apply OPS5 rules on them.

;;;
;;; A CRL utility which will delete all the instances and the schema itself
;;; for each schema in the given list. Therefore list order can be important.
;;;

(defun clean-old-schema (schema-list)
  (dolist (schema schema-list)
    (when (schema-p schema)
      (when (local-slot-p schema 'instance+inv)
        (let ((instances (get-values schema 'instance+inv)))
          (dolist (instance instances)
            (delete-schema instance))))
      (delete-schema schema))))

;;;
;;; Initialize OPS5
;;;

(defun init-ops (schema-class-list)
  (clean-old-schema schema-class-list)
  (reset-ops)
  (set-switch 'Srete t)
  (strategy mea))

;;;
;;; Function called by the Plan Failure Examiner
;;;

(defun run-failure (fail-list plan)
  (init-ops '(vpa))
  (format t "-2%")
  (cschema 'vpa ('criticality) ('v-p-a) ('plan) ('printed))
  (schema-literalize vpa criticality v-p-a plan printed)
  (mapcar #'(lambda (object) (cschema (gensym "vpa-")
                                      ('instance 'vpa)
                                      ('criticality (send (send object :criticality) :name))
                                      ('v-p-a object)
                                      ('plan plan)
                                      ('printed nil)))
          fail-list)
  (let ((*load-verbose* nil))
    (load "local:>pfe-rules.lisp"))
  (let ((ops::*ptrace* nil))
    (ops::run))
  (format t "-2%"))

;;;
;;; Function called by the Plan Change Analyst
;;;

(defun change-analyzer (old-plan-adt new-plan-adt)
  (init-ops '(old-plan new-plan plan))
  (let* ((old-slots (mapcar #'(lambda (sym) (intern sym 'cu))
                            (coral:sand old-plan-adt :all-keys)))
         (new-slots (mapcar #'(lambda (sym) (intern sym 'cu))
                            (coral:sand new-plan-adt :all-keys)))
         (all-slots (union old-slots new-slots))
         (plan-schema (create-schema 'plan)))
    (dolist (a-slot all-slots)
```

```
    (create-slot plan-schema a-slot))
  (eval '(schema-literalize plan ,3all-slots))
  (cschema 'old-plan ('is-a 'plan))
  (cschema 'new-plan ('is-a 'plan))
  (let ((old-schema (cschema (gensym "old-plan-")
                              ('instance 'old-plan)))
        (new-schema (cschema (gensym "new-plan-")
                              ('instance 'new-plan))))
    (dolist (a-slot old-slots)
      (new-value old-schema a-slot (coral:sand old-plan-adt :get-mapping
                                               (intern a-slot 'pmr))))
    (dolist (a-slot new-slots)
      (new-value new-schema a-slot (coral:sand new-plan-adt :get-mapping
                                               (intern a-slot 'pmr))))
    ))
(let ((*load-verbose* nil))
  (load "jst:>abe>pmr>pca-rules.lisp"))
(ops::run))
```

BEST AVAILABLE COPY

APPENDIX X    Code listing for the PMR Travel Planner Customized Plan Actions and Data Inputs

```
;;; -*- Mode: LISP; Syntax: Common-Lisp; Package: PMR; Base: 10; -*-
;;;
;;;     JST:>abe>pmr>tp-plan.lisp
;;;
;;;     Copyright (c) 1986 BY TEKNOWLEDGE, INC -- ALL RIGHTS RESERVED
;;;
;;;
;;;
;;;
;;;
;;;

;;;     PMR Travel Planning System
;;; This file instantiates the PMR to run the Travel Planning system.

(in-package 'pmr)
(export '(
          tp-make-plan
          *tp-plan-1*
          *tp-plan-2*
          *tp-consistency*
          *tp-situation*)
        'pmr)

;;;; TRAVEL PLANNING PLAN STRUCTURE (defaction go-to-airport
           :agent           passenger
           :prerequisites   ((passenger-location ?home)
                             (and (time-of-departure ?flight ?time-of-departure)
                                  (ground-transportation-available ?home-ground-transport
                                                    ?home ?home-airport ?time-of-departure)))
           :results         ((passenger-location ?home-airport))
           )

(defaction take-flight
           :agent           passenger
           :prerequisites   ((flight-scheduled ?flight ?home-airport ?destination-airport)
                             (passenger-location ?home-airport))
           :results         ((passenger-location ?destination-airport))
           )

(defaction go-to-hotel
           :agent           passenger
           :prerequisites   ((passenger-location ?destination-airport)
                             (and (hotel-location ?hotel ?hotel-location)
                                  (time-of-arrival ?flight ?time-of-arrival)
                                  (ground-transportation-available
                                      ?destination-ground-transport
                                      ?destination-airport ?hotel-location ?time-of-arrival))
```

```
            )
    :results           ((passenger-location ?hotel))
    )

(defaction check-in
    :agent             passenger
    :prerequisites     ((hotel-room-booking ?hotel))
    :results           ((reached-final-destination))
    )

(defaction get-settled
    :agent             passenger
    :implementation    (list go-to-hotel
                             check-in)
    )

(defun tp-make-plan (plan-class mapping)
  (sand plan-class :instantiate
        :goals '((reached-final-destination))
        :actions (list go-to-airport
                       take-flight
                       get-settled)
        :choices mapping))

(defparameter *tp-plan-1*
        (tp-make-plan
          'plan
          (make-mapping '((?flight                      . AA-437)
                          (?home                        . menlo-park)
                          (?destination                 . east-side)
                          (?home-airport                . san-fransisco-airport)
                          (?destination-airport         . boston-airport)
                          (?home-ground-transport       . drive-my-car)
                          (?destination-ground-transport . taxi)
                          (?time-of-departure           . morning)
                          (?time-of-arrival             . evening)
                          (?hotel                       . boston-ramada-inn))))
  "a plan for TP-PMR")

(defparameter *tp-plan-2*
        (tp-make-plan
          'plan
          (make-mapping '((?flight                      . AA-354)
                          (?home                        . menlo-park)
                          (?destination                 . east-side)
                          (?home-airport                . san-fransisco-airport)
                          (?destination-airport         . boston-airport)
                          (?home-ground-transport       . drive-my-car)
                          (?destination-ground-transport . taxi)
                          (?time-of-departure           . afternoon)
                          (?time-of-arrival             . night)
                          (?hotel                       . boston-ramada-inn))))
  "a plan for TP-PMR")

(defparameter *tp-consistency*
        '((inconsistent ?x (not ?x))
          (inconsistent (not ?x) ?x)
          (inconsistent (passenger-location ?location1)
                        (passenger-location ?location2)))
  "The contents of the TP-PMR Consistency database")

(defparameter *tp-situation*
        '((monitorable (flight-scheduled ?flight ?from ?to))
          (monitorable (hotel-room-booking ?hotel))
          (monitorable (ground-transportation-available
                          ?ground-transportation ?from ?to ?time))

;; FACTS & CURRENT STATES .

(passenger-location MENLO-PARK)

(flight-scheduled AA-437 SAN-FRANSISCO-AIRPORT BOSTON-AIRPORT)
          (flight-scheduled UA-292 SAN-FRANSISCO-AIRPORT BOSTON-AIRPORT)
          (flight-scheduled AA-354 SAN-FRANSISCO-AIRPORT BOSTON-AIRPORT)

(time-of-departure AA-437 MORNING)
          (time-of-departure UA-292 MORNING)
          (time-of-departure AA-354 AFTERNOON)

(time-of-arrival AA-437 EVENING)
          (time-of-arrival UA-292 EVENING)
          (time-of-arrival AA-354 NIGHT)
```

```
    (hotel-location BOSTON-RAMADA-INN EAST-SIDE)
    (hotel-location BOSTON-SHERATON EAST-SIDE)
    (hotel-location BOSTON-HOLIDAY-INN WEST-SIDE)

(hotel-room-booking BOSTON-RAMADA-INN)
    (hotel-room-booking BOSTON-SHERATON)
    (hotel-room-booking BOSTON-HOLIDAY-INN)

(ground-transportation-available
      TAXI MENLO-PARK SAN-FRANSISCO-AIRPORT MORNING)
    (ground-transportation-available
      SHUTTLE MENLO-PARK SAN-FRANSISCO-AIRPORT MORNING)
    (ground-transportation-available
      DRIVE-MY-CAR MENLO-PARK SAN-FRANSISCO-AIRPORT MORNING)
    (ground-transportation-available
      GET-A-RIDE MENLO-PARK SAN-FRANSISCO-AIRPORT MORNING)
    (ground-transportation-available
      RENT-A-CAR MENLO-PARK SAN-FRANSISCO-AIRPORT MORNING)

(ground-transportation-available
      TAXI MENLO-PARK SAN-FRANSISCO-AIRPORT AFTERNOON)
    (ground-transportation-available
      SHUTTLE MENLO-PARK SAN-FRANSISCO-AIRPORT AFTERNOON)
    (ground-transportation-available
      DRIVE-MY-CAR MENLO-PARK SAN-FRANSISCO-AIRPORT AFTERNOON)
    (ground-transportation-available
      GET-A-RIDE MENLO-PARK SAN-FRANSISCO-AIRPORT AFTERNOON)
    (ground-transportation-available
      RENT-A-CAR MENLO-PARK SAN-FRANSISCO-AIRPORT AFTERNOON)

(ground-transportation-available
      TAXI BOSTON-AIRPORT EAST-SIDE EVENING)
    (ground-transportation-available
      SHUTTLE BOSTON-AIRPORT EAST-SIDE EVENING)
    (ground-transportation-available
      GET-A-RIDE BOSTON-AIRPORT EAST-SIDE EVENING)
    (ground-transportation-available
      RENT-A-CAR BOSTON-AIRPORT EAST-SIDE EVENING)

(ground-transportation-available
      TAXI BOSTON-AIRPORT EAST-SIDE NIGHT)
    (ground-transportation-available
      RENT-A-CAR BOSTON-AIRPORT EAST-SIDE NIGHT)
    )
"The initial contents of the TP-PMR Situation database")
```

BEST AVAILABLE COPY

APPENDIX XI     Code listing for the PMR Travel
                Planner Plan Failure Explainer Rules

```
;;; -*- Syntax: Common-Lisp; Mode: LISP; Package: CRL-USER; Base: 10 -*-

;;; JST:>abe>pmr>new-pfe-rules.lisp.9, 4/13/86 20:44:13, Edit by JLARK
;;;
;;;     COPYRIGHT (c) 1986 BY TEKNOWLEDGE, INC -- ALL RIGHTS RESERVED
;;;
;;;
;;;
;;;
;;;

(in-package 'crl-user)
(import '(coral:sand) 'CU)

;;;; OPS5 rules of the Plan Failure Explainer (read-varbinds on)

;;;; Shared rule (p PRINT-INTRO
    (vpa ^schema-name <name>
         ^plan <plan>
         ^v-p-a <vpa-inst>
         ^instance vpa
         ^printed nil)
```

```
-->
(new-value S<name> 'printed 'intro)
(format t "-2&Plan -A will fail because -A is false,-Xwhich will prevent "
    S<plan>
    (sand (sand S<vpa-inst> :state) :unparse))
)

;;;; Travel planning rules (p GO-TO-AIRPORT
   (vpa ^schema-name <name>
        ^criticality PMR::go-to-airport
        ^plan <plan>
        ~v-p-a <vpa-inst>
        ^instance vpa
        ^printed intro)
   -->
   (ops::remove 1)
   (format t "-A from travelling from -A to -A by -A.-2%"
       (sand (sand S<vpa-inst> :criticality) :agent)
       (sand (sand S<plan> :choices) :get-mapping 'pmr::?home)
       (sand (sand S<plan> :choices) :get-mapping 'pmr::?home-airport)
       (sand (sand S<plan> :choices) :get-mapping 'pmr::?time-of-departure))
)

(p TAKE-FLIGHT
   (vpa ^schema-name <name>
        ^criticality PMR::take-flight
        ^plan <plan>
        ~v-p-a <vpa-inst>
        ^instance vpa
        ^printed intro)
   -->
   (ops::remove 1)
   (format t "-A from taking -A from -A to -A.-2%"
       (sand (sand S<vpa-inst> :criticality) :agent)
       (sand (sand S<plan> :choices) :get-mapping 'pmr::?flight)
       (sand (sand S<plan> :choices) :get-mapping 'pmr::?home-airport)
       (sand (sand S<plan> :choices) :get-mapping 'pmr::?destination-airport))
)

(p GO-TO-HOTEL
   (vpa ^schema-name <name>
        ^criticality PMR::go-to-hotel
        ^plan <plan>
        ~v-p-a <vpa-inst>
        ^instance vpa
        ^printed intro)
   -->
   (ops::remove 1)
   (format t "-A from taking -A from -A to -A at -A.-2%"
       (sand (sand S<vpa-inst> :criticality) :agent)
       (sand (sand S<plan> :choices) :get-mapping 'pmr::?destination-ground-transport)
       (sand (sand S<plan> :choices) :get-mapping 'pmr::?destination-airport)
       (sand (sand S<plan> :choices) :get-mapping 'pmr::?hotel-location)
       (sand (sand S<plan> :choices) :get-mapping 'pmr::?time-of-arrival))
)

(p CHECK-IN
   (vpa ^schema-name <name>
        ^criticality PMR::check-in
        ^plan <plan>
        ~v-p-a <vpa-inst>
        ^instance vpa
        ^printed intro)
   -->
   (ops::remove 1)
   (format t "-A from checking-in at -A.-2%"
       (sand (sand S<vpa-inst> :criticality) :agent)
       (sand (sand S<plan> :choices) :get-mapping 'pmr::?hotel))
)

(p GENERIC-PRINT-VPA
   (vpa ^schema-name <name>
        ^criticality <criticality>
        ^plan <plan>
        ^instance vpa
        ^printed intro)
   -->
   (format t "-A.-2%" S<criticality>)
   (ops::remove 1)
)

(read-varbinds off)
```

APPENDIX XII    Code listing for the PMR Travel Planner Plan Change Explainer Rules

```
;;; -*- Syntax: Common-Lisp; Mode: LISP; Package: CRL-USER; Base: 10 -*-    BEST AVAILABLE COPY
;;;     COPYRIGHT (c) 1986 BY TEKNOWLEDGE, INC -- ALL RIGHTS RESERVED
;;;
;;;
;;;
;;;
;;;
;;; vax:[abe.pmr]pca_rules.lsp
;;; OPS5 rules of the Plan Change Analyst (in-package 'crl-user)

(read-varbinds on)

(p compare-plans
   (plan ^schema-name <op1>
         ^instance old-plan)
   (plan ^schema-name <np1>
         ^instance new-plan)
   -->
   (format t "-2% -5TChanges in Plan: ")
   (format t "-2% -12T Attribute -35T Old -55T New -%")
   (dolist (a-slot (remove 'instance (get-slots $<op1>)))
     (let ((old-value (get-value $<op1> a-slot))
           (new-value (get-value $<np1> a-slot)))
       (if (equal old-value new-value)
           (format t "-%-12T -a:-33T -a -53T -a" a-slot old-value new-value)
           (format t "-%xxxx-12T -a:-33T -a -53T -a" a-slot old-value new-value)
           )))
   )

(read-varbinds off)
```

APPENDIX XIII    Listing of a Trace of one cycle of the PMR Travel Planner

```
ONE CYCLE TRACE OF TP-PMR (May 22 1986 version)

PLAN-ASSUMPTION-ANALYST
  input-role: PLAN
    Goals:    (REACHED-FINAL-DESTINATION)
    Actions:  GO-TO-AIRPORT; TAKE-FLIGHT; GET-SETTLED
    Choices:  [FLIGHT: AA-437] [HOME: MENLO-PARK] [DESTINATION: EAST-SIDE]
              [HOME-AIRPORT: SAN-FRANSISCO-AIRPORT] [DESTINATION-AIRPORT: BOSTON-AIRPORT]
              [HOME-GROUND-TRANSPORT: DRIVE-MY-CAR] [DESTINATION-GROUND-TRANSPORT: TAXI]
              [TIME-OF-DEPARTURE: MORNING] [TIME-OF-ARRIVAL: EVENING]
              [HOTEL: BOSTON-RAMADA-INN]

PLAN-ASSUMPTION-ANALYST
  output-role: ASSUMPTIONS
    (HOTEL-ROOM-BOOKING BOSTON-RAMADA-INN)
      Criticality: CHECK-IN
    (AND (HOTEL-LOCATION BOSTON-RAMADA-INN ?HOTEL-LOCATION)
         (TIME-OF-ARRIVAL AA-437 EVENING)
         (GROUND-TRANSPORTATION-AVAILABLE TAXI BOSTON-AIRPORT ?HOTEL-LOCATION EVENING))
      Criticality: GO-TO-HOTEL
```

```
(FLIGHT-SCHEDULED AA-437 SAN-FRANSISCO-AIRPORT BOSTON-AIRPORT)
  Criticality: TAKE-FLIGHT
(AND (TIME-OF-DEPARTURE AA-437 MORNING)
     (GROUND-TRANSPORTATION-AVAILABLE DRIVE-MY-CAR MENLO-PARK SAN-FRANSISCO-AIRPORT
         MORNING))
  Criticality: GO-TO-AIRPORT
(PASSENGER-LOCATION MENLO-PARK)
  Criticality: GO-TO-AIRPORT
```

BEST AVAILABLE COPY

SITUATION-MONITOR
  input-role: ASSUMPTIONS
```
    (HOTEL-ROOM-BOOKING BOSTON-RAMADA-INN)
      Criticality: CHECK-IN
    (AND (HOTEL-LOCATION BOSTON-RAMADA-INN ?HOTEL-LOCATION)
         (TIME-OF-ARRIVAL AA-437 EVENING)
         (GROUND-TRANSPORTATION-AVAILABLE TAXI BOSTON-AIRPORT ?HOTEL-LOCATION EVENING))
      Criticality: GO-TO-HOTEL
    (FLIGHT-SCHEDULED AA-437 SAN-FRANSISCO-AIRPORT BOSTON-AIRPORT)
      Criticality: TAKE-FLIGHT
    (AND (TIME-OF-DEPARTURE AA-437 MORNING)
         (GROUND-TRANSPORTATION-AVAILABLE DRIVE-MY-CAR MENLO-PARK SAN-FRANSISCO-AIRPORT
             MORNING))
      Criticality: GO-TO-AIRPORT
    (PASSENGER-LOCATION MENLO-PARK)
      Criticality: GO-TO-AIRPORT
```

SITUATION-MONITOR
  output-role: RESULTS
```
    (HOTEL-ROOM-BOOKING BOSTON-RAMADA-INN)
      Criticality: CHECK-IN
```

REPLANNER
  input-role: OLD-PLAN
    Goals:   (REACHED-FINAL-DESTINATION)
    Actions: GO-TO-AIRPORT; TAKE-FLIGHT; GET-SETTLED
    Choices: [FLIGHT: AA-437] [HOME: MENLO-PARK] [DESTINATION: EAST-SIDE]
             [HOME-AIRPORT: SAN-FRANSISCO-AIRPORT] [DESTINATION-AIRPORT: BOSTON-AIRPORT]
             [HOME-GROUND-TRANSPORT: DRIVE-MY-CAR] [DESTINATION-GROUND-TRANSPORT: TAXI]
             [TIME-OF-DEPARTURE: MORNING] [TIME-OF-ARRIVAL: EVENING]
             [HOTEL: BOSTON-RAMADA-INN]
  input-role: VIOLATED-ASSUMPTIONS
    (HOTEL-ROOM-BOOKING BOSTON-RAMADA-INN)
      Criticality: CHECK-IN REPLANNER
  output-role: NEW-PLAN
    Goals:   (REACHED-FINAL-DESTINATION)
    Actions: GO-TO-AIRPORT; TAKE-FLIGHT; GET-SETTLED
    Choices: [HOTEL: BOSTON-SHERATON] [FLIGHT: AA-437] [HOME: MENLO-PARK]
             [DESTINATION: EAST-SIDE] [HOME-AIRPORT: SAN-FRANSISCO-AIRPORT]
             [DESTINATION-AIRPORT: BOSTON-AIRPORT] [HOME-GROUND-TRANSPORT: DRIVE-MY-CAR]
             [DESTINATION-GROUND-TRANSPORT: TAXI] [TIME-OF-DEPARTURE: MORNING]
             [TIME-OF-ARRIVAL: EVENING]

CHANGE ANALYST
  input-role: OLD
    Goals:   (REACHED-FINAL-DESTINATION)
    Actions: GO-TO-AIRPORT; TAKE-FLIGHT; GET-SETTLED
    Choices: [FLIGHT: AA-437] [HOME: MENLO-PARK] [DESTINATION: EAST-SIDE]
             [HOME-AIRPORT: SAN-FRANSISCO-AIRPORT] [DESTINATION-AIRPORT: BOSTON-AIRPORT]

```
              [HOME-GROUND-TRANSPORT: DRIVE-MY-CAR] [DESTINATION-GROUND-TRANSPORT: TAXI]
              [TIME-OF-DEPARTURE: MORNING] [TIME-OF-ARRIVAL: EVENING]
              [HOTEL: BOSTON-RAMADA-INN]
  input-role: NEW
    Goals:   (REACHED-FINAL-DESTINATION)                    BEST AVAILABLE COPY
    Actions: GO-TO-AIRPORT; TAKE-FLIGHT; GET-SETTLED
    Choices: [HOTEL: BOSTON-SHERATON] [FLIGHT: AA-437] [HOME: MENLO-PARK]
             [DESTINATION: EAST-SIDE] [HOME-AIRPORT: SAN-FRANSISCO-AIRPORT]
             [DESTINATION-AIRPORT: BOSTON-AIRPORT] [HOME-GROUND-TRANSPORT: DRIVE-MY-CAR]
             [DESTINATION-GROUND-TRANSPORT: TAXI] [TIME-OF-DEPARTURE: MORNING]
             [TIME-OF-ARRIVAL: EVENING]

Prints:
  Changes in Plan:

Attribute        Old                       New

?FLIGHT:         AA-437                    AA-437
                    ?HOME:           MENLO-PARK                MENLO-PARK
                    ?DESTINATION:    EAST-SIDE                 EAST-SIDE
                    ?HOME-AIRPORT:   SAN-FRANSISCO-AIRPORT     SAN-FRANSISCO-AIRPORT
              ?DESTINATION-AIRPORT:  BOSTON-AIRPORT            BOSTON-AIRPORT
              ?HOME-GROUND-TRANSPORT: DRIVE-MY-CAR             DRIVE-MY-CAR
        ?DESTINATION-GROUND-TRANSPORT: TAXI                    TAXI
                    ?TIME-OF-DEPARTURE: MORNING                MORNING
                    ?TIME-OF-ARRIVAL:   EVENING                EVENING
  ****              ?HOTEL:          BOSTON-RAMADA-INN         BOSTON-SHERATON

CHANGE ANALYST
  no outputs

FAILURE EXPLAINER
  input-role: FAILURES
  (HOTEL-ROOM-BOOKING BOSTON-RAMADA-INN)
     Criticality: CHECK-IN Prints:
    Plan #<PLAN 10  57367673> will fail because (HOTEL-ROOM-BOOKING BOSTON-RAMADA-INN)
    is false, which will prevent PASSENGER from checking-in at BOSTON-RAMADA-INN.

FAILURE EXPLAINER
  no outputs

PLAN-COPIER
  input-role: ADT
    Goals:   (REACHED-FINAL-DESTINATION)
    Actions: GO-TO-AIRPORT; TAKE-FLIGHT; GET-SETTLED
    Choices: [HOTEL: BOSTON-SHERATON] [FLIGHT: AA-437] [HOME: MENLO-PARK]
             [DESTINATION: EAST-SIDE] [HOME-AIRPORT: SAN-FRANSISCO-AIRPORT]
             [DESTINATION-AIRPORT: BOSTON-AIRPORT] [HOME-GROUND-TRANSPORT: DRIVE-MY-CAR]
             [DESTINATION-GROUND-TRANSPORT: TAXI] [TIME-OF-DEPARTURE: MORNING]
             [TIME-OF-ARRIVAL: EVENING]

PLAN-COPIER
  output-role: COPY
    Goals:   (REACHED-FINAL-DESTINATION)
    Actions: GO-TO-AIRPORT; TAKE-FLIGHT; GET-SETTLED
    Choices: [HOTEL: BOSTON-SHERATON] [FLIGHT: AA-437] [HOME: MENLO-PARK]
             [DESTINATION: EAST-SIDE] [HOME-AIRPORT: SAN-FRANSISCO-AIRPORT]
```

```
                [DESTINATION-AIRPORT: BOSTON-AIRPORT] [HOME-GROUND-TRANSPORT: DRIVE-MY-CAR]
                [DESTINATION-GROUND-TRANSPORT: TAXI] [TIME-OF-DEPARTURE: MORNING]
                [TIME-OF-ARRIVAL: EVENING]

PLAN-ASSUMPTION-ANALYST
  input-role: PLAN
    Goals:   (REACHED-FINAL-DESTINATION)
    Actions:  GO-TO-AIRPORT; TAKE-FLIGHT; GET-SETTLED
    Choices: [HOTEL: BOSTON-SHERATON] [FLIGHT: AA-437] [HOME: MENLO-PARK]
             [DESTINATION: EAST-SIDE] [HOME-AIRPORT: SAN-FRANSISCO-AIRPORT]
             [DESTINATION-AIRPORT: BOSTON-AIRPORT] [HOME-GROUND-TRANSPORT: DRIVE-MY-CAR]
             [DESTINATION-GROUND-TRANSPORT: TAXI] [TIME-OF-DEPARTURE: MORNING]
             [TIME-OF-ARRIVAL: EVENING]

PLAN-ASSUMPTION-ANALYST
  output-role: ASSUMPTIONS
    (HOTEL-ROOM-BOOKING BOSTON-SHERATON)
      Criticality: CHECK-IN
    (AND (HOTEL-LOCATION BOSTON-SHERATON ?HOTEL-LOCATION)
         (TIME-OF-ARRIVAL AA-437 EVENING)
         (GROUND-TRANSPORTATION-AVAILABLE TAXI BOSTON-AIRPORT ?HOTEL-LOCATION EVENING))
      Criticality: GO-TO-HOTEL
    (FLIGHT-SCHEDULED AA-437 SAN-FRANSISCO-AIRPORT BOSTON-AIRPORT)
      Criticality: TAKE-FLIGHT
    (AND (TIME-OF-DEPARTURE AA-437 MORNING)
         (GROUND-TRANSPORTATION-AVAILABLE DRIVE-MY-CAR MENLO-PARK SAN-FRANSISCO-AIRPORT
              MORNING))
      Criticality: GO-TO-AIRPORT
    (PASSENGER-LOCATION MENLO-PARK)
      Criticality: GO-TO-AIRPORT SITUATION-MONITOR
  input-role: ASSUMPTIONS (HOTEL-ROOM-BOOKING BOSTON-SHERATON)
  Criticality: CHECK-IN
(AND (HOTEL-LOCATION BOSTON-SHERATON ?HOTEL-LOCATION)
     (TIME-OF-ARRIVAL AA-437 EVENING)
     (GROUND-TRANSPORTATION-AVAILABLE TAXI BOSTON-AIRPORT ?HOTEL-LOCATION EVENING))
  Criticality: GO-TO-HOTEL
(FLIGHT-SCHEDULED AA-437 SAN-FRANSISCO-AIRPORT BOSTON-AIRPORT)
  Criticality: TAKE-FLIGHT
(AND (TIME-OF-DEPARTURE AA-437 MORNING)
     (GROUND-TRANSPORTATION-AVAILABLE DRIVE-MY-CAR MENLO-PARK SAN-FRANSISCO-AIRPORT
          MORNING))
  Criticality: GO-TO-AIRPORT
(PASSENGER-LOCATION MENLO-PARK)
  Criticality: GO-TO-AIRPORT
```

What is claimed is:

1. A flexible computing system for developing application-specific computer systems, said flexible computing system comprising:

module production means for generating functioning modules by interpreting preselected descriptions of the functional characteristics of modules to be included in a desired application-specific computing system, and module assembly means for generating said application-specific system by combining message passing means for intermodule communication along with the functioning modules generated by said module production means.

2. The flexible computing system as claimed in claim 1, wherein said module production means includes means for selecting module components by interpreting a preselected description of the functional characteristics of a module and means for combining the selected module components with a module controller for mediating interactions among said module components.

3. The flexible computing system as claimed in claim 2, wherein said means for combining the selected module components includes means for interconnecting said module controller and said selected module components via an intramodule communication network, and wherein said module controller includes means for controlling access to said intramodule communication network, means for controlling the execution of respective stored programs corresponding to the module components, means for storing and retrieving data local to the module, and means for mediating external communication with the module.

4. The flexible computing system as claimed in claim 1, wherein said module production means includes means for interpreting a description of the functional characteristicss of a module wherein said description is independent of the programming language framework in which the module is generated.

5. The flexible computing system as claimed in claim 4, wherein said module production means includes means for generating modules according to a selected one of a plurality of different programming language frameworks, and wherein said module assembly means includes means for combining modules of different programming language frameworks.

6. The flexible computing system as claimed in claim 5, further comprising framework editing means for editing a selected programming language framework to tailor it to the specific application.

7. The flexible computing system as claimed in claim 1, wherein said module production means includes means for generating modules according to a selected one of a plurality of different programming language frameworks, and wherein said module assembly means includes means for combining modules of different programming language frameworks.

8. The flexible computing system as claimed in claim 7, wherein a module of a first programming language framework is specified as a component of a module to be generated according to a second, different programming language framework, and wherein said module production means includes means for generating a module of the first programming language framework having embedded therein the specified modules of the second, different programming language framework.

9. The flexible computing system as claimed in claim 8, wherein said module production means includes means for selectively embedding said module of said second, different programming language framework either recursively in a new corresponding local environment or globally to provide simultaneous participation of said module of said second, different programming language framework when it is embedded in a number of different modules.

10. The flexible computing system as claimed in claim 8, wherein a plurality of modules are specified to be embedded in a module to be generated and the linking between the specified modules is described graphically, and wherein said module production means includes means for interpreting the graphical description of the linking to link the modules along correlated functions for combining of the modules with other module components and said module controller.

11. The flexible computing system as claimed in claim 8, wherein a plurality of modules are specified to be embedded in a module to be generated, and wherein said module production means includes means for interconnecting said modules for data communications using abstract data types wherein data is passed whenever one of the embedded modules produces an instance of abstract data type which conforms to a data input type requirement of another of the embedded modules, so that intermodule data communication is independent of data structure implementation.

12. The flexible computing system as claimed in claim 1, wherein said message passing means passes data according to abstract data types wherein data is passed whenever a module producing data produces an instance of an abstract data type which conforms to a data input type requirement of a recipient module, so that intermodule data communication is independent of data structure implementation.

13. The flexible computing system as claimed in claim 1, further comprising means for sequencing the execution of the modules within said application-specific system.

14. The flexible computing system as claimed in claim 1, further comprising means for assigning the modules within said application system to respective processors in a distributed processor computer for simultaneous execution of certain modules.

15. The flexible computing system as claimed in claim 1, further comprising module analysis means for identifying generated modules which fail to comply with predetermined conditions for the specific application, and module editing means for editing a module to comply with certain of said condition.

16. The flexible computing system as claimed in claim 15, wherein said module analysis means includes means for generating an explanation of the failure of a module to comply with said conditions.

17. The flexible computing system as claimed in claim 1, further comprising a collection of preexisting modules for performing various knowledge processing functions.

18. A computing system for producing a collection of executable modules which are capable of communicating with each other during execution according to a standard message-passing protocol, said computing system comprising a set of preexisting modules composed in a multiplicity of frameworks, and module production means for composing additional executable modules which are capable of communicating with each other and with said preexisting modules during execution according to said standard message-passing protocol, wherein said module production means composes said additional modules by combining selected ones of said preexisting modules, said selected ones of said preexisting modules including selected modules developed in different frameworks.

19. The computing system as claimed in claim 18, wherein said frameworks use different programming languages which describe system behavior in different ways.

20. The computing system as claimed in claim 18, wherein said frameworks use different connection topologies for connecting modules composed in the same framework.

21. The computing system as claimed in claim 18, wherein said module production means includes means for incorporating a new framework for composing said additional modules.

22. The computing system as claimed in claim 21, wherein said module production means includes a separate module production means for each of said frameworks, and said means for incorporating a new framework includes means for incorporating an additional module production means for said new framework.

23. The computing system as claimed in claim 21, wherein said means for incorporating a new framework includes means for modifying the connection topology of a selected one of said frameworks.

24. The computing system as claimed in claim 18, wherein said module production means composes additional executable modules which are capable of being combined by said module production means with selected ones of said preexisting modules which are developed in different frameworks in order to form new executable modules including said additional executable modules.

25. The computing system as claimed in claim 18, wherein said module production means includes means for composing an additional executable module having a specified functionality and for use in a specified one of a plurality of frameworks, wherein said functionality is specified independent of said specified frameworks.

26. The computing system as claimed in claim 18, wherein said module production means includes means for composing an additional executable module with a specified functionality in a multiplicity of frameworks so that the functionality is specified independent of its implementation.

27. The computing system as claimed in claim 18, wherein said module production means includes means for recursively composing said additional executable modules so that some of said additional executable modules are incorporated recursively as interacting objects within other of said additional executable modules.

28. The computing system as claimed in claim 18, wherein said module production means includes means for meshing interacting subsystems of modules to provide simultaneous participation of one module as a component of a plurality of modules.

29. The computing system as claimed in claim 18, wherein a plurality of modules are specified to be embedded in a module to be produced and the linking between specified modules is described graphically, and wherein said module production means includes means for interpreting the graphical description of the linking to link the modules along correlated functions for combining the modules.

30. The computing system as claimed in claim 18, wherein a plurality of modules are specified to be embedded in a module to be produced, and wherein said module production means includes means for interconnecting said modules for data communication using abstract data types wherein data are passed whenever one of the embedded modules produces an instance of abstract data type which conforms to a data input type requirement of another of the embedded modules, so that intermodule data communication is independent of data structure implementation.

31. The computing system as claimed in claim 18, further comprising module analysis means for identifying generated modules which fail to comply with predetermined conditions and module editing means for editing a module to comply with certain of said conditions.

32. The computing system as claimed in claim 31, wherein said module analysis means includes means for generating an explanation of the failure of a module to comply with said conditions.

33. A computing system for the development of an application-specific system comprising a collection of executable modules which are capable of communicating with each other during execution according to a standard message passing protocol, said computer system comprising:
   means for composing modules using selected ones of a set of frameworks in which the modules are composable, said set of frameworks including a plurality of different frameworks, and
   means for combining said modules, including modules composed in different ones of said frameworks, to form said collection of executable modules,
   wherein said means for composing modules includes means for composing a desired module in a selected one of said frameworks by including in the desired module a specified pre-existing module developed by said means for composing in any of said frameworks, so that said modules are uniformly composable.

34. The computing system as claimed in claim 33, wherein said set of frameworks includes a multiplicity of different frameworks, and said computing system further comprises a multiplicity of preexisting modules for various knowledge processing functions.

35. The computing system as claimed in claim 33, wherein said frameworks use different programming languages.

36. The computing system as claimed in claim 33, wherein said frameworks use different connection topologies for connecting modules composed in the same framework.

37. The computing system as claimed in claim 33, wherein said means for composing modules includes means for incorporating a new framework.

38. The computing system as claimed in claim 37, wherein said means for composing modules includes a separate module composing means for each of said frameworks, and said means for incorporating a new framework includes means for incorporating an additional module composing means for said new framework.

39. The computing system as claim in claim 33, wherein said means for incorporating a new framework includes means for modifying the connection topology of a selected one of said frameworks.

40. The computing system as claimed in claim 33, wherein said means for composing modules includes means for specifying the functionality of a module to be composed independent of the framework selected for implementing the module.

41. The computing system as claimed in claim 33, wherein said means for composing modules includes means for recursively composing said modules so that some of said modules are incorporated recursively as interacting objects within other of said modules.

42. The computing system as claimed in claim 33, wherein said means for composing modules includes means for meshing interacting systems of said modules to provide simultaneous participation of one module as a component of a plurality of others of said modules.

43. The computing system as claimed in claim 33, wherein a plurality of modules are specified to be embedded in a module to be composed and the linking between specified modules is described graphically, and wherein said means for composing modules includes means for interpreting the graphical description of the linking to link the modules along correlated functions for combining the embedded modules.

44. The computing system as claimed in claim 33, wherein a plurality of modules are specified to be embedded in a module to be composed, and wherein said means for composing modules includes means for interconnecting said modules for data communication using abstract data types wherein data are passed whenever one of the embedded modules produces an instance of abstract data type which conforms to a data input type requirement of another of the embedded modules, so that intermodule data communication is independent of data structure implementation.

45. The computing system as claimed in claim 33, further comprising module analysis means for identifying composed modules which fail to comply with predetermined conditions, and module editing means for editing a module to comply with certain of said conditions.

46. The computing system as claimed in claim 45, wherein said module analysis means includes means for generating an explanation of the failure of a module to comply with said conditions.

47. The computing system as claimed in claim 33, wherein said means for composing modules includes means for selecting module components by interpreting a preselected description of the module and means for combining the selected module components with a module controller for mediating interactions among said module components.

48. The computing system as claimed in claim 47, wherein said means for combining the selected module components includes means for interconnecting said module controller and said selected module components via an intramodule communication network, and wherein said module controller includes means for controlling access to said intramodule communication network, means for controlling the execution of respective stored programs corresponding to the module components, means for storing and retrieving data local to the module, and means for mediating external communication with the module.

49. The computing system as claimed in claim 33, wherein said means for combining said modules includes means for combining message passing means for intermodule communication along with said modules composed in different frameworks.

50. A computing system for the development of an application-specific system comprising a collection of executable modules which are capable of communicating with each other during execution, said computer system comprising:
means for composing modules by combining specified module components in accordance with a predetermined framework, said framework providing an original connection topology for said module components, and
means for combining said modules to form said collection of executable modules,
wherein said means for composing modules includes means for modifying said connection topology to provide a new framework for composing modules.

51. The computing system as claimed in claim 50, wherein said means for composing includes means for combining, as module components, modules composed by said means for composing, including modules composed in both the original and the modified connection topology.

52. The computing system as claimed in claim 50, wherein said means for composing modules includes means for selecting module components by interpreting a preselected description of the functional characteristics of a module and means for combining the selected module components with a module controller for mediating interactions among said module components.

53. The computing system as claimed in claim 50, wherein said means for composing modules includes means for composing modules according to a selected one of a plurality of different programming language frameworks, and wherein said module assembly means includes means for combining modules of different programming language frameworks.

54. A computing system for the development of an application-specific system comprising a collection of executable modules which are capable of communicating with each other during execution, said computer system comprising:
means for composing modules by combining specified module components with a module controller in accordance with an original predetermined framework, said module controller including means for controlling access of the module components to an intramodule communication network and means for controlling the execution of stored programs corresponding to the module components, and
means for combining said modules to form said collection of executable modules,
wherein said means for composing modules includes means for modifying said module controller to provide a new framework for composing modules.

55. The computing system as claimed in claim 54, wherein said means for composing includes means for combining, as module components, modules composed by said means for composing, including modules composed in both the original and the modified connection topology.

56. The computing system as claimed in claim 54, wherein said means for composing modules includes means for selecting module components by interpreting a preselected description of the functional characteristics of a module and means for combining the selected module components with a module controller for mediating interactions among said module components.

57. The computing system as claimed in claim 54, wherein said means for composing modules includes means for composing modules according to a selected one of a plurality of different programming language frameworks, and wherein said module assembly means includes means for combining modules of different programming language frameworks.

58. A computing system for the development of an application-specific system comprising a collection of executable modules which are capable of communication with each other during execution, said computer system comprising:
means for composing modules by combining specified module components in accordance with specified ones of a multiplicity of frameworks, and
means for combining said modules, including modules composed according to different ones of said frameworks, to form said collection of executable modules,
wherein said means for composing includes means for combining, as module components, modules composed by said means for composing according to different frameworks, and said frameworks use different connection topologies for connecting module components; and further comprising means for specifying the frameworks used for implementing the connection topologies for connecting the modules and module components.

59. A computing system for developing intelligent computer systems including collections of executable modules which interact via message passing, said computing system comprising, in combination:
- a plurality of pre-programmed knowledge processing modules,
- a plurality of application-independent problem-solving frameworks for building additional modules and combining modules of different frameworks, and
- a cooperating operating system for supporting message passing and resource allocation among said knowledge processing modules and said additional modules.

60. The computing system as claimed in claim 59, wherein said pre-programmed knowledge processing modules include a skeletal system.

61. A computing system for monitoring a design, said computer system including a data base storing said design together with a model of the natural world, said design specifying an implementation in the natural world to achieve desired effects under assumed conditions,
- means for updating said model of the natural world to reflect changed conditions at a plurality of points in time prior to implementation of said design in the natural world, and
- means for monitoring said data base to test whether said design is capable of being implemented to achieve said desired effects under said changed conditions at said plurality of points in time.

62. The computing system as claimed in claim 61, wherein said design specifies a plan of action to be executed in the natural world.

63. The computing system as claimed in claim 61, wherein said design specifies a physical object to be manufactured in the natural world.

64. The computing system as claimed in claim 61, wherein said means for updating and said means for monitoring operate periodically to indicate when said design becomes incapable of being implemented to achieve said desired effects.

65. The computing system as claimed in claim 61, further comprising means for scheduling the monitoring of said data base to occur at predetermined times, and wherein said means for monitoring said data base is operated by said means for scheduling to determine whether said design is capable of being implemented at said predetermined times to achieve said desired effects under said changed conditions.

66. The computing system as claimed in claim 61, further comprising means for modifying said design when said means for monitoring determines that said design is incapable of being implemented to achieve said desired effects, so that said design is modified to be capable of being implemented to achieve said desired effects.

67. The computing system as claimed in claim 66, wherein said data base includes a knowledge base storing knowledge about how said means for modifying may modify said design in a manner requiring minimal perturbing changes to said design, and wherein said means for modifying includes means for interpreting said knowledge base so that said design is modified with minimal perturbing changes to said design.

68. The computing system as claimed in claim 61, wherein said design stored in said data base includes a set of related elements, said means for monitoring monitors a selected subset of said set of related elements to test whether said design is capable of being implemented to achieve said desired effects under said changed conditions, and further comprising means for analyzing said design to determine said selected subset of said set of related elements to be monitored by said means for monitoring.

69. The computing system as claimed in claim 68, wherein said selected subset selected by said means for analyzing determines prerequisites for actions that said design does not itself achieve.

70. The computing system as claimed in claim 69, further comprising means for translating said prerequisites for actions into database queries.

71. The computing system as claimed in claim 61, further comprising means for generating an explanation of why said design is incapable of being implemented when said means for monitoring determines that said design is incapable of being implemented to achieve said desired effects under said changed conditions.

72. The computing system as claimed in claim 71, wherein said explanation is expressed in a natural language.

73. A computer system for maintaining a design despite changing conditions so that said design is capable of being readily implemented in the natural world to achieve certain desired effects, said computer system including
- a data base storing said design together with a model of the natural world,
- means for updating said model of the natural world to reflect said changing conditions at a plurality of points in time before said design is implemented, and
- means for incrementally modifying said design a plurality of times prior to implementation to reflect said changing conditions at said plurality of points in time so that said design is modified to be readily capable of being implemented to achieve said desired effects.

74. The computing system as claimed in claim 73, wherein said data base includes a knowledge base storing knowledge about how said means for modifying may modify said design in a manner requiring minimal perturbing changes to said design, and wherein said means for modifying includes means for interpreting and applying said knowledge.

75. The computing system as claimed in claim 73, further comprising means for analyzing the nature of the changes in said design effected by said means for modifying so that the design changes are identified.

76. The computing system as claimed in claim 75, further comprising means for generating an explanation of the identified design changes.

77. A computing system including modular software for monitoring and successively modifying a design to reflect changing conditions so that said design is capable of being readily implemented in the natural world to obtain certain desired effects despite changing conditions, said computing system also including a data base storing said design together with a model of the natural world, said modular software including modules for monitoring said data base to test whether said design is capable of being implemented to achieve said desired effects under said changing conditions, and for modifying said design when said design is found to be incapable of being implemented to achieve said desired conditions.

78. The computing system as claimed in claim 77, wherein said modules include a module for monitoring said data base, and a module for incrementally modifying said design.

79. The computing system as claimed in claim 77, wherein said modules are replaceable functional units.

80. The computing system as claimed in claim 77, wherein at least one of the modules internally uses different kinds of architecture and control procedures.

81. The computing system as claimed in claim 77, wherein abstract data types are used for interfaces between said modules.

82. A computing system including a modular software architecture for monitoring and successively modifying a design to reflect changing conditions so that said design is capable of being readily implemented in the natural world to obtain certain desired effects despite changing conditions, said computing system including a data base storing said design together with a model of the natural world, said modular software including modules for monitoring said data base and for modifying said design to reflect changing conditions, wherein said modular architecture includes control knowledge which is interpreted and applied for flexible control of the sequence of execution of the software modules.

83. The computing system as claimed in claim 82, wherein at least one of the modules internally uses different kinds of architecture and control frameworks.

84. The computing system as claimed in claim 82, wherein said modules include an assumption analyst for determining critical assumptions of the design, a situation monitor for monitoring the data base to determine whether the critical assumptions are true, a failure explainer for explaining failures in the design when the critical assumptions are false, an incremental replanner for modifying the design when the critical assumptions are false, and a change analyst for comparing the modified design to the design before modification to identify and describe the modifications made to the design.

* * * * *